United States Patent [19]

Bloch et al.

[11] 4,338,495

[45] Jul. 6, 1982

[54] ELECTRONIC KEY TELEPHONE SYSTEMS

[75] Inventors: Alan Bloch, New York; Frank A. Coviello, Peekskill, both of N.Y.; Ira Guzik, Fairfield; Candido Puebla, Bridgeport, both of Conn.

[73] Assignee: TIE/Communications, Inc., Shelton, Conn.

[21] Appl. No.: 18,191

[22] Filed: Mar. 6, 1979

[51] Int. Cl.³ .......................... H04Q 5/20; H04M 1/00
[52] U.S. Cl. ............................. 179/99 M; 179/99 P; 179/99 A
[58] Field of Search ................ 179/99 M, 99 R, 99 P, 179/99 LC, 84 VF

[56] References Cited

U.S. PATENT DOCUMENTS

| | | | |
|---|---|---|---|
| 3,691,310 | 9/1972 | Fenton | 179/99 M |
| 3,843,845 | 10/1974 | Ridley | 179/99 M |
| 3,935,396 | 1/1976 | Barseilotti et al. | 179/99 M |
| 3,991,281 | 11/1976 | Smith | 179/99 A |
| 4,037,059 | 7/1977 | Stine | 179/99 P |
| 4,125,748 | 11/1978 | Nahabedian et al. | 179/99 R |
| 4,125,749 | 11/1978 | Kinoshita et al. | 179/99 M |
| 4,185,173 | 1/1980 | Kerman et al. | 179/99 P |
| 4,203,011 | 5/1980 | Coviello | 179/99 M |

*Primary Examiner*—Gerald L. Brigance
*Attorney, Agent, or Firm*—Francis N. Carten

[57] ABSTRACT

Each of the station sets in the system generates a continuous, current-modulated digital data stream carrying information concerning the status of pushbutton-actuated switches associated with a particular service or feature. This data stream is transmitted via a phantom pair over standard four-wire cable to an associated station card in the key service unit, which receives and decodes the data, implements any service requested at the associated station set by closure of a pushbutton-actuated switch in the station set, and generates a continuous voltage-modulated digital data stream carrying instructions for the connection of the station set speakerphone to either the first or second talk path formed by the first and second conductor pairs in the standard four-wire cable, for energization of light-emitting diodes associated with the pushbutton-actuated switches in the station set, and for controlling background music transmission to the associated station set. This data stream is transmitted via the aforementioned phantom pair to the station set, which receives and decodes the data and carries out the instructions contained therein. Each station card and each station set incorporates a stored-program digital microcomputer for decoding the received data and for generating the data to be transmitted. Each station card also includes a series of crosspoints in the form of field-effect transistors, the gate electrodes of which are connected to crosspoint latches controlled by the microcomputer. Each crosspoint has an associated input terminal in a status multiplexer which receives data from the passive port to which the associated crosspoint is connected. Each crosspoint and its associated status multiplexer input terminal constitute an active port. Each station card also includes at least one passive port for hotline connection to an active port of another station card or cards, and may also include a passive port for connection to the active ports of one or more link cards. Other system component circuits are disposed on line cards having a single passive port, an internal conference card having a single passive port, a page card having multiple passive ports, a register card or cards connected to the link card or cards, and a tone generator card.

85 Claims, 10 Drawing Figures

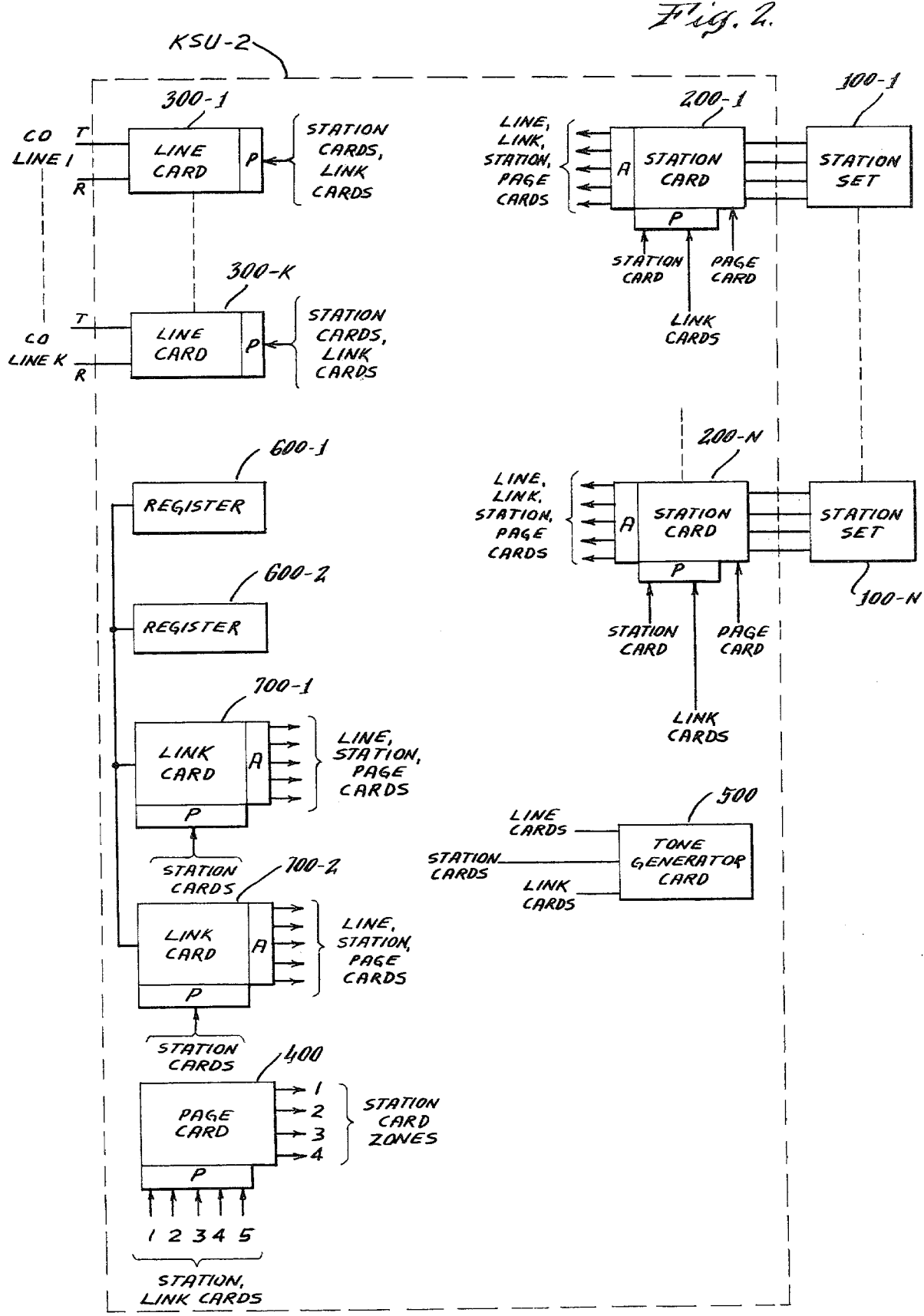

ELECTRONIC KEY TELEPHONE SYSTEMS

CROSS-REFERENCE TO RELATED APPLICATIONS

The invention which is the subject matter of the present application is advantageously employed with the inventions disclosed and claimed in U.S. patent application Ser. No. 870,225 entitled COMPUTER CONTROLLED KEY TELEPHONE STATION SET filed on Jan. 17, 1978, in the name of Frank A. Coviello and in U.S. patent application Ser. No. 803,243 entitled COMMUNICATION CIRCUIT filed on June 3, 1977, in the names of Alan Bloch, Frank A. Coviello, Ira Guzik and Candido Puebla, and the disclosures of both of said applications are incorporated herein by reference.

BACKGROUND OF THE INVENTION

In various known key telephone systems, the implementation of the many available services or features required additional circuits in each station set and additional conductors running from each station set to the key service unit (KSU). It is not uncommon to have as many as 50 pairs of conductors connecting each station set to the KSU. Consequently, the time, effort and cost of installing, modifying or moving such key telephone sets has become excessive.

Some attempts have been made to overcome these problems by implementing key telephone service features by means of signal multiplexing techniques, thus achieving substantial reductions in the number of conductor pairs required for connection of each key telephone set to the KSU. Although this approach has alleviated the cost and space problems somewhat, it has been only moderately successful. As before, the addition of telephone services or features required circuit modifications in the KSU and in the station sets. Also, such signal multiplexing systems frequently employ a common control circuit to supervise signalling and control for all of the station sets. Thus, failure of the common control circuit causes the entire system to fail.

SUMMARY OF THE INVENTION

The present invention is embodied in and carried out by an electronic key telephone system in which telephone services or features are implemented by switching in the key service unit in response to signals received from the station sets, and signals received by the station sets from the key service unit control energization of visual indicators and connection of internal circuitry in the station sets. The key service unit includes a distributed space-division matrix with active and passive ports, and has distributed time-division multiplexed control with interleaved duplex signalling between the key service unit and the station sets. All system options are effected in the key service unit. Each station set is connected to the key service unit by only four conductors, which form two voice communication channels. The duplex signalling and the power transmission to each station set are both accomplished over a phantom pair incorporating the four conductors which form the voice communication channels.

BRIEF DESCRIPTION OF THE DRAWING

The present invention may be better understood by reading the written description thereof with reference to the accompanying drawing, of which:

FIG. 2 is a block diagram of a second preferred embodiment of applicants' electronic key telephone system;

DESCRIPTION OF THE PREFERRED EMBODIMENTS

Applicants' electronic key telephone system (EKTS) incorporates the novel concept of a distributed space-division matrix formed by active and passive ports. An active port is defined as one which has the ability to seize a passive port, but cannot be seized by any port. A passive port is defined as one which has the ability to be seized by an active port, but cannot itself seize any port. In applicants' system, any active port can seize any passive port to which it is connected. Any active port may be connected to any passive port by means of backplane wiring in the cabinet of the key service unit. The sequence of events involved in the seizing of a passive port by an active port are as follows: (1) interrogating the passive port by the active port to determine its status (seized or not seized); if the interrogated passive port is not seized, (2) closing a talk/signal path from the active port to the passive port; (3) signalling from the active port to the passive port that it has been seized; and (4) signalling from the passive port to all other active ports to which it is connected that it has been seized. If, upon interrogation of the passive port by the active port, it is found that the passive port has been seized, the interrogating active port will not be able to seize the passive port except in the special case of an active port which is capable of pre-emptively seizing the passive port, i.e., in spite of the passive port having already been seized by another active port.

Figure 1:
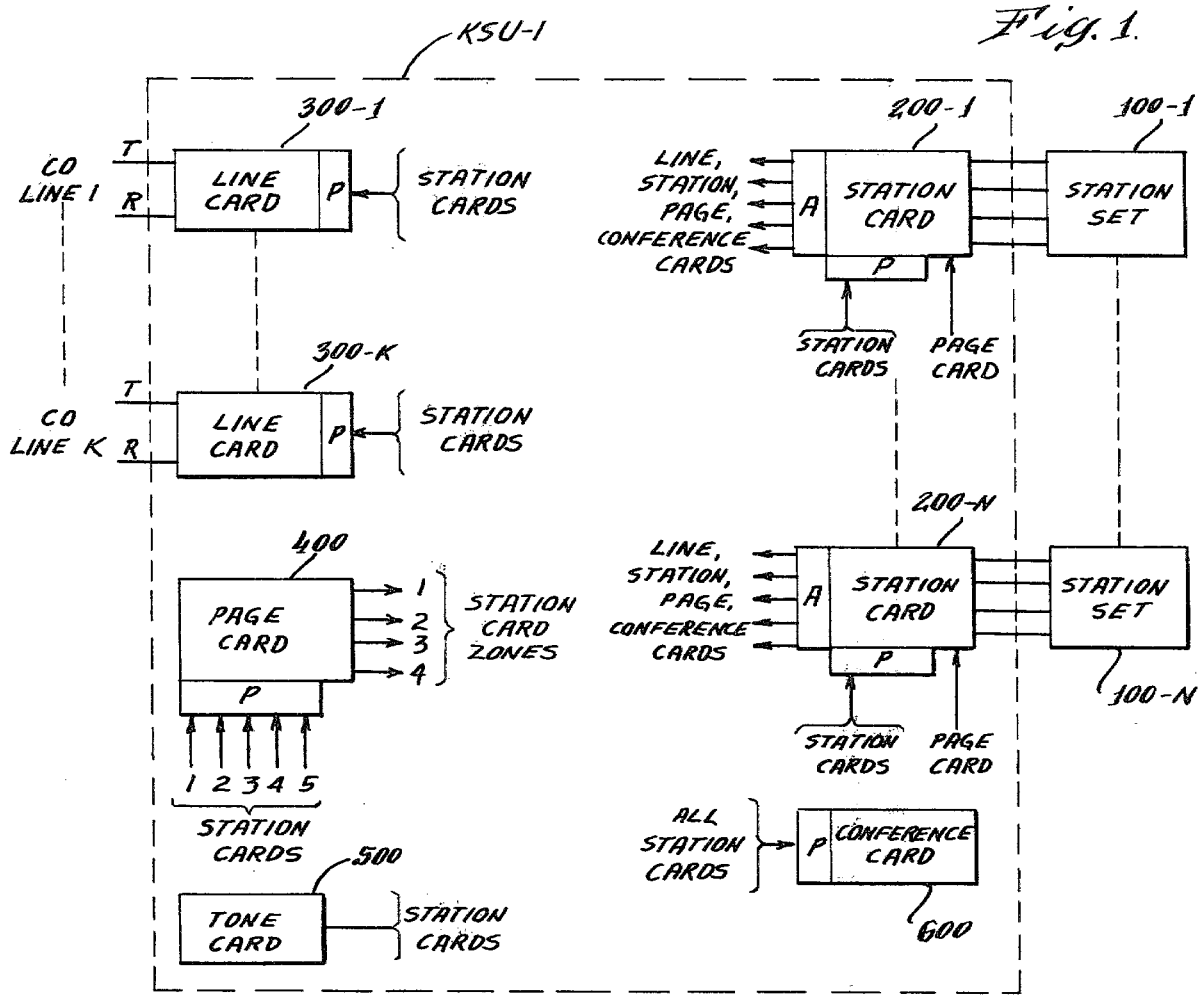
FIG. 1 is a block diagram of a first preferred embodiment of applicants' electronic key telephone system.

Referring specifically to the first preferred embodiment of applicants' EKTS shown in FIG. 1, the system includes a variable number of electronic key telephone sets 100-1, ..., 100-N the details of which are set forth in cross-referenced application Ser. No. 870,225, the disclosure of which is incorporated herein by reference. The key service unit KSU-1 is formed by a variable number of station cards 200-1, ..., 200-N equal to the number of station sets; a variable number of line cards 300-1, ..., 300-K; an optional page card 400, a tone generator card 500, and an optional conference card 600. Power is provided to KSU-1 by a power supply (not shown) generating outputs of +25 volts DC, −25 volts DC, and −5 volts DC, and power is provided to each station set 100-1, ..., 100-N through its associated station card 200-1, ..., 200-N via the quad-wire connection, which is described in detail in cross-referenced application Ser. No. 803,243, the disclosure of which is incorporated herein by reference. Each station card 200 has an array of active ports A and a number of passive ports P. In this embodiment, each station card active port A is connected either to a passive port P in another station card 200, or to the passive port P in a line card 300, or to a passive port P in the page card 400, or to the passive port P in the internal conference card 600. Each page card zone output is connected to the page inputs of one of four groups of station cards 200. Tone generator card 500 provides the station cards 200 with audible and visual indicator signals for transmission to the station sets 100. In this embodiment, all internal calling is accomplished without dialing by actuation of a single station set pushbutton or key to establish a direct connection through the associated station card and the backplane wiring to another station card and its associated station set. This embodiment employs a non-blocking matrix arrangement that assures connection to the desired internal station set regardless of the amount of traffic on the system (if that station set is not busy).

Referring specifically to the second preferred embodiment of applicants' EKTS shown in FIG. 2, the system includes a variable number of electronic key telephone sets 100-1, ..., 100-N as in the system of FIG. 1. The key service unit KSU-2 is formed by a variable number of station cards 200, a variable number of line cards 300, a variable number of register cards 600, a variable number of link cards 700, a tone generator card 500, and (optionally) a page card 400. System power is provided as in the embodiment of FIG. 1. Each station card 200 has an array of active ports A and a number of passive ports P. In this embodiment, each station card active port A is connected either to the passive port P in a line card 300, or to the passive port P in a link card 700, or to a passive port P of one other station card 200, or to a passive port P in the page card 400. Each link card active port A is connected either to the passive port P of a line card 300, or to a passive port P in a station card 200, or to a passive port P in the page card 400. Each page card zone output is connected to the page inputs of one of four groups of station cards 200. Tone generator card 500 provides audible and visual indicator signals to the station cards 200, the line cards 300, and the link cards 700 for transmission to the station sets 100 and to the C.O. line, as may be appropriate. In this embodiment, most internal calling is accomplished by dialing from a station set 100 through the associated station card 200 and a link card 700 to another station card 200 and its associated station set. However, each station card does have a hotline connection from one active port A through the backplane wiring to a passive port P in one other station card. It is also possible to seize a C.O. line which does not have its line card's passive port P connected to an active port A of a particular station card by having that station card seize a link card and then seize that C.O. line via the link card.

In both embodiments, there is an absolute minimum of common equipment, and so the systems are never burdened with more circuitry or hardware than is actually needed for any given installation. Each system also has the capability of allowing two groups of users to be separated by lines and stations so that one group has C.O. lines that do not appear at stations in the other group. This configuration has application when two or more departments or business entities in the same location wish to be serviced by the same key telephone system. System installation requires a minimum of time and expense. Because all system options are accomplished in the KSU, rather than in the station sets, the installer is not required to open the station sets during installation or when implementing new services or features. The wiring from the KSU to the station sets is accomplished with standard 4-wire non-twisted 22 AWG wire, which may be run for distances over 3,000 feet, and is connected by modular plugs and jacks. All of these advantages are yielded by the use of a solid state, distributed space division matrix with time-division distributed control. Specifically, all of the logic functions for a given station are performed by the station set circuit and the associated station card circuit. Thus, a logic failure in one station card circuit will affect only the associated station, and repair or replacement of the failed station card circuit may be effected without interrupting or interfering with service on any other line.

Figure 3:
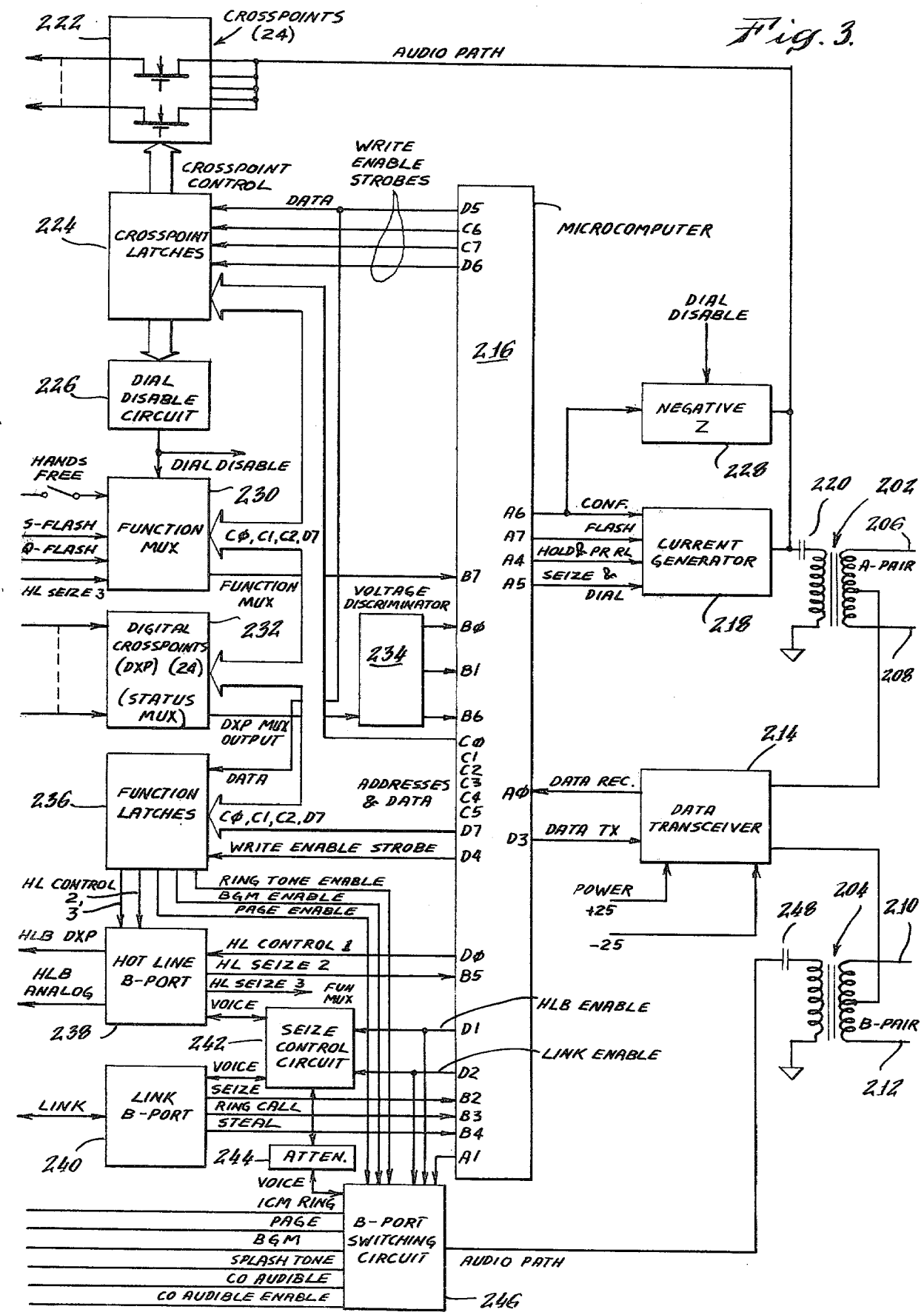
FIG. 3 is a block diagram of the station card circuit which is a component of applicants' electronic key telephone system.

Referring specifically to FIG. 3, the station card circuit 200 shown there includes transformers 202 and 204, which are connected to the A path (conductors 206 and 208) and the B path (conductors 210 and 212), respectively. The phantom path is connected from the center-tapped windings of transformers 202 and 204 to the data transceiver 214, which is fully described in co-pending patent applications Ser. No. 870,225 and Ser. No. 803,243, the disclosures of which are incorporated herein by reference. The data received from the associated station set circuit 100 via the phantom pair is fed in a continuous stream from the data transceiver 214 to the microcomputer 216, which decodes the data. The microcomputer 216 is preferably the Part No. R6500/1 single-chip microcomputer system manufactured by Rockwell International Corporation. When the data received from the associated station set 100 includes a word having a bit which is indicative that a particular button has been depressed by the user of the station set, the microcomputer 216 generates the outputs necessary to implement the service or feature associated with that button. For example, if a C.O. line is to be seized, an appropriate output is fed from output terminal A5 of microcomputer 216 to the current generator 218, which is a digital-to-analog converter formed by four operational amplifiers with their output terminals tied so as to sum their respective outputs. In response, the current generator 218 generates a predetermined DC output current (1.6 ma) which is superimposed upon any signal received from the station set on the A path fed through transformer 202 and DC blocking capacitance 220. Both the output of current generator 218 and the signal received via the A path are transmitted to the crosspoint array 222, which consists of a number of MOSFETs, each having its source electrode connected either to an associated line card circuit, or to a link card circuit, or to a page card circuit, or to another station card circuit, or to a conference card circuit, all of the drain electrodes being connected in common to the outputs of current generator 218 and transformer 202. Each of the gate electrodes of the MOSFETs is connected to an associated crosspoint latch in the array of crosspoint latches 224, which consists of demultiplexers formed by three eight-bit latches (CD4099BE). The array 224 receives three continuous data streams from microcomputer 216; latch command data, which is issued to all of the crosspoint latches and consists of a one bit command (0 or 1); write enable strobe data, which identifies which of the eight-bit latches is to receive the latch command data; and address data which identifies with a three-bit address that latch in each package which is to receive the latch command data. When the proper conjunction of inputs causes one of the crosspoint latches 224 to close, the associated MOSFET crosspoint in array 222 is biased conductive to close the audio path from A-pair 206, 208 through transformer 202, DC blocking capacitance 220 and the drain and source electrodes of the conductive MOSFET in array 222. A dial disable circuit 226 formed by a saturating operational amplifier receives inputs from only those crosspoint latches 224 associated with crosspoints which are connected to line cards; those inputs are indicative of the status of those latches, and when any such latch is closed, circuit 226 responds by terminating the dial disable output signal which is normally fed to negative impedance circuit 228 and to function multiplexer 230. Removal of the dial disable signal activates the negative impedance 228 from an open circuit condition to a first level of −600 ohms so as to match the impedance in the station card 200 to the impedance to which connection has been made via the conductive MOSFET crosspoint. The function multiplexer 230, formed by a tree of analog gates (a single CD4051BE) which receives a four-bit address from the microcomputer 216, also receives a number of simultaneous inputs including the presence or absence of a dial disable signal, the presence or absence of a hands-free disable signal, and slow-flashing and quick-flashing visual indicator signals. These simultaneous inputs are time-division multiplexed to form the input to terminal B7 of microcomputer 216, and are thus available for inclusion in the data stream output at terminal D3 to the data transceiver 214. The array of digital crosspoints 232 are, like the function multiplexer 230, formed by a tree of analog gates (also a single CD4051BE) which receives a four-bit address from the microcomputer 216, and also receives a series of simultaneous inputs in the form of voltages indicative of the status (seizable, not seizable, etc.) of the passive ports to which the crosspoints 222 are connected. Each of the analog crosspoints 222 is thus paired with one of the digital crosspoints 232 to form an active port. The simultaneous inputs to digital crosspoints 232 are time-division multiplexed and output to the voltage discriminator 234 formed by three analog-to-digital converters which provide a three-bit message to the microcomputer 216 at terminals B0,B1 and B6. Viewing the inputs to these terminals at any point in time, if none of the three voltage reference levels of discriminator 234 is exceeded by the signal voltage (+2 v, 0 v, −2 v or −4 v) sampled by digital crosspoint 232, then logic 0 appears at each of the terminals B0, B1 and B6, indicating to the microcomputer 216 that the passive port being interrogated at that point in time is seizable and it associated visual indicators in the station sets are off. If the first voltage reference level is exceeded, a logic 1 appears at B6 and logic 0 appears at B0 and B1, indicating that the passive port being interrogated at that point in time is seizable, but its associated visual indicators are on, indicating that the station card incorporating the interrogated passive port is in use on its A-pair. If the second voltage reference level is exceeded, a logic 1 appears at B6 and B0 and a logic 0 appears at B1, indicating that the passive port being interrogated at that point in time is not seizable, except by an active port with a pre-emptive seize capability, and its associated visual indicators are on. If the third voltage level is exceeded, a logic 1 appears at B0, B1 and B6, indicating that the passive port being interrogated at that point in time is not seizable by any active port, i.e., it has been pre-emptively seized, and its associated visual indicators are on. If the passive port of a line card being interrogated at any point in time indicates that it is either receiving an incoming call on the associated C.O. line, or is on HOLD, i.e., when the voltage signal input to data crosspoints 232 alternate between 0 v and +2 v, this flashing signal will be sampled by the associated digital crosspoint in array 232 and will be passed through voltage discriminator 234 to terminal B6 as a series of logic 1s alternating with a series of logic 0s at the rate and duty cycle of the flashing signal being sampled. All of this information is employed by the microprocessor 216 to determine whether to signal the current generator 218 to send signal current on the audio path via a conductive MOSFET crosspoint to a passive port, and to signal the station sets from terminal D3 via data transceiver 214 as to the status of all the interrogated passive ports.

If and only if a requested telephone service or feature is indicated as being available upon interrogation of the relevant passive port, signal current will be generated by the active port to advise the passive port of its seizure and the desired service. Specifically, the current generator 218 can receive only one of four command signals from microcomputer 216 in response to data received at terminal A0. Absent any command signal, the output from current generator 218 is nil (0 ma). A seize signal may appear at terminal A5, causing a seize current (1.6 ma) to flow from current generator 218 on the audio path and through a conductive MOSFET crosspoint to the passive port to which that crosspoint is connected. That passive port is thus informed that it has been seized, and it responds by generating a voltage signal which is transmitted to all of the active ports to which the passive port is connected to indicate to those active ports that it has been seized. A conference signal may appear at terminal A6, causing a double seize current (3.2 ma) to flow from current generator 218 to signal seizure of two passive ports, e.g., conferencing two incoming C.O. lines. The seized passive ports respond by each generating a voltage signal indicative of seizure. The conference signal from terminal A6 of microcomputer 216 is also input to negative impedance 228 to adjust its value to −200 ohms so as to match the impedance of the two conferenced lines to which the station card has been connected through the seized passive ports. A flash signal may appear at terminal A7 of microcomputer 216, causing a flash current (6.4 ma) to flow from current generator 218 and break the loop current on a seized C.O. line while continuing to hold that line. Hold and privacy release signals may appear at terminal A4 of microcomputer 216, causing either a hold current pulse (14 ma) of brief duration to be generated, or a privacy release current pulse (14 ma) to be generated as long as the privacy release button in the associated station set is depressed. In response to the aforementioned signals currents from current generator 218, the KSU circuit incorporating the receiving passive port implements the requested service indicated by the signal current level, and the receiving passive port generates a voltage signal indicative of its seizure.

Each station card 200 includes one or more passive ports, viz., a hotline B-port 238, a link B-port 240, or a page input to B-port switching circuit 246. The term "B-port" refers only to station card passive ports, which provide access to the B-pair communication channel. In the system shown in FIG. 1, the station cards require no link B-ports 240, since there are no links. If the optional paging and background music features are eliminated, the PAGE and BGM input circuits in B-port switching circuit 246 may be eliminated. There are multiple connections to the hotline B-port from one active port in each of the other station cards in this system. In the system shown in FIG. 2, each station card has a link B-port which may be seized by a link card circuit. The hotline B-port is connected to one active port in only one other station card 200; if a system is desired in which all internal calling is to be accomplished through the link cards, the hotline B-port may be eliminated. As in the system of FIG. 1, if the optional paging and background music features are eliminated, the PAGE and BGM input circuits in B-port switching circuit 246 may be eliminated. These B-port circuits are shown in detail in FIG. 4. The hotline B-port 238 comprises a transformer 250 for isolating the DC current signals, which are received from the active ports to which transformer 250 is connected via the HLB ANALOG conductor, from the VOICE or AUDIO PATH. A resistor 252 is connected across the DC signal-current-receiving winding of transformer 250 for the purpose of providing a shunt path past the winding so as to minimize transients induced in the other winding by the DC current signals, and an impedance-matching resistance 254 of equal value is connected across the other winding. A signal current sensor circuit comprises transistor 256, which is biased by −9 v. applied through resistor 260 to its base, which is also connected to the anode of diode 258, the cathode of which is grounded. The collector is connected through parallel resistor 262 and capacitor 264 to −9 v., and the emitter is connected through resistor 252 and its parallel winding of transformer 250 to the HLB ANALOG conductor. A seize signal current (1.6 ma) is detected as an increase in the voltage across resistor 262, which causes voltage comparator 266 to generate a HL SEIZE 2 signal which is transmitted to input terminal B5 of microcomputer 216. A latch command is then generated in the data stream from terminal D5, causing the pertinent one of function latches 236 (FIG. 3) to close and thereby issue the HL CONTROL 2 signal (logic 1) to digital-to-analog converter 261 in hotline B-port 238. In response, the D/A converter 261 generated an output which is applied through resistor 263 to voltage follower 269, which generates a DC signal voltage indicating seizure (−2 v.) which is transmitted to the digital crosspoint(s) of the active ports to which hotline B-port 238 is connected. The microcomputer 216 further responds to the HL SEIZE 2 or 3 signals by simultaneously generating a SPLASH TONE ENABLE signal at terminal A1, thereby triggering splash tone control circuit 294 which then turns on JCT FET 293 for about 1 second to pass the steady SPLASH TONE signal received from tone generator circuit 500 to the AUDIO PATH, thereby signalling the called party that there is an incoming call. The SPLASH TONE ENABLE signal is also applied as an input to inverting OR gate 290, which responds by turning off JCT FET 289 to block any PAGE or BGM transmission. The microcomputer 216 responds to the depression of the appropriate buttons at the called party's station set by generating the HL B ENABLE signal at terminal D1, which turns on MOSFET 268 in seize control circuit 242 and is also applied as an input to inverting OR gates 290 and 286 in B-port switching circuit 246, thereby turning off both JCT FET 289 and MOSFET 287 to block PAGE and BGM transmissions, and causing inverter 285 to turn on MOSFET 284 in the VOICE or AUDIO PATH. Thus, a path is closed for the transmission of voice signals via transformer 250, MOSFET 268, attenuator 244 formed by a resistive pi network and MOSFET 284 through DC blocking capacitor 248 and transformer 204 to the B-pair communication channel comprising conductors 210 and 212.

With a seized DC signal voltage (−2 v.) at the output of voltage follower 269, the hotline B-port 238 may be pre-emptively seized by an active port having that ability. If a pre-emptive seize current signal (3.2 ma) is received by hotline B-port 238, voltage comparator 263 generates a HL SEIZE 3 signal which is fed to function multiplexer 230. A latch command is then generated in the data stream from terminal D5, causing the pertinent one of the array of function latches 236 (FIG. 3) to issue the HL CONTROL 3 signal to digital-to-analog converter 257. In response, the D/A converter 257 generates an output which is applied through resistor 259 to voltage follower 269, which generates a DC signal voltage indicating pre-emptive seizure (−4 v.). If the user of the associated station set 100 is utilizing the A-pair communication channel, the microcomputer will generate a HL CONTROL 1 signal (logic 1) at terminal D0, thereby causing digital-to-analog converters 265 to generate an output through resistor 267 which causes voltage follower 269 to generate a DC signal voltage (0 v.) indicating that the hotline B-port 238 is seizable and that the associated visual indicator in the calling party's station set is to be lit. If each of the signals HL CONTROL 1,2,3 is a logic 0, the voltage follower 269 will generate a DC signal voltage (+2 v.) indicating that the hotline B-port 238 is seizable and that the associated visual indicator in the calling party's station set is not to be lit.

The link B-port 240 comprises an isolating transformer 270 with DC shunt resistor 272 connected across the DC signal current-receiving winding, and an impedance-matching resistor 274 connected across the other winding. A combination current sensor and voltage sender circuit is formed by transistor 275, operational amplifier 276, and the parallel-connected resistor 277 and capacitor 278. A DC current signal received on the LINK conductor from an active port is sensed as an increase in voltage across resistor 277, which in turn causes comparator 279 to generate a LINK SEIZE signal which is applied to terminal B2 of microcomputer 216. If the call is received handsfree at the called speakerphone, the microcomputer 216 also generates a SPLASH TONE ENABLE signal at terminal A1 in response to the LINK SEIZE signal, thereby triggering splash tone control circuit 294 which then turns on JCT FET 293 for about 1 second to pass the steady SPLASH TONE signal to the AUDIO PATH. The SPLASH TONE ENABLE signal is also applied as an input to inverting OR gate 290, which responds by turning off JCT FET 289 to block any PAGE or BGM transmission. If the seizing link sends DC signal current (3.2 ma) indicating an intercom ringing call, i.e., one which is to be answered via the handset hybrid circuit instead of the speakerphone at the called station, then voltage comparator 280 will also generate an output, which is fed to terminal B3 of microcomputer 216 as an ICM RING CALL signal. In response, the microcomputer 216 generates a latch command at terminal D5 instead of a SPLASH TONE ENABLE signal at terminal A1. The latch command is fed to the function latches 236 (FIG. 3) along with address data and write enable strobe data. Function latches 236 are formed by one eight-bit latch (CD4099BE) which acts as a demultiplexer of the three streams of received data in the same manner as crosspoint latches 224. In response to the aforementioned latch command, an ICM RING TONE ENABLE signal is generated and fed to B-port switching circuit 246 (1) to turn on JCT FETs 288 and 296 to allow passage of ICM RING TONE to the called party through normally-conductive MOSFET 287 and to the calling party through transformer 270 in the link B-port 240, and (2) to turn off JCT FET 289 through inverting OR gate 290 to block any PAGE or BGM transmission.

Upon termination of either the SPLASH TONE ENABLE signal or the ICM RING TONE ENABLE signal, a LINK ENABLE signal is generated at terminal D2 of microcomputer 216 to turn on MOSFET 283 in seize control circuit 242. The LINK ENABLE signal is also applied as an input to inverting OR gate 286 in B-port switching circuit 246, thereby turning on MOSFET 287 and causing inverter 285 to turn on MOSFET 284. Thus, a path is closed for the transmission of voice signals via transformer 270, MOSFET 283, attenuator 244, and MOSFET 284 to the B-pair communication channel. The LINK SEIZE signal is also applied to the positive input terminal of operational amplifier 276 connected as a voltage follower with its negative input and its output tied to the emitter and base, respectively, of transistor causing its emitter to 275 become more positive. Thus, a DC voltage signal (−2 v.) indicating seizure is generated at the emitter of transistor 275 and is applied through resistor 272 and its parallel winding of transformer 270 to the LINK conductor for transmission to the link.

If a call coming in to link B-port 240 is answered at an alternate station set by dialing the called station set extension number with a prefix code number, the alternate station set is connected to the seizing link through the link B-port 240 of the called station set. Under these conditions, the seizing link will generate a call steal DC current signal (3.2 ma) which causes comparator 281 to generate on output which is fed to terminal B4 as a CALL STEAL signal in response to which the microcomputer 216 prevents user access to the B-pair communication channel of the called station set. The CALL STEAL signal is also applied to the call steal timer circuit 282 to reset it. The call steal timer circuit starts to run for a predetermined period of time (e.g., 30 seconds) whenever it receives a LINK SEIZE signal, and while it is running it biases the positive input terminal of operational amplifier 276 so as to allow the generation of a DC voltage signal at the emitter of transistor 275 indicating seizure of the link B-port, thereby enabling the call from the link to be "stolen" by preemptively seizing the link B-port·240 via an active port in an alternate station set. The call steal timer circuit is also reset by the LINK ENABLE signal from terminal D2 of the microcomputer 216 so as to prevent an answered call from being "stolen", thereby preserving the called user's privacy.

The PAGE and BGM signals are received from the page and tone cards, respectively, and are controlled by JCT FETS 291 and 292, respectively, which are normally conductive when PAGE ENABLE and BGM ENABLE signals are applied to their respective gate electrodes. These enabling signals are generated by function latches array 236 in response to latch commands issued at terminal D5 of microcomputer 216 in response to data received at terminal A0 from the associated station set 100. A combination on/off/volume switch in the station set 100 controls the generation of the BGM ENABLE signal by the associated station circuit 200; when the switch is off, the signal will not be generated, and when the switch is on, the signal will be generated. The PAGE ENABLE signal will normally be generated in each station circuit 200, but will be terminated upon seizure of the page card through a link card or directly from the station card in response to requests from the station set.

CO AUDIBLE is a signal which is continuously generated within the EKTS on the tone card 500 (FIG. 6) for transmission to the internal speaker in the station set upon receipt of a C.O. AUDIBLE ENABLE signal at the gate electrode of JCT FET 295. These enabling signals are also received from the tone card 500 in response to INCOMING CALL ENABLE signals generated by the various line cards 300 (FIG. 5) in response to a ringing signal from the Central Office.

The program listing which follows on pages 21-44 is the sequence of instructions stored in microcomputer 216 of each station card 200 (FIG. 3). Each ROM address (LOC) with machine operation code (CODE) followed by the assembly language instruction of the program is included in the listing. The assembly language instructions are explained in detail in the manufacturer's Data Sheet entitled "Part No. R6500/1 Microcomputer System", Document No. 29000D51, Revision 2, dated October 1978 and published by the Rockwell International Corporation. The Symbol Table on pp. 45–46 includes four columns of program symbols on each page, with the value of each symbol listed at the right side of each symbol.

```
LINE # LOC   CODE    LINE 0002  0000            *=$0800
0003  0800           FUNMUX =$0002
0004  0800           HFENAB =$0003
0005  0800           LNKMUX =$0005
0006  0800           MUX=$002E
0007  0800           WD0=$0006
0008  0800           WD1=$0007
0009  0800           WD2=$0008
0010  0800           WD3=$0009
0011  0800           WD4=$000A
0012  0800           WD5=$000B
0013  0800           WD6=$000C
0014  0800           WD7=$000D
0015  0800           WD8=$000E
0016  0800           WD9=$000F
0017  0800           WD10=$0010
0018  0800           WD11=$0011
0019  0800           WD12=$0012
0020  0800           WD13=$0013
0021  0800           WD14=$0014
0022  0800           WD15=$0015
0023  0800           WD16=$0016
0024  0800           WD17=$0017
0025  0800           WD18=$0018
0026  0800           WD19=$0019
0027  0800           WD20=$001A
0028  0800           WD21=$001B
0029  0800           WD22=$001C
0030  0800           WD23=$001D
0031  0800           WD24=$001E
0032  0800           WD25=$001F
0033  0800           WD26=$0020
0034  0800           WD27=$0021
0035  0800           WD28=$0022
0036  0800           WD29=$0023
0037  0800           WD30=$0024
0038  0800           WD31=$0025
0039  0800           KYHOLD = WD7
0040  0800           KYPREL = WD11
0041  0800           KYHFRE = WD19
0042  0800           KYANS  = WD19
0043  0800           KYPAGE = WD30
0044  0800           KYCONT = WD27
0045  0800           KYFLS8 = WD15
0046  0800           KYSFU  = WD3
0047  0800           KYBPSS = WD2
0048  0800           KYHKSW = WD0
0049  0800           STUS1  = $0031
0050  0800           STUS=$0026
0051  0800           INDX5=$0028
0052  0800           INDX4=$0027
0053  0800           FNIX1=$0029
0054  0800           ITMR=$002A
0055  0800           INDX1=$002B
0056  0800           INDX2=$002C
```

| LINE # | LOC | CODE | LINE | | |
|---|---|---|---|---|---|
| 0057 | 0800 | | CURSTA=$002D | | |
| 0058 | 0800 | | PT32A=$80 | | |
| 0059 | 0800 | | DIPT3A=$81 | | |
| 0060 | 0800 | | PT32B=$82 | | |
| 0061 | 0800 | | DIPT3B=$83 | | |
| 0062 | 0800 | | PT22A=$C1 | | |
| 0063 | 0800 | | DIPT2A=$C3 | | |
| 0064 | 0800 | | PT22B=$C0 | | |
| 0065 | 0800 | | DIPT2B=$C2 | | |
| 0066 | 0800 | | ULTCH=$C7 | | |
| 0067 | 0800 | | LLTCH=$C6 | | |
| 0068 | 0800 | | UPCT=$C5 | | |
| 0069 | 0800 | | LOWCT=$C4 | | |
| 0070 | 0800 | | LDLTCH=$C5 | | |
| 0071 | 0800 | | T1CT=$C1 | | |
| 0072 | 0800 | | CLINT1=$C0 | | |
| 0073 | 0800 | | TIFL=$CD | | |
| 0074 | 0800 | | INTBT=$CE | | |
| 0075 | 0800 | | ARC=$CB | | |
| 0076 | 0800 | | PRC=$CC | | |
| 0077 | 0800 | | MSCTR =$32 | MASTER LOOP COUNTER | |
| 0078 | 0800 | D8 | PWON | CLD | CLEARS DECIMAL MODE |
| 0079 | 0801 | A2 3F | RESET | LDX #$3F | |
| 0080 | 0803 | 9A | | TXS | |
| 0081 | 0804 | A9 00 | ZROLP | LDA #$00 | |
| 0082 | 0806 | 95 00 | | STA $00,X | |
| 0083 | 0808 | CA | | DEX | |
| 0084 | 0809 | 10 F9 | | BPL ZROLP | |
| 0085 | 080B | E8 | | INX | ;X=0 |
| 0086 | 080C | 86 2B | | STX INDX1 | ;SET UP INDEX POINTERS |
| 0087 | 080E | A9 40 | | LDA #$40 | ;FOR INDIRECT MODE |
| 0088 | 0810 | 85 2C | | STA INDX1+1 | |
| 0089 | 0812 | BD 01 09 | RSTLP | LDA SUPTBL,X | |
| 0090 | 0815 | BC 02 09 | | LDY SUPTBL+1,X | |
| 0091 | 0818 | 91 2B | | STA (INDX1),Y | ;WRITE PORT CONTROL BITS |
| 0092 | 081A | E8 | | INX | |
| 0093 | 081B | E8 | | INX | |
| 0094 | 081C | E0 18 | | CPX #ENDTBL-SUPTBL+1 | ;ALL DONE? |
| 0095 | 081E | D0 F2 | | BNE RSTLP | |
| 0096 | 0820 | 58 | | CLI | |
| 0097 | 0821 | A9 40 | | LDA #$40 | ; SETS RELEASE REQ TO INIT XPOINTS |
| 0098 | 0823 | 85 26 | | STA STUS | |
| 0099 | 0825 | 20 6C 08 | SYNC | JSR OUTHI | |
| 0100 | 0828 | A9 08 | | LDA #$08 | |
| 0101 | 082A | 05 80 | | ORA PT32A | |
| 0102 | 082C | 85 80 | | STA PT32A | ; SYNC PULSE HIGH |
| 0103 | 082E | A2 00 | | LDX #$00 | |
| 0104 | 0830 | | ; ZERO X REGESTER (WD CTR) | | |
| 0105 | 0830 | 20 79 08 | | JSR INITDL | |
| 0106 | 0833 | A9 F7 | | LDA #$F7 | |
| 0107 | 0835 | 25 80 | | AND PT32A | |
| 0108 | 0837 | 85 80 | | STA PT32A | ; SYNC PULSE LOW |
| 0109 | 0839 | 20 86 08 | | JSR SYLP1 | ;WAIT FOR "1" |
| 0110 | 083C | A9 7F | SYCT1 | LDA #$7F | |
| 0111 | 083E | 85 CE | | STA INTBT | |

```
LINE # LOC    CODE       LINE 0112  0840  20 C3 08              JSR SYBY
0113  0843  20 86 08              JSR SYLP1     ;WAIT FOR "2"
0114  0846  20 E7 0D              JSR BPORT
0115  0849  20 40 0F              JSR SHSH
0116  084C  A5 31                 LDA STUS1
0117  084E  29 FC                 AND #$FC
0118  0850  85 31                 STA STUS1
0119  0852  24 CD      SYNC1A BIT TIFL
0120  0854  50 FC                 BVC SYNC1A
0121  0856  A5 C4                 LDA LOWCT
0122  0858  20 73 08   SYNC2  JSR OUTLO
0123  085B  A9 02                 LDA #$2
0124  085D  85 2A                 STA TTMR      ;REPAIR TTMR
0125  085F  A9 90                 LDA #$90
0126  0861  A0 00                 LDY #$00
0127  0863  20 8A 08              JSR SYLP2
0128  0866  20 DE 08   SYNC5  JSR TTIME
0129  0869  4C 19 09              JMP START
0130  086C  A9 F7      OUTHI  LDA #$F7      ; SIGNAL GOES TO -5V (DATA 1 LEVEL)
0131  086E  25 C0                 AND PT22B
0132  0870  85 C0      OUTHI0 STA PT22B
0133  0872  60                    RTS
0134  0873  A9 08      OUTLO  LDA #$08      ; SIGNAL GOES TO GND (DATA 0 LEVEL)
0135  0875  05 C0                 ORA PT22B
0136  0877  D0 F7                 BNE OUTHI0    ;BRANCH ALWAYS
0137  0879  A9 99      INITCL LDA #<DIALST  ;*******INSERT VECTOR LO ADDR*****
0138  087B  48                    PHA
0139  087C  A9 08                 LDA #>DIALST  ;********INSERT VECTOR HI ADDR*****
0140  087E  85 28      INIT   STA INDX5
0141  0880  68                    PLA
0142  0881  85 27                 STA INDX4
0143  0883  A9 EE                 LDA #$EE      ; IRQ ON NEG. TRANS
0144  0885  85 CC                 STA PRC
0145  0887  A5 CD      INTEA  LDA TIFL      ;CLEARS INT FLAG REG.
0146  0889  A9 82                 LDA #$82      ,SETS CA1 INT. ENABLE
0147  088B  85 CE                 STA INTBT
0148  088D  60                    RTS
0149  088E  A9 A6      INITRP LDA #<RESPST  ;******* INSERT VECTOR LO ADDR. ****
0150  0890  48                    PHA
0151  0891  A9 08                 LDA #>RESPST  ;******* INSERT VECTOR HI ADDR. ****
0152  0893  4C 7E 08              JMP INIT
0153  0896  6C 27 00   DINT   JMP (INDX4)
0154  0899  48         DIALST PHA
0155  089A  A9 FE                 LDA #$FE      ; INDEXED TO START HERE FOR DIAL
0156  089C  25 80                 AND PT32A
0157  089E  85 80                 STA PT32A
0158  08A0  E6 26                 INC STUS
0159  08A2  A5 C1      INTRTN LDA T1CT      , CLEARS IFR
0160  08A4  68                    PLA
0161  08A5  40                    RTI
0162  08A6  48         RESPST PHA
0163  08A7  46 26                 LSR STUS      ; INDEX HERE FOR RESPONSE
0164  08A9  38                    SEC
0165  08AA  26 26                 ROL STUS      ,SET LSB STUS
0166  08AC  D0 F4                 BNE INTRTN    ,BRANCH ALWAYS
```

```
LINE # LOC    CODE        LINE 0167  08AE   A9 00      T1P5T  LDA #$00
0168  08B0   85 2A             STA TTMR
0169  08B2   A9 C8             LDA #$C8
0170  08B4   D0 0A             BNE STLLTH
0171  08B6   A9 40      SYLP1  LDA #$40         ;GET LSB
0172  08B8   A0 02             LDY #$2          ;GET MSB
0173  08BA   24 CD      SYLP2  BIT TIFL         ;WAIT FOR TIMEOUT
0174  08BC   50 FC             BVC SYLP2
0175  08BE   84 C7      STLTCH STY ULTCH        ;SET UPPER LATCH
0176  08C0   85 C6      STLLTH STA LLTCH
0177  08C2   60                RTS
0178  08C3   A5 26      SYBY   LDA STUS
0179  08C5   6A                ROR A
0180  08C6   B0 06             BCS SYBY1
0181  08C8   A9 01             LDA #$01         ;SET LSB
0182  08CA   05 80             ORA PT32A
0183  08CC   85 80             STA PT32A
0184  08CE   46 26      SYBY1  LSR STUS
0185  08D0   18                CLC
0186  08D1   26 26             ROL STUS
0187  08D3   60                RTS
0188  08D4   A0 09      DLY0   LDY #$09         TIME DELAY OF 72 CYCLES
0189  08D6   D0 02             BNE DLY0
0190  08D8   A0 07      DLY2   LDY #$07         TIME DELAY OF 57 CYCLES
0191  08DA   88         DLY0   DEY
0192  08DB   D0 FD             BNE DLY0
0193  08DD   60                RTS
0194  08DE   24 CD      TTIME  BIT TIFL
0195  08E0   50 FC             BVC TTIME
0196  08E2   E6 2A             INC TTMR
0197  08E4   A5 C4             LDA LOWCT
0198  08E6   A5 2A             LDA TTMR
0199  08E8   C9 03             CMP #$3
0200  08EA   F0 C2             BEQ T1P5T
0201  08EC   C9 01             CMP #$01         ;START OF T3?
0202  08EE   F0 07             BEQ T2P5T        ;SET LATCH=2*T
0203  08F0   A9 81      T1T    LDA #$81
0204  08F2   A0 00             LDY #$00
0205  08F4   4C BE 08          JMP STLTCH
0206  08F7   A9 77      T2P5T  LDA #$77         ;SET UP 2-0S$Q@ELOUT
0207  08F9   A0 01             LDY #$01
0208  08FB   4C BE 08          JMP STLTCH
0209  08FE   F0         ADSTB  .BYT $F0         ;STROBE ADD1
0210  08FF   E8                .BYT $E8         ;       ADD2
0211  0900   D8                .BYT $D8         ;       ADD3
0212  0901   7F         SUPTBL .BYT $7F
0213  0902   CE                .BYT <INT6T      ;CLEAR INT. ENAB. REG
0214  0903   40                .BYT $40
0215  0904   CB                .BYT <ARC        ;INITIALIZE AXIL CONTROL REG.
0216  0905   EF                .BYT $EF
0217  0906   CC                .BYT <PPC        ;INITIALIZE PERIF. CONTROL REGISTER
0218  0907   48                .BYT $48
0219  0908   C6                .BYT <LLTCH      ;TIMER COUNTDOWN IN HEX(MICROSEC)
0220  0909   00                .BYT $00
0221  090A   C5                .BYT <LULTCH     ;TIMER HIGH BYTE
```

```
LINE # LOC    CODE       LINE 0222  090B  FF                  .BYT $FF
0223  090C  C3                  .BYT <DIPT2A    ;SET OUTPUTS
0224  090D  FF                  .BYT $FF
0225  090E  C2                  .BYT <DIPT2B
0226  090F  FF                  .BYT $FF
0227  0910  81                  .BYT <DIPT3A
0228  0911  C8                  .BYT $C8
0229  0912  C1                  .BYT <PT22A     ;INITIALIZE MUX LINES
0230  0913  08                  .BYT $08
0231  0914  C0                  .BYT <PT22B     ;INITIALIZE MUX AND ENABLE LINES
0232  0915  03                  .BYT $03
0233  0916  80                  .BYT <PT32A     ;INITIALIZE CURRENT GEN. & I/O
0234  0917  DD                  .BYT $DD
0235  0918  C0         ENDTBL   .BYT <PT22B
0236  0919  20 6C 08   START    JSR OUTHI
0237  091C  E0 1F               CPX #$1F        ;WD31-WD0
0238  091E  D0 07               BNE LSMX
0239  0920  A4 05               LDY LNKMUX
0240  0922  B9 93 09            LDA ATBL1,Y
0241  0925  85 2E               STA MUX
0242  0927  A5 2E      LSMX     LDA MUX
0243  0929  4A                  LSR A
0244  092A  4A                  LSR A
0245  092B  4A                  LSR A
0246  092C  29 07               AND #$7         ;MASK MUX BITS
0247  092E  A0 00               LDY #$0         ;SET UP Y FOR TABLE LOOKUP
0248  0930  24 2E               BIT MUX         ;PREPARE TO COMPUTE Y INDEX
0249  0932  70 03               BVS ADD2
0250  0934  10 02               BPL ADD1
0251  0936  C8         ADD3     INY
0252  0937  C8         ADD2     INY
0253  0938  19 FE 08   ADD1     ORA ADSTB,Y
0254  093B  85 C1               STA PT22A
0255  093D  20 DE 08            JSR TTIME
0256  0940  B5 06               LDA WD0,X
0257  0942  30 03               BMI MRG1
0258  0944  20 73 08   SHORT    JSR OUTLO
0259  0947  20 79 08   MRG1     JSR INITDL
0260  094A  20 DE 08   LOP1     JSR TTIME
0261  094D  A9 7F      CTU1     LDA #$7F
0262  094F  25 CE               AND INTBT
0263  0951  85 CE               STA INTBT
0264  0953  20 73 08            JSR OUTLO
0265  0956  20 C3 08            JSR SYBY
0266  0959  20 8E 08            JSR INITRP
0267  095C  20 D8 0D            JSR WSRF
0268  095F  20 DE 08            JSR TTIME
0269  0962  A9 7F      CTU2     LDA #$7F
0270  0964  85 CE               STA INTBT
0271  0966  A5 26               LDA STUS
0272  0968  4A                  LSR A
0273  0969  B0 1A               BCS INCT        ;BRANCH IF INT. OCCURRED
0274  096B  20 97 09            JSR TCTR3       ;TEST FOR RESP. CTR=3?
0275  096E  F0 05               BEQ CTU4        ;BRANCH IF = 3
0276  0970  A9 F8               LDA #$F8        ;ZERO CTR.
```

```
LINE # LOC    CODE           LINE 0277  0972  20 9E 09                JSR BITCLR
0278  0975  46 26          CTU4     LSR STUS       ; RESET INT1 FLAG
0279  0977  18                      CLC
0280  0978  26 26                   ROL STUS
0281  097A  E0 1F                   CPX #$1F
0282  097C  F0 04                   BEQ SYNCA
0283  097E  E8                      INX
0284  097F  4C 19 09                JMP START
0285  0982  4C 25 08       SYNCA    JMP SYNC
0286  0985  20 97 09       INCT     JSR TCTR3
0287  0988  F0 EB                   BEQ CTU4
0288  098A  C9 07                   CMP #$07       ; TEST SERVICED BIT
0289  098C  F0 E7                   BEQ CTU4       ; BRANCH IF SERVICED
0290  098E  F6 06                   INC WD0,X      ;  INCREMENT RESPONCE CTR.
0291  0990  4C 75 09                JMP CTU4
0292  0993  B8             ATBL1    .BYT CP24
0293  0994  A8                      .BYT CP22
0294  0995  98                      .BYT CP20
0295  0996  78                      .BYT CP16
0296  0997                          .FILE LSSUB/1
0297  0997  B5 06          TCTR3    LDA WD0,X      ; TEST RESPONSE COUNTER=3?
0298  0999  29 07          CTR3     AND #$7
0299  099B  C9 03                   CMP #$3
0300  099D  60             DELY     RTS
0301  099E  35 06          BITCLR   AND WD0,X      ;CLEAR BITS IN WD0 INDEXED
0302  09A0  95 06          BITOP    STA WD0,X
0303  09A2  60                      RTS
0304  09A3  15 06          BITSET   ORA WD0,X      ;SET BITS
0305  09A5  D0 F9                   BNE BITOP      ;BRANCH ALWAYS
0306  09A7                          ; CONTROL FUNCTION LATCHES
0307  09A7  05 C0          STB32A   ORA PT22B
0308  09A9  85 C0                   STA PT22B
0309  09AB  A5 80                   LDA PT32A
0310  09AD  49 02                   EOR #$2
0311  09AF  85 80                   STA PT32A
0312  09B1  49 02                   EOR #$2
0313  09B3  85 80                   STA PT32A
0314  09B5  60                      RTS
0315  09B6                          ; SET OR CLEAR DATA LINE
0316  09B6  A5 C0          SDL      LDA PT22B
0317  09B8  09 20                   ORA #$20
0318  09BA  D0 04                   BNE DL0
0319  09BC  A5 C0          CDL      LDA PT22B
0320  09BE  29 DF                   AND #$DF
0321  09C0  85 C0          DL0      STA PT22B
0322  09C2  60                      RTS
0323  09C3                          .FILE LCOSEZ/1
0324  09C3                          DELAY=$002F
0325  09C3  A4 26          COSZ     LDY STUS       ; TEST RELEASE BIT
0326  09C5  30 2F                   BMI TNOF       ;BRANCH TO TURN OFF
0327  09C7  20 97 09                JSR TCTR3
0328  09CA  F0 41                   BEQ TNON       ;=3
0329  09CC  C9 01                   CMP #$01
0330  09CE  D0 0B                   BNE COSZ0
0331  09D0  B5 06                   LDA WD0,X
```

```
LINE # LOC    CODE         LINE 0332  0902  29 20                  AND  #$20
0333  0904  D0 05                  BNE  COSZ0
0334  0906  98            SRRBIT   TYA              ; SET REL REQ BIT CTR=1
0335  0907  09 40                  ORA  #$40
0336  0909  85 26                  STA  STUS
0337  090B  B5 06         COSZ0    LDA  WD0,X       ; TEST I HOLD PROTECT BIT
0338  090D  2A                     ROL  A
0339  090E  10 0D                  BPL  IHP0
0340  09E0  A5 82         IHP1     LDA  PT32B       ; FORCE D0 INTO CARRY
0341  09E2  4A                     LSR  A
0342  09E3  B0 05                  BCS  EXIT5
0343  09E5  A9 BF                  LDA  #$BF        ; CLEAR I HOLD PROTECT BIT
0344  09E7  20 9E 09      IHP      JSR  BITCLR
0345  09EA  4C 6E 0C      EXIT5    JMP  LAMP
0346  09ED  A5 82         IHP0     LDA  PT32B
0347  09EF  4A                     LSR  A
0348  09F0  90 F8                  BCC  EXIT5
0349  09F2  A9 87                  LDA  #$87        ; RESET I HOLD
0350  09F4  D0 F1                  BNE  IHP
0351  09F6  20 97 09      TNOF     JSR  TCTR3       ; TEST RESP. CTR=3?
0352  09F9  D0 05                  BNE  ARCOS
0353  09FB  A9 04                  LDA  #$04        ; SET SERV BIT, &TRIG BIT
0354  09FD  20 A3 09               JSR  BITSET
0355  0A00  A9 DF         ARCOS    LDA  #$DF        ; RESET I SEIZE
0356  0A02  20 9E 09               JSR  BITCLR
0357  0A05  98                     TYA              ; RESET CONF BIT + DIAL ENA REQ
0358  0A06  29 07                  AND  #$07
0359  0A08  85 26                  STA  STUS
0360  0A0A                         ; OPEN CROSS POINTS
0361  0A0A  4C F8 0B               JMP  OPENXP
0362  0A0D  98            TNON     TYA              ; GET STATUS
0363  0A0E  29 04                  AND  #$04        ; TEST OFF HOOK BIT
0364  0A10  F0 D8                  BEQ  EXIT5
0365  0A12  A9 04         STSER    LDA  #$04
0366  0A14  20 A3 09               JSR  BITSET      ; SET SERVICED BIT
0367  0A17  A5 19                  LDA  KYHFRE
0368  0A19  30 CF                  BMI  EXIT5
0369  0A1B  A5 82                  LDA  PT32B       ; TEST D1
0370  0A1D  4A                     LSR  A
0371  0A1E  B0 CA                  BCS  EXIT5       ; D1=1 BUSY
0372  0A20  20 EC 0A      CLSXPT   JSR  IOFF        ; TURN OFF IGEN
0373  0A23  20 4E 0A               JSR  CLOSEX      ; TOGGLE CRSPT ENB
0374  0A26  98                     TYA              ; GET STATUS
0375  0A27  29 20                  AND  #$20
0376  0A29  F0 0F                  BEQ  SCBT,BRA CONF BIT NOT SET
0377  0A2B  B5 06                  LDA  WD0,X
0378  0A2D  29 08                  AND  #$08
0379  0A2F  F0 B9                  BEQ  EXIT5,RIVERSIDE
0380  0A31  98                     TYA              ; RESET DIAL ENAB REQ BIT
0381  0A32  29 F7                  AND  #$F7
0382  0A34  85 26                  STA  STUS
0383  0A36  A9 40                  LDA  #$40        ; CONF ON
0384  0A38  D0 02                  BNE  COSZ1       ; BRANCH ALWAYS
0385  0A3A  A9 20         SCBT     LDA  #$20        ; SEIZE ON ONLY
0386  0A3C  20 82 0A      COSZ1    JSR  IPORT
```

| LINE # | LOC | CODE | LINE | | |
|---|---|---|---|---|---|
| 0387 | 0A3F | 98 | | TYA | ;SET CONF. BIT + DIAL ENA REQ + SEIZE BIT |
| 0388 | 0A40 | 09 38 | | ORA #$38 | |
| 0389 | 0A42 | 85 26 | | STA STUS | |
| 0390 | 0A44 | A9 20 | | LDA #$20 | ;SET I SEIZE BIT |
| 0391 | 0A46 | 15 06 | | ORA WD0,X | |
| 0392 | 0A48 | 29 F7 | | AND #$F7 | ;CLEAR I HOLD BIT |
| 0393 | 0A4A | 95 06 | | STA WD0,X | |
| 0394 | 0A4C | D0 9C | | BNE EXIT5 | |
| 0395 | 0A4E | A5 C0 | CLOSEX | LDA PT22B | ;SET XPT |
| 0396 | 0A50 | 09 20 | | ORA #$20 | |
| 0397 | 0A52 | 85 C0 | | STA PT22B | |
| 0398 | 0A54 | A5 C1 | SXPT | LDA PT22A | ;READ MUX DATA |
| 0399 | 0A56 | 49 38 | | EOR #$38 | |
| 0400 | 0A58 | 29 38 | ASXPT | AND #$38 | ;INVERT SELECT BITS |
| 0401 | 0A5A | 18 | | CLC | |
| 0402 | 0A5B | 2A | | ROL A | |
| 0403 | 0A5C | 2A | | ROL A | |
| 0404 | 0A5D | 2A | | ROL A | |
| 0405 | 0A5E | B0 0B | | BCS ROLOVR | ;TEST FOR ENAB6 |
| 0406 | 0A60 | 48 | STROBA | PHA | |
| 0407 | 0A61 | 45 C1 | | EOR PT22A | ;TOGGLE ENAB |
| 0408 | 0A63 | 85 C1 | | STA PT22A | |
| 0409 | 0A65 | 68 | | PLA | |
| 0410 | 0A66 | 45 C1 | | EOR PT22A | |
| 0411 | 0A68 | 85 C1 | | STA PT22A | |
| 0412 | 0A6A | 60 | | RTS | |
| 0413 | 0A6B | A9 40 | ROLOVR | LDA #$40 | ;SET ENAB6 MASK |
| 0414 | 0A6D | 48 | STROBB | PHA | |
| 0415 | 0A6E | 45 C0 | | EOR PT22B | |
| 0416 | 0A70 | 85 C0 | | STA PT22B | |
| 0417 | 0A72 | 68 | | PLA | |
| 0418 | 0A73 | 45 C0 | | EOR PT22B | |
| 0419 | 0A75 | 85 C0 | | STA PT22B | |
| 0420 | 0A77 | 60 | | RTS | |
| 0421 | 0A78 | | .FILE LPRREL/1 | | |
| 0422 | 0A78 | | TMP1 | =$29 | |
| 0423 | 0A78 | A5 2D | RESPRT | LDA CURSTA | ;RESTORE PREVIOUS CURRENT VALUE |
| 0424 | 0A7A | 48 | IIPORT | PHA | ;SAVE UPDATED CURRENT VALUE |
| 0425 | 0A7B | A9 0F | | LDA #$0F | ;RESET CURRENT GENERATOR |
| 0426 | 0A7D | 25 80 | | AND PT32A | |
| 0427 | 0A7F | 85 80 | | STA PT32A | |
| 0428 | 0A81 | 68 | | PLA | ;SET UPDATED CURRENT VALUE |
| 0429 | 0A82 | 05 80 | IPORT | ORA PT32A | |
| 0430 | 0A84 | 85 80 | | STA PT32A | |
| 0431 | 0A86 | 60 | | RTS | ; ;END ISOLATE I PORT ROUTINE |
| 0432 | 0A87 | 04 | XREF | .BYT WD4-WD0 | |
| 0433 | 0A88 | 05 | | .BYT WD5-WD0 | |
| 0434 | 0A89 | 06 | | .BYT WD6-WD0 | |
| 0435 | 0A8A | 08 | | .BYT WD8-WD0 | |
| 0436 | 0A8B | 09 | | .BYT WD9-WD0 | |
| 0437 | 0A8C | 0A | | .BYT WD10-WD0 | |
| 0438 | 0A8D | 0C | | .BYT WD12-WD0 | |
| 0439 | 0A8E | 0D | | .BYT WD13-WD0 | |
| 0440 | 0A8F | 0E | | .BYT WD14-WD0 | |
| 0441 | 0A90 | 10 | | .BYT WD16-WD0 | |

```
LINE # LOC    CODE         LINE 0442  0A91   11                  .BYT WD17-WD0
0443  0A92   12                  .BYT WD18-WD0
0444  0A93   14                  .BYT WD20-WD0
0445  0A94   15                  .BYT WD21-WD0
0446  0A95   16                  .BYT WD22-WD0
0447  0A96   18                  .BYT WD24-WD0
0448  0A97   19                  .BYT WD25-WD0
0449  0A98   1A                  .BYT WD26-WD0
0450  0A99   1C                  .BYT WD28-WD0
0451  0A9A   1D                  .BYT WD29-WD0
0452  0A9B   1E                  .BYT WD30-WD0
0453  0A9C                 ; PRIVACY RELEASE RTN
0454  0A9C                 ;
0455  0A9C                 ;
0456  0A9C   24 11    PREL   BIT KYPREL     ;TEST PR TIMER BIT
0457  0A9E   70 36           BVS PTOUT      ;BRANCH ON PR TIMER TIMEOUT
0458  0AA0   20 97 09        JSR TCTR3
0459  0AA3   D0 4C           BNE PTSTR      ;BRA ON CTR NOT EQU. TO 3
0460  0AA5   A5 80           LDA PT32A
0461  0AA7   29 20           AND #$20        ;ISOLATE SEIZE BIT
0462  0AA9   85 2D           STA CURSTA
0463  0AAB   4A              LSR A           ;SHIFT SEIZE BIT TO HOLD BIT POSITION
0464  0AAC   20 7A 0A        JSR IIPORT
0465  0AAF   A5 11           LDA KYPREL     ;SET PREL TIMER START BIT
0466  0AB1   09 24           ORA #$24       ;SET SERVICED BIT + TIMER START
0467  0AB3   85 11    PSTH3  STA KYPREL
0468  0AB5   A0 09           LDY #$09
0469  0AB7   8A       REL0   TXA
0470  0AB8   48              PHA
0471  0AB9   4C C0 0A        JMP PSTH0
0472  0ABC   C0 09    PSIHLD CPY #$09
0473  0ABE   F0 13           BEQ PSTH1
0474  0AC0   BE 87 0A PSTH0  LDX XREF,Y
0475  0AC3   B5 06           LDA WD0,X
0476  0AC5   29 20           AND #$20       ;IF I SEIZE BIT SET
0477  0AC7   F0 07           BEQ PSTH2      ;SET IHOLD PROTECT & IHOLD BITS
0478  0AC9   86 29           STX TMP1
0479  0ACB   A9 48           LDA #$48
0480  0ACD   20 A3 09        JSR BITSET
0481  0AD0   88       PSTH2  DEY
0482  0AD1   10 E9           BPL PSIHLD
0483  0AD3   68       PSTH1  PLA
0484  0AD4   AA              TAX             ;RESTORE X
0485  0AD5   60       PMIDT5 RTS
0486  0AD6   A5 11    PTOUT  LDA KYPREL
0487  0AD8   29 07           AND #$7        ;MASK CTR BITS
0488  0ADA   D0 10           BNE IOFF       ;BRANCH ON CTR=0
0489  0ADC   20 78 0A        JSR RESPRT     ;GO TO RESTORE PORT ROUTINE
0490  0ADF   A9 3F           LDA #$3F       ;ZERO PR TIMER ST + TIMEOUT
0491  0AE1   20 9E 09        JSR BITCLR
0492  0AE4   A4 29           LDY TMP1
0493  0AE6   A9 A0           LDA #$A0
0494  0AE8   99 06 00        STA WD0,Y
0495  0AEB   60              RTS
0496  0AEC   A9 00    IOFF   LDA #$0        ;TURN OFF ALL CURRENT GENERATORS
```

```
LINE # LOC    CODE       LINE 0497  0AEE  4C 7A 0A           JMP IIPORT
0498  0AF1  A5 11       PTSTR  LDA KYPREL       ;TEST PREL TIMER START BIT
0499  0AF3  29 20              AND #$20
0500  0AF5  F0 DE              BEQ PMIDTS
0501  0AF7  A9 67              LDA #$67         ;SET PRSB,PRTB,SB,RC=3
0502  0AF9  A0 15              LDY #$15         ;SERVICE 2ND HALF CO SEIZE
0503  0AFB  D0 B6              BNE PSTH3
0504  0AFD              .FILE LHLDSR/1
0505  0AFD              ; HOLD SERVICE ROUTINE
0506  0AFD              ;
0507  0AFD              ;
0508  0AFD  24 02       HSRTN  BIT FUNMUX       ;TEST FUNMUX BIT 6
0509  0AFF  70 0C              BVS DSSHLD
0510  0B01  A4 0D              LDY KYHOLD
0511  0B03  98                 TYA
0512  0B04  29 20              AND #$20
0513  0B06  D0 05              BNE DSSHLD
0514  0B08  98                 TYA
0515  0B09  09 03              ORA #$3
0516  0B0B  85 0D              STA KYHOLD
0517  0B0D  24 0D       DSSHLD BIT KYHOLD       ;TEST HOLD TIMER BIT
0518  0B0F  70 14              BVS HTOUT        ;BRA ON HOLD TIMER TIMEOUT
0519  0B11  20 97 09           JSR TCTR3
0520  0B14  D0 1B              BNE HTSTR        ;BRA ON CTR NOT EQU. TO 3
0521  0B16  A9 10              LDA #$10         ;TURN ON I HOLD
0522  0B18  20 82 0A           JSR IPORT
0523  0B1B  98                 TYA              ;SET HOLD TIMER START BIT
0524  0B1C  09 24              ORA #$24         ;SET SERVICED BIT
0525  0B1E  A0 09              LDY #$09
0526  0B20  85 0D       REL1   STA KYHOLD
0527  0B22  4C 87 0A           JMP REL0
0528  0B25  20 EC 0A    HTOUT  JSR IOFF
0529  0B28  A9 9F              LDA #$9F
0530  0B2A  20 9E 09           JSR BITCLR       ;ZERO HOLD TIMERS
0531  0B2D  20 EE 0F           JSR RELRQ        ;SET RELEASE REQUEST BIT
0532  0B30  60          HMIDTS RTS
0533  0B31  A5 0D       HTSTR  LDA KYHOLD       ;TEST HOLD TIMER START BIT
0534  0B33  29 20              AND #$20
0535  0B35  F0 F9              BEQ HMIDTS
0536  0B37  A9 67              LDA #$67         ;SET HTSB,HTTB,SB,RC=3
0537  0B39  A0 15              LDY #$15         ;SERVICE 2ND HALF CO SEIZE
0538  0B3B  4C 20 0B           JMP REL1
0539  0B3E              .FILE LRELDL/1
0540  0B3E              KYMUSC = WD1
0541  0B3E  A9 FA       RELDL  LDA #$FA
0542  0B40  85 C1              STA PT22A
0543  0B42  A9 7F              LDA #$7F
0544  0B44  25 C0              AND PT22B
0545  0B46  85 C0              STA PT22B
0546  0B48  26 26              ROL STUS         ;WORD2 RELEASE & DIAL ENA
0547  0B4A  18                 CLC
0548  0B4B  66 26              ROR STUS
0549  0B4D  B5 06       TRSB   LDA WD0,X        ;TEST RELEASE SERVICED BIT
0550  0B4F  29 20              AND #$20
0551  0B51  F0 13              BEQ TRR8         ;BRANCH IF BIT=0
```

```
LINE # LOC    CODE        LINE 0552   0B53   A9 DF              LDA #$DF
0553   0B55   20 9E 09            JSR BITCLR
0554   0B58   4C 8D 0B            JMP TDLEA
0555   0B5B   A9 04       TOHB   LDA #$04      ;TEST OFF HOOK BIT
0556   0B5D   A8                 TAY
0557   0B5E   25 26              AND STUS
0558   0B60   F0 06              BEQ SRL       ;IF ON HK, SET RELEASE LINE
0559   0B62   20 2D 0F            JSR CCONT
0560   0B65   4C 6B 0B            JMP TRRB
0561   0B68   20 13 0F    SRL    JSR SCONT
0562   0B6B   24 26       TRRB   BIT STUS      ;TESTS RELEASE REQUEST BIT
0563   0B6D   50 1E              BVC TDLEA     ;BRANCH ON BIT = 0
0564   0B6F   A5 26              LDA STUS
0565   0B71   29 BF              AND #$BF      ;RESET REL REQ.
0566   0B73   09 80              ORA #$80      ;SET RELEASE BIT
0567   0B75   85 26              STA STUS
0568   0B77   B5 06              LDA WD0,X     ;SET REL SERV BIT
0569   0B79   09 40              ORA #$40
0570   0B7B   29 7F              AND #$7F      ;RESET DIAL ENA BIT
0571   0B7D   95 06              STA WD0,X
0572   0B7F   A0 04              LDY #$04      ;SET RELEASE LINE
0573   0B81   20 13 0F            JSR SCONT
0574   0B84   4C 98 0B    OUT    JMP EXIT2
0575   0B87   24 07       TLRB   BIT WD1
0576   0B89   70 08              BVS SDEB      ;SET DIAL ENABLE BIT
0577   0B8B   50 0B              BVC EXIT2
0578   0B8D   A5 26       TDLEA  LDA STUS      ;TEST DIAL ENA REQ
0579   0B8F   29 08              AND #$08
0580   0B91   F0 F4              BEQ TLRB
0581   0B93                                    ;LDA FUNMUX ;TEST DIAL DISABLE FEEDBACK
0582   0B93                                    ;BMI OUT    ;BRANCH ID DIAL DISABLE=1
0583   0B93   A9 80       SDEB   LDA #$80      ;SET DIAL ENA BIT
0584   0B95   20 A3 09            JSR BITSET
0585   0B98   A5 26       EXIT2  LDA STUS
0586   0B9A   29 04              AND #$4
0587   0B9C   D0 14              BNE BGMOFF
0588   0B9E   A5 07              LDA KYMUSC
0589   0BA0   4A                 LSR A
0590   0BA1   90 0F              BCC BGMOFF
0591   0BA3   2A                 ROL A
0592   0BA4   09 04              ORA #$4
0593   0BA6   85 07              STA KYMUSC
0594   0BA8   24 24              BIT KYPAGE
0595   0BAA   30 06              BMI BGMOFF
0596   0BAC   A5 C0       BGMON  LDA PT22B
0597   0BAE   09 20              ORA #$20
0598   0BB0   D0 04              BNE FUNCH
0599   0BB2   A5 C0       BGMOFF LDA PT22B
0600   0BB4   29 DF              AND #$DF
0601   0BB6   85 C0       FUNCH  STA PT22B
0602   0BB8   A9 F8              LDA #$F8
0603   0BBA   25 C1              AND PT22A
0604   0BBC   85 C1              STA PT22A
0605   0BBE   A9 10              LDA #$10
0606   0BC0   4C 6D 0A            JMP STROBB
```

| LINE # | LOC | CODE | LINE | | |
|---|---|---|---|---|---|
| 0607 | 0BC3 | | .FILE LHNFRE/1 | | |
| 0608 | 0BC3 | | ;****************************** | | |
| 0609 | 0BC3 | | ;* HANFRE-HANDS FREE SUBROUTINE * | | |
| 0610 | 0BC3 | | ;* * | | |
| 0611 | 0BC3 | | ;****************************** | | |
| 0612 | 0BC3 | | ; | | |
| 0613 | 0BC3 | | ; | | |
| 0614 | 0BC3 | 20 97 09 | HANFRE | JSR TCTR3 | |
| 0615 | 0BC6 | F0 01 | | BEQ HFR1 | |
| 0616 | 0BC8 | 60 | | RTS | |
| 0617 | 0BC9 | A9 04 | HFR1 | LDA #$04 | |
| 0618 | 0BCB | 20 A3 09 | | JSR BITSET | |
| 0619 | 0BCE | 29 08 | | AND #$08 | TEST SPU ON BIT |
| 0620 | 0BD0 | D0 06 | | BNE SPOFF | |
| 0621 | 0BD2 | A5 31 | | LDA STUS1 | |
| 0622 | 0BD4 | 09 08 | | ORA #$08 | |
| 0623 | 0BD6 | D0 04 | | BNE EXFRE | |
| 0624 | 0BD8 | A5 31 | SPOFF | LDA STUS1 | |
| 0625 | 0BDA | 29 F7 | | AND #$F7 | |
| 0626 | 0BDC | 09 02 | EXFRE | ORA #$02 | |
| 0627 | 0BDE | 85 31 | | STA STUS1 | |
| 0628 | 0BE0 | 60 | | RTS | |
| 0629 | 0BE1 | | .FILE LHOTLI/1 | | |
| 0630 | 0BE1 | | PAGEWD=$17 | | |
| 0631 | 0BE1 | A4 26 | HTLINE | LDY STUS | ;TEST RELEASE BIT |
| 0632 | 0BE3 | 30 22 | | BMI HTNOF | ;BRANCH TO TURN OFF |
| 0633 | 0BE5 | B5 06 | | LDA WD0,X | ;TEST TRIG BIT |
| 0634 | 0BE7 | 29 40 | | AND #$40 | |
| 0635 | 0BE9 | D0 35 | | BNE HTNON | |
| 0636 | 0BEB | 20 97 09 | | JSR TCTR3 | ;RESPONSE COUNTER =3? |
| 0637 | 0BEE | C9 02 | | CMP #$02 | |
| 0638 | 0BF0 | D0 09 | | BNE HTLN0 | |
| 0639 | 0BF2 | A5 0D | | LDA KYHOLD | ;FORCE CTR=3 |
| 0640 | 0BF4 | 09 03 | | ORA #$3 | |
| 0641 | 0BF6 | 85 0D | | STA KYHOLD | |
| 0642 | 0BF8 | 20 FE 0B | OPENXP | JSR CPTOPN | ;OPEN CROSSPOINT FOR RESPLASH |
| 0643 | 0BFB | 4C 6E 0C | HTLN0 | JMP LAMP | |
| 0644 | 0BFE | 20 EC 0A | CPTOPN | JSR IOFF | ; TURN OFF CURRENT GEN |
| 0645 | 0C01 | | ; OPEN CROSS POINTS | | |
| 0646 | 0C01 | 20 BC 09 | | JSR CDL | ;SET D EQU. 0 |
| 0647 | 0C04 | 4C 54 0A | | JMP SXPT | ;OPEN XPT |
| 0648 | 0C07 | 20 5F 0C | HTNOF | JSR PAGEON | ;OPEN CROSSPT SUBROUTINE |
| 0649 | 0C0A | A9 F7 | | LDA #$F7 | ;RESET I HOLD BIT |
| 0650 | 0C0C | 20 9E 09 | | JSR BITCLR | |
| 0651 | 0C0F | 98 | | TYA | |
| 0652 | 0C10 | 29 CF | | AND #$CF | ;RESET CONF BIT + HTLINE SEIZE BIT |
| 0653 | 0C12 | 85 26 | | STA STUS | |
| 0654 | 0C14 | B5 06 | | LDA WD0,X | ;TEST CTR |
| 0655 | 0C16 | 09 40 | | ORA #$40 | |
| 0656 | 0C18 | A8 | | TAY | ;HOLD WD0,X IN Y |
| 0657 | 0C19 | 29 07 | | AND #$7 | |
| 0658 | 0C1B | F0 14 | | BEQ HTONF1 | |
| 0659 | 0C1D | 98 | | TYA | |
| 0660 | 0C1E | D0 0F | | BNE HTONF2 | ;BRANCH ALWAYS |
| 0661 | 0C20 | A5 19 | HTNON | LDA KYHFRE | |

| LINE # | LOC | CODE | LINE | | |
|---|---|---|---|---|---|
| 0662 | 0C22 | 30 05 | | BMI NOHFO | ;TEST SPU ON LED |
| 0663 | 0C24 | 98 | | TYA | ;GET STATUS |
| 0664 | 0C25 | 29 04 | | AND #$04 | ;TEST OFF HOOK BIT |
| 0665 | 0C27 | D0 08 | | BNE HSTSER | |
| 0666 | 0C29 | A9 04 | NOHFO | LDA #$04 | |
| 0667 | 0C2B | 15 06 | NOHF1 | ORA WD0,X | |
| 0668 | 0C2D | 29 6F | | AND #$6F | ;DEFETE PRESELECT |
| 0669 | 0C2F | 95 06 | HTONF2 | STA WD0,X | |
| 0670 | 0C31 | 4C 6E 0C | HTONF1 | JMP LAMP | |
| 0671 | 0C34 | A9 02 | HSTSER | LDA #$02 | |
| 0672 | 0C36 | 25 82 | | AND PT32B | ;TEST D2 |
| 0673 | 0C38 | D0 EF | | BNE NOHFO | |
| 0674 | 0C3A | 98 | | TYA | ;TEST CONF BIT |
| 0675 | 0C3B | 29 20 | | AND #$20 | |
| 0676 | 0C3D | D0 EA | | BNE NOHFO | |
| 0677 | 0C3F | 20 4E 0A | HCLSXP | JSR CLOSEX | ;COLSE XPT |
| 0678 | 0C42 | 20 53 0C | | JSR PAGEOF | |
| 0679 | 0C45 | A9 20 | | LDA #$20 | ;TURN ON SEIZE CURRENT |
| 0680 | 0C47 | 20 7A 0A | | JSR IIPORT | |
| 0681 | 0C4A | 98 | | TYA | ;SET CONF BIT + HTLILE SEIZE BIT |
| 0682 | 0C4B | 09 30 | | ORA #$30 | |
| 0683 | 0C4D | 85 26 | | STA STUS | |
| 0684 | 0C4F | A9 84 | HCONF | LDA #$84 | ;SET I HOLD BIT TO SET THE FLASHERS RATE |
| 0685 | 0C51 | D0 D8 | | BNE NOHF1 | ;BRANCH ALWAYS |
| 0686 | 0C53 | E0 17 | PAGEOF | CPX #PAGEWD | |
| 0687 | 0C55 | D0 14 | | BNE PNOT1 | |
| 0688 | 0C57 | A0 01 | | LDY #$1 | |
| 0689 | 0C59 | 20 13 0F | | JSR SCONT | |
| 0690 | 0C5C | 4C 6B 0C | | JMP PNOT1 | |
| 0691 | 0C5F | 20 FE 0B | PAGEON | JSR CPTOPN | |
| 0692 | 0C62 | E0 17 | | CPX #PAGEWD | |
| 0693 | 0C64 | D0 05 | | BNE PNOT1 | |
| 0694 | 0C66 | A0 01 | | LDY #$01 | |
| 0695 | 0C68 | 20 2D 0F | | JSR CCONT | |
| 0696 | 0C6B | A4 26 | PNOT1 | LDY STUS | |
| 0697 | 0C6D | 60 | | RTS | |
| 0698 | 0C6E | | | .FILE LGLAMP/1 | |
| 0699 | 0C6E | B5 06 | LAMP | LDA WD0,X | ;LOOK AT I HOLD BIT |
| 0700 | 0C70 | 29 03 | | AND #$03 | |
| 0701 | 0C72 | F0 08 | | BEQ LAMP1 | |
| 0702 | 0C74 | A5 02 | | LDA FUNMUX | |
| 0703 | 0C76 | 29 02 | | AND #$2 | ;TEST QUICK FLASH |
| 0704 | 0C78 | D0 09 | | BNE LONG | |
| 0705 | 0C7A | A9 7F | SHORT1 | LDA #$7F | |
| 0706 | 0C7C | 4C 9E 09 | | JMP BITCLR | |
| 0707 | 0C7F | 24 82 | LAMP1 | BIT PT32B | |
| 0708 | 0C81 | 50 F7 | | BVC SHORT1 | |
| 0709 | 0C83 | A9 80 | LONG | LDA #$80 | |
| 0710 | 0C85 | 4C A3 09 | | JMP BITSET | |
| 0711 | 0C88 | | | .FILE LHOKSW/1 | |
| 0712 | 0C88 | | | BYPTMR=$0004 | |
| 0713 | 0C88 | A5 06 | HOOKSW | LDA WD0 | |
| 0714 | 0C8A | 29 07 | | AND #$7 | |
| 0715 | 0C8C | F0 1E | | BEQ ONCRO | |
| 0716 | 0C8E | C9 03 | | CMP #$3 | |

```
LINE # LOC    CODE       LINE 0717  0C90  F0 01              BEQ HK1
0718  0C92  60                 RTS
0719  0C93  A9 04       HK1    LDA #$04
0720  0C95  20 A3 09           JSR BITSET
0721  0C98  A5 19              LDA KYHFRE
0722  0C9A  29 10              AND #$10          ;CHECK ON CRADEL BIT
0723  0C9C  D0 01              BNE HK2
0724  0C9E  60                 RTS
0725  0C9F  A5 19       HK2    LDA KYHFRE
0726  0CA1  29 EF              AND #$EF
0727  0CA3  85 19              STA KYHFRE
0728  0CA5  A5 31              LDA STUS1
0729  0CA7  09 10              ORA #$10
0730  0CA9  D0 12              BNE HK4
0731  0CAB  60                 RTS
0732  0CAC  A5 19       ONCR0  LDA KYHFRE
0733  0CAE  29 10              AND #$10
0734  0CB0  F0 01              BEQ HK3
0735  0CB2  60                 RTS
0736  0CB3  A5 19       HK3    LDA KYHFRE
0737  0CB5  09 10              ORA #$10
0738  0CB7  85 19              STA KYHFRE
0739  0CB9  A5 31              LDA STUS1
0740  0CBB  29 EF              AND #$EF
0741  0CBD  09 03       HK4    ORA #$03
0742  0CBF  85 31              STA STUS1
0743  0CC1  60                 RTS
0744  0CC2                     .FILE LTMFLS/1
0745  0CC2                     FLSHTM=$0030
0746  0CC2                     FTIME=$0028 ;DELAY= 1 SECOND PRECISELY
0747  0CC2  20 97 09    TMFLS  JSR TCTR3         ;TEST CTR=3
0748  0CC5  D0 19              BNE TMFLS0
0749  0CC7  A9 04              LDA #4            ;SET SERVICED BIT
0750  0CC9  20 A3 09           JSR BITSET
0751  0CCC  A9 28              LDA #FTIME        ;SET TIMER
0752  0CCE  85 30              STA FLSHTM
0753  0CD0  A5 80              LDA PT32A              ;TURN ON FLASH CURRENT
0754  0CD2  29 20              AND #$20          ;ISOLATE SEIZE BIT
0755  0CD4  85 2D              STA CURSTA        ;PLACE IN CURSTA
0756  0CD6  0A                 ASL A             ;SHIFT S-BIT TO FLASH POSITION
0757  0CD7  0A                 ASL A
0758  0CD8  20 7A 0A           JSR IIPORT        ;GO TO UPDATE PORT
0759  0CDB  C6 30       DECTMR DEC FLSHTM
0760  0CDD  F0 06              BEQ TMFOUT
0761  0CDF  60          TMFEXT RTS
0762  0CE0  A5 30       TMFLS0 LDA FLSHTM
0763  0CE2  D0 F7              BNE DECTMR
0764  0CE4  60                 RTS
0765  0CE5  4C 78 0A    TMFOUT JMP RESPRT             ;RETRIEVE PRIEVIOUS CURR
0766  0CE8                     .FILE LAUTLK
0767  0CE8                     LNKCTR = $2F
0768  0CE8  A4 26       LAUTLK LDY STUS           ;TEST REL REQ
0769  0CEA  30 27              BMI AREL          ;BRANCH IF SET
0770  0CEC  20 97 09           JSR TCTR3         ,TEST RESPONSE COUNTER
0771  0CEF  F0 38              BEQ AOFHK
```

```
LINE # LOC   CODE      LINE 0772  0CF1  C9 01            CMP #$1         ;CTR=1?
0773  0CF3  F0 01            BEQ ALK0
0774  0CF5  60               RTS
0775  0CF6  98        ALK0   TYA             ;SET REL REQ BIT
0776  0CF7  09 40            ORA #$40
0777  0CF9  85 26            STA STUS
0778  0CFB  B5 06     ALK1   LDA WD0,X       ;TEST ACTIVE LINE FLAG
0779  0CFD  30 14            BMI AREL
0780  0CFF  20 97 09  NEWMUX JSR TCTR3       ;ISOLATE CTR BITS
0781  0D02  C9 01            CMP #$1
0782  0D04  D0 01            BNE LNMX1
0783  0D06  60               RTS
0784  0D07  E6 05     LNMX1  INC LNKMUX
0785  0D09  A5 05            LDA LNKMUX
0786  0D0B  38               SEC
0787  0D0C  E9 04            SBC #$4
0788  0D0E  D0 02            BNE AEXIT
0789  0D10  85 05            STA LNKMUX      ;NOTE A=0
0790  0D12  60        AEXIT  RTS
0791  0D13  A5 07     AREL   LDA WD1         ;RESET LINK REQUEST BIT
0792  0D15  29 BF            AND #$BF
0793  0D17  85 07            STA WD1
0794  0D19  20 EC 0A         JSR IOFF        ;TURN OFF CURRENT GEN.
0795  0D1C  20 BC 09         JSR CDL         ;OPEN CROSSPOINTS
0796  0D1F  20 5F 0D         JSR ASXPT0      ;TICKLE XPT ENABLE
0797  0D22  B5 06            LDA WD0,X
0798  0D24  10 EC            BPL AEXIT       ;TEST ACTIVE LINE FLAG
0799  0D26  29 07            AND #$7
0800  0D28  95 06            STA WD0,X
0801  0D2A  10 D3            BPL NEWMUX      ;BRANCH ALWAYS
0802  0D2C  98        AOFHK  TYA
0803  0D2D  29 04            AND #$4         ;TEST OFF HOOK BIT
0804  0D2F  F0 E1            BEQ AEXIT
0805  0D31  A5 82            LDA PT32B       ;TEST D2
0806  0D33  4A               LSR A
0807  0D34  B0 C5            BCS ALK1        ;BRANCH ON D2=1
0808  0D36  E6 2F     ACLXPT INC LNKCTR
0809  0D38  A5 2F            LDA LNKCTR
0810  0D3A  C9 06            CMP #$06
0811  0D3C  F0 01            BEQ AUT1
0812  0D3E  60               RTS
0813  0D3F  A9 00     AUT1   LDA #$00
0814  0D41  85 2F            STA LNKCTR
0815  0D43  20 B6 09         JSR SDL         ;SET DATA LINE=1
0816  0D46  20 5F 0D         JSR ASXPT0      ;TICKEL XPT ENABLE
0817  0D49  A9 10            LDA #$10        ;SET DIAL ENABLE REQ
0818  0D4B  20 F0 0F         JSR STUSST
0819  0D4E  A9 20            LDA #$20        ;TURN ON SEIZE CURRENT
0820  0D50  20 82 0A         JSR IPORT
0821  0D53  A9 84            LDA #$84
0822  0D55  20 A3 09         JSR BITSET      ;SET SERVICED BIT & ACTIVE LINE FLAG
0823  0D58  A9 40            LDA #$40        ;SET LINK REQUEST BIT
0824  0D5A  05 07            ORA WD1
0825  0D5C  85 07            STA WD1
0826  0D5E  60               RTS
```

```
LINE # LOC    CODE       LINE 0827  0D5F               ;
0828  0D5F               ; SUBROUTINE
0829  0D5F               ;
0830  0D5F  A5 C1        ASXPT0 LDA PT22A      ;SAVE PRESENT PORT STATUS
0831  0061  48                  PHA
0832  0062  A4 05               LDY LNKMUX
0833  0064  B9 6E 0D            LDA ATBL,Y     ;GET MUX CONTROL PATTERN
0834  0067  20 58 0A            JSR ASXPT
0835  006A  68                  PLA
0836  006B  85 C1               STA PT22A
0837  006D  60                  RTS
0838  006E               ;
0839  006E               ; ACTIVATION TABLE
0840  006E               ;
0841  006E  27           ATBL   .BYT $27       ;CP24
0842  006F  25                  .BYT $25       ;CP22
0843  0070  23                  .BYT $23       ;CP20
0844  0071  17                  .BYT $17       ;CP16
0845  0072               .FILE LMIKMT/1
0846  0072  20 97 09     LMIKMT JSR TCTR3      ;TEST CTR
0847  0075  D0 11               BNE BYPTST
0848  0077  A9 04               LDA #$4        ;SET SERVICED BIT
0849  0079  20 A3 09            JSR BITSET
0850  007C  30 10               BMI MLOFF      ;BRANCH IF MUTE LED ON
0851  007E  09 80               ORA #$80       ;TURN ON MUTE LED
0852  0080  95 06               STA WD0,X
0853  0082  26 06        MUTE   ROL WD0        ;MUTE MIC
0854  0084  38                  SEC
0855  0085  66 06        LIVE0  ROR WD0
0856  0087  60                  RTS
0857  0088  24 03        BYPTST BIT WD2        ;TEST BYPASS SWITCH
0858  008A  30 F6               BMI MUTE       ;BRANCH IF BYPASS SWITCH CLOSED
0859  008C  10 05               BPL LIVE       ;BRANCH IF BYPASS SWITCH OPEN
0860  008E  A9 7F        MLOFF  LDA #$7F       ;TURN OFF MUTE LED
0861  0090  20 9E 09            JSR BITCLR
0862  0093  26 06        LIVE   ROL WD0        ;LIVE MIC
0863  0095  18                  CLC
0864  0096  90 ED               BCC LIVE0      ;BRANCH ALWAYS
0865  0098               .FILE LGWSRF/1
0866  0098               PRREL  =PREL-1
0867  0098               CALL   =DELY-1
0868  0098               CTRL1  =HOOKSW-1
0869  0098               DENB   =RELDL-1
0870  0098               MKENB  =DELY-1
0871  0098               HNDFR1 =DELY-1        ; SPKR-PHONE CONTROL WORD
0872  0098               HOLD   =HSRTN-1
0873  0098               FLASH  =TMFLS-1
0874  0098               HNDFR2 =HANFRE-1      ; SPKR-PHONE ON/OFF KEY
0875  0098               MMUT   =DELY-1
0876  0098               ANS    =DELY-1
0877  0098               HLINE  =DELY-1
0878  0098               DND    =DELY-1
0879  0098               PAGE   =HTLINE-1
0880  0098               CONF   =HTLINE-1
0881  0098               SEEZ0  =COSZ-1
```

| LINE # | LOC | CODE | LINE | | |
|---|---|---|---|---|---|
| 0882 | 0098 | | SEEZ1 | =COSZ-1 | |
| 0883 | 0098 | | SEEZ2 | =COSZ-1 | |
| 0884 | 0098 | | SEEZ3 | =COSZ-1 | |
| 0885 | 0098 | | SEEZ4 | =COSZ-1 | |
| 0886 | 0098 | | SEEZ5 | =COSZ-1 | |
| 0887 | 0098 | | SEEZ6 | =COSZ-1 | |
| 0888 | 0098 | | SEEZ7 | =COSZ-1 | |
| 0889 | 0098 | | SEEZ8 | =COSZ-1 | |
| 0890 | 0098 | | SEEZ9 | =COSZ-1 | |
| 0891 | 0098 | | SEEZ10 | =COSZ-1 | |
| 0892 | 0098 | | SEEZ11 | =COSZ-1 | |
| 0893 | 0098 | | SEEZ12 | =COSZ-1 | |
| 0894 | 0098 | | SEEZ13 | =COSZ-1 | |
| 0895 | 0098 | | SEEZ14 | =DELY-1 | |
| 0896 | 0098 | | SEEZ15 | =LMIKMT-1 | |
| 0897 | 0098 | | SEEZ16 | =COSZ-1 | |
| 0898 | 0098 | | SEEZ17 | =COSZ-1 | |
| 0899 | 0098 | | SEEZ18 | =DELY-1 | |
| 0900 | 0098 | | SEEZ19 | =COSZ-1 | |
| 0901 | 0098 | | SEEZ20 | =COSZ-1 | |
| 0902 | 0098 | | SEEZ21 | =COSZ-1 | |
| 0903 | 0098 | | SEEZ22 | =PAGE-1 | |
| 0904 | 0098 | | SEEZ23 | =LAUTLK-1 | |
| 0905 | 0098 | | CP1 | =$00 | |
| 0906 | 0098 | | CP2 | =$08 | |
| 0907 | 0098 | | CP3 | =$10 | |
| 0908 | 0098 | | CP4 | =$18 | |
| 0909 | 0098 | | CP5 | =$20 | |
| 0910 | 0098 | | CP6 | =$28 | |
| 0911 | 0098 | | CP7 | =$30 | |
| 0912 | 0098 | | CP8 | =$38 | |
| 0913 | 0098 | | CP9 | =$40 | |
| 0914 | 0098 | | CP10 | =$48 | |
| 0915 | 0098 | | CP11 | =$50 | |
| 0916 | 0098 | | CP12 | =$58 | |
| 0917 | 0098 | | CP13 | =$60 | |
| 0918 | 0098 | | CP14 | =$68 | |
| 0919 | 0098 | | CP15 | =$70 | |
| 0920 | 0098 | | CP16 | =$78 | |
| 0921 | 0098 | | CP17 | =$80 | |
| 0922 | 0098 | | CP18 | =$88 | |
| 0923 | 0098 | | CP19 | =$90 | |
| 0924 | 0098 | | CP20 | =$98 | |
| 0925 | 0098 | | CP21 | =$A0 | |
| 0926 | 0098 | | CP22 | =$A8 | |
| 0927 | 0098 | | CP23 | =$B0 | |
| 0928 | 0098 | | CP24 | =$B8 | |
| 0929 | 0098 | 87 | WDFDL | .BYT <CTRL1 | ; WD 0 |
| 0930 | 0099 | 3D | | .BYT <DENB | ; WD1 |
| 0931 | 009A | 9C | | .BYT <MKENB | , WD2 |
| 0932 | 009B | 9C | | .BYT <HNDFR1 | ; WD 3 |
| 0933 | 009C | C2 | | .BYT <SEEZ0 | |
| 0934 | 009D | C2 | | .BYT <SEEZ1 | |
| 0935 | 009E | C2 | | .BYT <SEEZ2 | |
| 0936 | 009F | FC | | .BYT <HOLD | ; WD 7 |

```
LINE # LOC    CODE    LINE 0937  0DA0  C2              .BYT <SEEZ3
0938  0DA1  C2              .BYT <SEEZ4
0939  0DA2  C2              .BYT <SEEZ5      ; CONVERT WD 10
0940  0DA3  9B              .BYT <PRREL      ; WD 11
0941  0DA4  C2              .BYT <SEEZ6
0942  0DA5  C2              .BYT <SEEZ7
0943  0DA6  C2              .BYT <SEEZ8      ; CONVERT WD 14
0944  0DA7  C1              .BYT <FLASH      ; WD 15
0945  0DA8  C2              .BYT <SEEZ9
0946  0DA9  C2              .BYT <SEEZ10
0947  0DAA  C2              .BYT <SEEZ11     ; CONVERT WD 18
0948  0DAB  C2              .BYT <HNDFR2     ; WD 19
0949  0DAC  C2              .BYT <SEEZ12
0950  0DAD  C2              .BYT <SEEZ13
0951  0DAE  9C              .BYT <SEEZ14
0952  0DAF  71              .BYT <SEEZ15     ; PAGE WD 23
0953  0DB0  C2              .BYT <SEEZ16
0954  0DB1  C2              .BYT <SEEZ17
0955  0DB2  9C              .BYT <SEEZ18
0956  0DB3  C2              .BYT <SEEZ19     ; CNVT / MEET ME WD 27
0957  0DB4  C2              .BYT <SEEZ20
0958  0DB5  C2              .BYT <SEEZ21
0959  0DB6  DF              .BYT <SEEZ22
0960  0DB7  E7              .BYT <SEEZ23     ; WORD 31
0961  0DB8  04      WDFDU   .BYT >CTRL1-8    ; WD 0
0962  0DB9  03              .BYT >DENB-8     ; WD1
0963  0DBA  01              .BYT >MKENB-8    ; WD2
0964  0DBB  11              .BYT >HNDFR1-8+CP3 ;WD 3
0965  0DBC  21              .BYT >SEEZ0-8+CP5
0966  0DBD  31              .BYT >SEEZ1-8+CP7
0967  0DBE  01              .BYT >SEEZ2-8
0968  0DBF  2A              .BYT >HOLD-8+CP6 ; WD 7
0969  0DC0  39              .BYT >SEEZ3-8+CP8
0970  0DC1  49              .BYT >SEEZ4-8+CP10
0971  0DC2  01              .BYT >SEEZ5-8    ; CONVERT WD 10
0972  0DC3  42              .BYT >PRREL-8+CP9 ; WD 11
0973  0DC4  51              .BYT >SEEZ6-8+CP11
0974  0DC5  61              .BYT >SEEZ7-8+CP13
0975  0DC6  01              .BYT >SEEZ8-8    ; CONVERT WD 14
0976  0DC7  5C              .BYT >FLASH-8+CP12 ; WD 15
0977  0DC8  69              .BYT >SEEZ9-8+CP14
0978  0DC9  81              .BYT >SEEZ10-8+CP17
0979  0DCA  01              .BYT >SEEZ11-8   ; CONVERT WD 18
0980  0DCB  73              .BYT >HNDFR2-8+CP15 ; WD 19
0981  0DCC  89              .BYT >SEEZ12-8+CP18
0982  0DCD  69              .BYT >SEEZ13-8+CP14
0983  0DCE  79              .BYT >SEEZ14-8+CP16
0984  0DCF  95              .BYT >SEEZ15-8+CP19 ; PAGE WD 23
0985  0DD0  01              .BYT >SEEZ16-8+CP1
0986  0DD1  89              .BYT >SEEZ17-8+CP18
0987  0DD2  81              .BYT >SEEZ18-8+CP23
0988  0DD3  09              .BYT >SEEZ19-8+CP2 ; CNVT / MEET ME WD 27
0989  0DD4  19              .BYT >SEEZ20-8+CP4
0990  0DD5  A1              .BYT >SEEZ21-8+CP21
0991  0DD6  2B              .BYT >SEEZ22-8+CP6
```

```
LINE # LOC    CODE       LINE 0992  0DD7  04                        .BYT >$EE223-8 ; WORD 31
0993  0DD8  BD 83 0D    WSRF   LDA WDFDU,X   ;FETCH UPPER ADD. BYTE
0994  0DDB  85 2E              STA MUX       ;SAVE CP. CODE
0995  0DDD  29 07              AND #$7       ;MASK OUT ADDRESS DATA
0996  0DDF  09 08              ORA #$8       ;SET ADDRESS BIT A11
0997  0DE1  48                 PHA           ;SET UPPER VECTOR
0998  0DE2  BD 98 0D           LDA WDFDL,X   ;FETCH LOWER ADDRESS BYTE
0999  0DE5  48                 PHA           ;SET LOWER VECTOR
1000  0DE6  60                 RTS
1001  0DE7                .FILE L8PORT/1
1002  0DE7                BPTRAM = $01
1003  0DE7                TEMP   = $00
1004  0DE7                WD0    =$0006
1005  0DE7  A5 82     BPORT  LDA PT32B
1006  0DE9  29 30            AND #$30
1007  0DEB  F0 37            BEQ ID1       ;TEST HL SEIZE BIT
1008  0DED  A5 82            LDA PT32B
1009  0DEF  29 1C            AND #$1C      ;TEST LINK BITS (STEAL,ST,RT)
1010  0DF1  C9 18            CMP #$18
1011  0DF3  F0 1E            BEQ IDLE
1012  0DF5  48               PHA
1013  0DF6  E6 2F            INC LNKCTR
1014  0DF8  A5 2F            LDA LNKCTR
1015  0DFA  C9 10            CMP #$10
1016  0DFC  F0 04            BEQ BP1
1017  0DFE  68               PLA
1018  0DFF  4C 65 0E         JMP BPORT1
1019  0E02  A9 00     BP1    LDA #$00
1020  0E04  85 2F            STA LNKCTR
1021  0E06  68               PLA
1022  0E07  C9 04     FIND   CMP #$04      ;IS IT STEAL?
1023  0E09  F0 1C            BEQ STEAL     ;YES, DO STEAL ROUTINE
1024  0E0B  C9 14            CMP #$14      ;IS IT RING?
1025  0E0D  F0 33            BEQ RT        ;YES, DO RT ROUTINE
1026  0E0F  C9 1C            CMP #$1C      ;IS IT H.F. CALL?
1027  0E11  F0 17            BEQ ST        ;DO SPLASH TONE ROUTINE
1028  0E13  A5 01     IDLE   LDA BPTRAM    ;GET CONTROL WORD (WD0)
1029  0E15  29 08            AND #$08      ;TEST HF SERVICE BIT
1030  0E17  F0 0B            BEQ ID1       ;IF NOT SET CONT.
1031  0E19  A5 01            LDA BPTRAM
1032  0E1B  29 C7            AND #$C7      ;CLEAR B LINK CONTROL BITS
1033  0E1D  85 01            STA BPTRAM    ;RESET SERVICE BIT
1034  0E1F  26 19            ROL WD19
1035  0E21  18               CLC
1036  0E22  66 19            ROR WD19      ;HF LED OFF
1037  0E24  20 39 0F  ID1    JSR RINGRS
1038  0E27  4C 65 0E  STEAL  JMP BPORT1
1039  0E2A  A5 01     ST     LDA BPTRAM    ;IF NONE OF THE ABOVE IT IS ST
1040  0E2C  29 08            AND #$08      ;SET ST SERVICE BIT
1041  0E2E  D0 F4            BNE ID1       ;SERVICE BIT SET RETURN
1042  0E30  A5 01            LDA BPTRAM
1043  0E32  09 08            ORA #$08
1044  0E34  85 01            STA BPTRAM    ;SET SERVICE BIT
1045  0E36  A9 04            LDA #$4
1046  0E38  20 A7 09         JSR STB32A
```

```
LINE # LOC    CODE           LINE 1047  0E3B  26 19                  ROL WD19
1048  0E3D  38                     SEC
1049  0E3E  66 19                  ROR WD19        ;TURN ON HF LED
1050  0E40  30 23                  BMI BPOPT1      ;BRANCH ALWAYS
1051  0E42  A5 01          RT      LDA BPTRAM
1052  0E44  29 10                  AND #$10
1053  0E46  D0 0B                  BNE RT1         ;BRANCH IF SERVICE BIT SET
1054  0E48  20 33 0F               JSR RINGST
1055  0E4B  A5 01                  LDA BPTRAM
1056  0E4D  09 10                  ORA #$10
1057  0E4F  85 01                  STA BPTRAM      ;SET RT SERVICE BIT
1058  0E51  D0 12                  BNE BPORT1      ;BRANCH ALWAYS
1059  0E53  A5 19          RT1     LDA WD19
1060  0E55  29 10                  AND #$10
1061  0E57  D0 0C                  BNE BPORT1      ;OFHK THAN CONT.
1062  0E59  20 39 0F               JSR RINGRS      ;RESET RT ENA
1063  0E5C  A5 C0                  LDA PT22B
1064  0E5E  09 04                  ORA #$04
1065  0E60  85 C0                  STA PT22B
1066  0E62  20 C1 0F               JSR SPP1
1067  0E65                         ;****************************
1068  0E65  A0 07          BPORT1  LDY #$07        ;SET FUNMUX CYCLE CTR
1069  0E67  A9 FF                  LDA #$FF
1070  0E69  85 C1                  STA PT22A
1071  0E6B  A5 C0                  LDA PT22B       ;TOGGLE FUNMUX SELECT
1072  0E6D  29 7F                  AND #$7F
1073  0E6F  48                     PHA
1074  0E70  85 C0                  STA PT22B
1075  0E72  A5 82          BPT3    LDA PT32B       ;READ ONE FUNMUX BIT
1076  0E74  0A                     ASL A
1077  0E75  26 02                  ROL FUNMUX      ;SHIFT RESULTS INTO FUNMUX
1078  0E77  88                     DEY
1079  0E78  30 04                  BMI BPT4
1080  0E7A  C6 C1                  DEC PT22A
1081  0E7C  D0 F4                  BNE BPT3        ;BRANCH ALWAYS
1082  0E7E  68             BPT4    PLA
1083  0E7F  09 80                  ORA #$80        ;RESTORE PT22B
1084  0E81  85 C0                  STA PT22B
1085  0E83  A5 82                  LDA PT32B       ;READ CONF KEY SELECT
1086  0E85  A8                     TAY             ;SAVE HL SEIZE BIT
1087  0E86  29 04                  AND #$4
1088  0E88  08                     PHP
1089  0E89  A5 02                  LDA FUNMUX
1090  0E8B  48                     PHA
1091  0E8C  29 10                  AND #$10        ;ISOLATE HF ENABLE
1092  0E8E  85 03                  STA HFENAB
1093  0E90  68                     PLA
1094  0E91  29 EF                  AND #$EF
1095  0E93  28                     PLP
1096  0E94  F0 02                  BEQ BPT5        ;MOVE CONF STRAP TO FUNMUX
1097  0E96  09 10                  ORA #$10
1098  0E98  85 02          BPT5    STA FUNMUX
1099  0E9A  98                     TYA             ;GET PT32B
1100  0E9B  29 20                  AND #$20        ;TEST HL SEIZE BIT
1101  0E9D  D0 18                  BNE NTSEZD
```

| LINE # | LOC | CODE | LINE | | |
|---|---|---|---|---|---|
| 1102 | 0E9F | A5 01 | SEZD | LDA BPTRAM | |
| 1103 | 0EA1 | A8 | | TAY | |
| 1104 | 0EA2 | 20 99 09 | | JSR CTR3 | |
| 1105 | 0EA5 | F0 48 | | BEQ BPT1 | |
| 1106 | 0EA7 | C9 07 | | CMP #$07 | |
| 1107 | 0EA9 | F0 30 | | BEQ BPT2 | |
| 1108 | 0EAB | E6 01 | | INC BPTRAM | |
| 1109 | 0EAD | A5 19 | TSPUEN | LDA KYHFRE | ;TEST SPU LAMP |
| 1110 | 0EAF | 30 33 | | BMI SPUOFF | |
| 1111 | 0EB1 | 20 04 0F | | JSR SCONT1 | ;CONT1=1 |
| 1112 | 0EB4 | 4C 11 0F | | JMP SCONT2 | ;CONT2=1 |
| 1113 | 0EB7 | A5 01 | NTSEZD | LDA BPTRAM | |
| 1114 | 0EB9 | C9 07 | | CMP #$07 | |
| 1115 | 0EBB | D0 0F | | BNE NTSZD0 | |
| 1116 | 0EBD | 20 04 0F | | JSR SCONT1 | ;CONT1=1 |
| 1117 | 0EC0 | 20 2B 0F | | JSR CCONT2 | ;CONT2=0 |
| 1118 | 0EC3 | 24 19 | | BIT KYHFRE | |
| 1119 | 0EC5 | 70 05 | | BVS NTSZD0 | |
| 1120 | 0EC7 | 26 19 | | ROL KYHFRE | ;HANDS FREE LED OFF |
| 1121 | 0EC9 | 18 | | CLC | |
| 1122 | 0ECA | 66 19 | | ROR KYHFRE | |
| 1123 | 0ECC | A5 01 | NTSZD0 | LDA BPTRAM | |
| 1124 | 0ECE | 29 38 | | AND #$38 | ;CLEAR BPORT RAM |
| 1125 | 0ED0 | 85 01 | | STA BPTRAM | |
| 1126 | 0ED2 | A5 C0 | | LDA PT22B | ;CLEAR LINK B ENAB |
| 1127 | 0ED4 | 29 FD | | AND #$FD | |
| 1128 | 0ED6 | 85 C0 | | STA PT22B | |
| 1129 | 0ED8 | 4C AD 0E | | JMP TSPUEN | |
| 1130 | 0EDB | 20 0A 0F | BPT2 | JSR CCONT1 | ;CONT1=0 |
| 1131 | 0EDE | 20 2B 0F | | JSR CCONT2 | ;CONT2=0 |
| 1132 | 0EE1 | 4C AD 0E | | JMP TSPUEN | |
| 1133 | 0EE4 | 20 2B 0F | SPUOFF | JSR CCONT2 | ;CONT2=0 |
| 1134 | 0EE7 | A5 19 | | LDA KYHFRE | |
| 1135 | 0EE9 | 29 10 | | AND #$10 | ;TEST OFF HOOK BIT |
| 1136 | 0EEB | F0 1D | | BEQ CCONT1 | ;FOR FAST FLASH USE OFFHK |
| 1137 | 0EED | D0 15 | | BNE SCONT1 | ;TURN LED OFF IF HANSET AND SP ON HK |
| 1138 | 0EEF | 98 | BPT1 | TYA | |
| 1139 | 0EF0 | 09 04 | | ORA #$4 | ;SET SERVICED BIT |
| 1140 | 0EF2 | 85 01 | | STA BPTRAM | |
| 1141 | 0EF4 | A9 02 | | LDA #$2 | ;SET HL ENAB. |
| 1142 | 0EF6 | 20 A7 09 | | JSR STB32A | |
| 1143 | 0EF9 | 20 DF 0F | | JSR LTON | ;TURN ON HANDS FREE LED |
| 1144 | 0EFC | 4C AD 0E | | JMP TSPUEN | |
| 1145 | 0EFF | A5 02 | OFFHK | LDA FUNMUX | ;CONT1=0 |
| 1146 | 0F01 | 4A | | LSR A | ;TEST SLOW FLASH BIT |
| 1147 | 0F02 | D0 06 | | BNE CCONT1 | ;LED ON |
| 1148 | 0F04 | | | ; | |
| 1149 | 0F04 | | | ; | |
| 1150 | 0F04 | | | ; BPORT SUBROUTINES | |
| 1151 | 0F04 | | | ; | |
| 1152 | 0F04 | A5 C0 | SCONT1 | LDA PT22B | ;SET D0 |
| 1153 | 0F06 | 09 01 | | ORA #$1 | |
| 1154 | 0F08 | D0 04 | | BNE FRT22B | |
| 1155 | 0F0A | A5 C0 | CCONT1 | LDA PT22B | ;CLEAR D0 |
| 1156 | 0F0C | 29 FE | | AND #$FE | |

```
LINE # LOC    CODE        LINE 1157  0F0E  85 C0        PRT22B  STA PT22B
1158  0F10  60           WAIT    RTS
1159  0F11  A0 02        SCONT2  LDY #$2         ;POINT TO CONT2
1160  0F13  20 B6 09     SCONT   JSR SDL         ;SET D=1
1161  0F16  84 00        CONT    STY TEMP        ;ENTRY POINT FOR FUNMUX WRITE
1162  0F18  A5 C1                LDA PT22A       ;ADDRESS FUNMUX
1163  0F1A  29 F8                AND #$F8
1164  0F1C  05 00                ORA TEMP
1165  0F1E  85 C1                STA PT22A
1166  0F20  A5 C0                LDA PT22B       ;STROBE WES4 NOT
1167  0F22  49 10                EOR #$10
1168  0F24  85 C0                STA PT22B
1169  0F26  49 10                EOR #$10
1170  0F28  85 C0                STA PT22B
1171  0F2A  60                   RTS
1172  0F2B  A0 02        CCONT2  LDY #$2         ;POINT TO CONT2
1173  0F2D  20 BC 09     CCONT   JSR CDL         ;CLEAR D
1174  0F30  4C 16 0F             JMP CONT
1175  0F33  A5 80        RINGST  LDA PT32A
1176  0F35  09 04                ORA #$04
1177  0F37  D0 04                BNE RING        ;BRANCH ALWAYS
1178  0F39  A5 80        RINGRS  LDA PT32A
1179  0F3B  29 FB                AND #$FB
1180  0F3D  85 80        RING    STA PT32A
1181  0F3F  60                   RTS
1182  0F40                       .FILE SUPR/1
1183  0F40                ;      SUPR- SWITCH SUB FOR HF,HS & 8PORT
1184  0F40                ;================================================
1185  0F40                ;
1186  0F40                ;
1187  0F40  EA           SHSH    NOP
1188  0F41  A5 31                LDA STUS1
1189  0F43  29 03                AND #$03
1190  0F45  D0 01                BNE SUPR1
1191  0F47  60                   RTS
1192  0F48  A5 31        SUPR1   LDA STUS1
1193  0F4A  C9 02                CMP #$02
1194  0F4C  F0 60                BEQ 0B02
1195  0F4E  C9 07                CMP #$07
1196  0F50  F0 62                BEQ 0703
1197  0F52  C9 03                CMP #$03
1198  0F54  F0 5E                BEQ 0703
1199  0F56  C9 0F                CMP #$0F
1200  0F58  F0 4E                BEQ 0F
1201  0F5A  C9 13                CMP #$13
1202  0F5C  F0 46                BEQ 013
1203  0F5E  C9 1F                CMP #$1F
1204  0F60  F0 3F                BEQ 01F17
1205  0F62  C9 17                CMP #$17
1206  0F64  F0 3B                BEQ 01F17
1207  0F66  C9 1B                CMP #$1B
1208  0F68  F0 34                BEQ 01B
1209  0F6A  C9 0A                CMP #$0A
1210  0F6C  F0 27                BEQ 0A
1211  0F6E  C9 12                CMP #$12
```

| LINE # | LOC | CODE | | LINE | |
|---|---|---|---|---|---|
| 1212 | 0F70 | F0 1C | | BEQ | 012 |
| 1213 | 0F72 | C9 11 | | CMP | #$11 |
| 1214 | 0F74 | F0 1B | | BEQ | 01101 |
| 1215 | 0F76 | C9 01 | | CMP | #$01 |
| 1216 | 0F78 | F0 17 | | BEQ | 01101 |
| 1217 | 0F7A | C9 1A | | CMP | #$1A |
| 1218 | 0F7C | F0 09 | | BEQ | 01A |
| 1219 | 0F7E | C9 05 | | CMP | #$05 |
| 1220 | 0F80 | F0 08 | | BEQ | 00515 |
| 1221 | 0F82 | C9 15 | | CMP | #$15 |
| 1222 | 0F84 | F0 04 | | BEQ | 00515 |
| 1223 | 0F86 | 60 | | RTS | |
| 1224 | 0F87 | 20 BB 0F | 01A | JSR | SPUON |
| 1225 | 0F8A | 20 DF 0F | 00515 | JSR | LTON |
| 1226 | 0F8D | 60 | | RTS | |
| 1227 | 0F8E | 20 C7 0F | 012 | JSR | POFF |
| 1228 | 0F91 | 20 D9 0F | 01101 | JSR | LTOFF |
| 1229 | 0F94 | 60 | | RTS | |
| 1230 | 0F95 | 20 BB 0F | 0A | JSR | SPUON |
| 1231 | 0F98 | 20 DF 0F | | JSR | LTON |
| 1232 | 0F9B | 4C A4 0F | | JMP | 013 |
| 1233 | 0F9E | 20 D9 0F | 01B | JSR | LTOFF |
| 1234 | 0FA1 | 20 C7 0F | 01F17 | JSR | POFF |
| 1235 | 0FA4 | 20 E5 0F | 013 | JSR | OFK |
| 1236 | 0FA7 | 60 | | RTS | |
| 1237 | 0FA8 | 20 C7 0F | 0F | JSR | POFF |
| 1238 | 0FAB | 4C B7 0F | | JMP | ENT0 |
| 1239 | 0FAE | 20 C7 0F | 0B02 | JSR | POFF |
| 1240 | 0FB1 | 20 D9 0F | | JSR | LTOFF |
| 1241 | 0FB4 | 20 E9 0F | 0703 | JSR | ONHK |
| 1242 | 0FB7 | 20 EE 0F | ENT0 | JSR | RELRQ |
| 1243 | 0FBA | 60 | | RTS | |
| 1244 | 0FBB | | ;****************************************** | | |
| 1245 | 0FBB | A5 19 | SPUON | LDA | WD19 |
| 1246 | 0FBD | 09 08 | | ORA | #$08 |
| 1247 | 0FBF | 85 19 | | STA | WD19 |
| 1248 | 0FC1 | 26 09 | SPP1 | ROL | WD3 |
| 1249 | 0FC3 | 38 | | SEC | |
| 1250 | 0FC4 | 66 09 | | ROR | WD3 |
| 1251 | 0FC6 | 60 | | RTS | |
| 1252 | 0FC7 | A5 19 | POFF | LDA | WD19 |
| 1253 | 0FC9 | 29 F7 | | AND | #$F7 |
| 1254 | 0FCB | 85 19 | | STA | WD19 |
| 1255 | 0FCD | A5 31 | | LDA | STUS1 |
| 1256 | 0FCF | 29 F7 | | AND | #$F7 |
| 1257 | 0FD1 | 85 31 | | STA | STUS1 |
| 1258 | 0FD3 | 26 09 | | ROL | WD3 |
| 1259 | 0FD5 | 18 | | CLC | |
| 1260 | 0FD6 | 66 09 | | ROR | WD3 |
| 1261 | 0FD8 | 60 | | RTS | |
| 1262 | 0FD9 | 26 19 | LTOFF | ROL | WD19 |
| 1263 | 0FDB | 18 | | CLC | |
| 1264 | 0FDC | 66 19 | | ROR | WD19 |
| 1265 | 0FDE | 60 | | RTS | |
| 1266 | 0FDF | 26 19 | LTON | ROL | WD19 |

| LINE # | LOC | CODE | LINE | | |
|---|---|---|---|---|---|
| 1267 | 0FE1 | 38 | | SEC | |
| 1268 | 0FE2 | 66 19 | | ROR WD19 | |
| 1269 | 0FE4 | 60 | | RTS | |
| 1270 | 0FE5 | A9 04 | OFK | LDA #$04 | |
| 1271 | 0FE7 | D0 07 | | BNE STUSST | |
| 1272 | 0FE9 | A9 FB | ONHK | LDA #$FB | |
| 1273 | 0FEB | 4C F5 0F | | JMP STUSRS | |
| 1274 | 0FEE | A9 40 | RELRQ | LDA #$40 | |
| 1275 | 0FF0 | 05 26 | STUSST | ORA STUS | |
| 1276 | 0FF2 | 85 26 | | STA STUS | |
| 1277 | 0FF4 | 60 | | RTS | |
| 1278 | 0FF5 | 25 26 | STUSRS | AND STUS | |
| 1279 | 0FF7 | 85 26 | | STA STUS | |
| 1280 | 0FF9 | 60 | | RTS | |
| 1281 | 0FFA | | | .END LMAINL/1 | |

SYMBOL TABLE

| SYMBOL | VALUE | | | | | | | |
|---|---|---|---|---|---|---|---|---|
| ACLXPT | 0D36 | ADD1 | 0938 | ADD2 | 0937 | ADD3 | 0936 | |
| ADSTB | 06FE | AEXIT | 0D12 | ALK0 | 0CF6 | ALK1 | 0CFB | |
| ANS | 099C | AOFHK | 0D2C | ARC | 00CB | ARCOS | 0A00 | |
| AREL | 0D13 | ASXPT | 0A58 | ASXPT0 | 0A5F | ATBL | 006E | |
| ATBL1 | 0993 | AUT1 | 0D3F | BGMOFF | 0B82 | BGMON | 0BAC | |
| BITCLR | 099E | BITOP | 09A0 | BITSET | 09A3 | BP1 | 0E02 | |
| BPORT | 0DE7 | BPORT1 | 0E65 | BPT1 | 0EEF | BPT2 | 0ED8 | |
| BPT3 | 0E72 | BPT4 | 0E7E | BPT5 | 0E98 | BPTRAM | 0001 | |
| BYPTMR | 0004 | BYPTST | 0D88 | CALL | 099C | CCONT | 0F2D | |
| CCONT1 | 0F0A | CCONT2 | 0F2B | CDL | 096C | CLINT1 | 00C0 | |
| CLOSEX | 0A4E | CLSXPT | 0A20 | CONF | 0BE0 | CONT | 0F16 | |
| COSZ | 09C3 | COSZ0 | 09DB | COSZ1 | 0A3C | CP1 | 0000 | |
| CP10 | 0048 | CP11 | 0050 | CP12 | 0058 | CP13 | 0060 | |
| CP14 | 0068 | CP15 | 0070 | CP16 | 0078 | CP17 | 0080 | |
| CP18 | 0088 | CP19 | 0090 | CP2 | 0008 | CP20 | 0098 | |
| CP21 | 00A0 | CP22 | 00A8 | CP23 | 00B0 | CP24 | 00B8 | |
| CP3 | 0010 | CP4 | 0018 | CP5 | 0020 | CP6 | 0028 | |
| CP7 | 0030 | CP8 | 0038 | CP9 | 0040 | CPTOPN | 08FE | |
| CTR3 | 0999 | CTRL1 | 0C87 | CTU1 | 094D | CTU2 | 0962 | |
| CTU4 | 0975 | CURSTA | 002D | DECTMR | 0CDB | DELAY | 002F | |
| DELY | 099D | DENB | 083D | DIALST | 0899 | DINT | 0896 | |
| DIPT2A | 00C3 | DIPT2B | 00C2 | DIPT3A | 0081 | DIPT3B | 0083 | |
| DL0 | 09C0 | DLY0 | 08DA | DLY2 | 08D8 | DLYQ | 08D4 | |
| DND | 099C | DSSHLD | 080D | ENDTBL | 0918 | ENT0 | 0FB7 | |
| EXFRE | 0BDC | EXIT2 | 0B98 | EXIT5 | 09EA | FIND | 0E07 | |
| FLASH | 0CC1 | FLSHTM | 0030 | FNMX1 | 0029 | FTIME | 0028 | |
| FUNCH | 0BB6 | FUNMUX | 0002 | HANFRE | 0BC3 | HCLSXP | 0C3F | |
| HCONF | 0C4F | HFENAB | 0003 | HFR1 | 0BC9 | HK1 | 0C93 | |
| HK2 | 0C9F | HK3 | 0CB3 | HK4 | 0C8D | HLINE | 099C | |
| HMIDT5 | 0B30 | HNDFR1 | 099C | HNDFR2 | 0BC2 | HOLD | 0AFC | |
| HOOKSW | 0C88 | HSRTN | 0AFD | HSTSER | 0C34 | HTLINE | 0BE1 | |
| HTLN0 | 0BFB | HTNOF | 0C07 | HTNON | 0C20 | HTONF1 | 0C31 | |
| HTONF2 | 0C2F | HTOUT | 0B25 | HTSTR | 0B31 | ID1 | 0E24 | |

SYMBOL TABLE

SYMBOL  VALUE

| SYMBOL | VALUE | SYMBOL | VALUE | SYMBOL | VALUE | SYMBOL | VALUE |
|---|---|---|---|---|---|---|---|
| IDLE | 0E13 | IHP | 09E7 | IHP0 | 09ED | IHP1 | 09E0 |
| IIPORT | 0A7A | INCT | 0385 | INDX1 | 002B | INDX2 | 002C |
| INDX4 | 0027 | INDX5 | 0028 | INIT | 087E | INITDL | 0879 |
| INITRP | 088E | INTST | 00CE | INTER | 0887 | INTRTN | 08A2 |
| IOFF | 0AEC | IPORT | 0A82 | KYANS | 0019 | KYBPSS | 0008 |
| KYCONT | 0021 | KYFLSB | 0015 | KYHFRE | 0019 | KYHKSW | 0006 |
| KYHOLD | 000D | KYMUSC | 0007 | KYPAGE | 0024 | KYPREL | 0011 |
| KYSPU | 0009 | LAMP | 0C6E | LAMP1 | 0C7F | LAUTLK | 0CE8 |
| LDLTCH | 00C5 | LIVE | 0D93 | LIVE0 | 0D85 | LLTCH | 00C6 |
| LMIKMT | 0D72 | LNKCTR | 002F | LNKMUX | 0005 | LNMX1 | 0D07 |
| LONG | 0C83 | LOP1 | 094A | LOWCT | 00C4 | LSMX | 0927 |
| LTOFF | 0FD9 | LTON | 0FDF | MKENB | 099C | MLOFF | 0D8E |
| MMUT | 099C | MRG1 | 0947 | MSCTR | 0032 | MUTE | 0D82 |
| MUX | 002E | NEWMUX | 0CFF | NOHF1 | 0C2B | NOHF0 | 0C29 |
| NTSEZD | 0EB7 | NTSZD0 | 0ECC | 0D515 | 0F6A | 01101 | 0F91 |
| 012 | 0F8E | 013 | 0FA4 | 01A | 0F87 | 01B | 0F9E |
| 01F17 | 0FA1 | 0703 | 0FB4 | 0A | 0F95 | 0B02 | 0FAE |
| 0F | 0FA8 | OFFHK | 0EFF | OFK | 0FE5 | ONCR0 | 0CAC |
| ONHK | 0FE9 | OPENXP | 0EF8 | OUT | 0B84 | OUTHI | 086C |
| OUTHI0 | 0870 | OUTLO | 0873 | PAGE | 06E0 | PAGEOF | 0C53 |
| PAGEON | 0C5F | PAGEWD | 0017 | PMIDTS | 0AC5 | PNOT1 | 0C6B |
| POFF | 0FC7 | PRC | 00CC | PREL | 0A9C | PRREL | 0A9B |
| PRT22B | 0FAE | PSIHLD | 0ABC | PSTH0 | 0AC0 | PSTH1 | 0AD3 |
| PSTH2 | 0AD0 | PSTH3 | 0AB3 | PT22A | 00C1 | PT22B | 00C0 |
| PT32A | 0080 | PT32B | 0082 | PTOUT | 0AD6 | PTSTR | 0AF1 |
| PWON | 0800 | REL0 | 0AB7 | REL1 | 0E20 | RELDL | 083E |
| RELRQ | 0FEE | RESET | 0801 | RESPRT | 0A78 | RESPST | 08A6 |
| RING | 0F3D | RINGRS | 0F39 | RINGST | 0F33 | ROLOVR | 0A6B |
| RSTLP | 0812 | RT | 0E42 | RT1 | 0E53 | SC8T | 0A3A |
| SCONT | 0F13 | SCONT1 | 0F04 | SCONT2 | 0F11 | SDEB | 0B93 |
| SDL | 09B6 | SEEZ0 | 09C2 | SEEZ1 | 09C2 | SEEZ10 | 09C2 |
| SEEZ11 | 09C2 | SEEZ12 | 09C2 | SEEZ13 | 09C2 | SEEZ14 | 099C |
| SEEZ15 | 0D71 | SEEZ16 | 09C2 | SEEZ17 | 09C2 | SEEZ18 | 099C |
| SEEZ19 | 09C2 | SEEZ2 | 09C2 | SEEZ20 | 09C2 | SEEZ21 | 09C2 |
| SEEZ22 | 0BDF | SEEZ23 | 0CE7 | SEEZ3 | 09C2 | SEEZ4 | 09C2 |
| SEEZ5 | 09C2 | SEEZ6 | 09C2 | SEEZ7 | 09C2 | SEEZ8 | 09C2 |
| SEEZ9 | 09C2 | SEZD | 0E9F | SHORT | 0944 | SHORT1 | 0C7A |
| SHSH | 0F40 | SPOFF | 0BD8 | SPP1 | 0FC1 | SPUOFF | 0EE4 |
| SPUON | 0FBB | SRL | 0863 | SRRBIT | 09D6 | ST | 0E2A |
| START | 0919 | STB32A | 09A7 | STEAL | 0E27 | STLLTH | 08C0 |
| STLTCH | 08BE | STROBA | 0A60 | STROBB | 0A6D | STSER | 0A12 |
| STUS | 0026 | STUS1 | 0031 | STUSRS | 0FF5 | STUSST | 0FF0 |
| SUFR1 | 0F48 | SUPTBL | 0901 | SXPT | 0A54 | SYBY | 08C3 |
| SYBY1 | 08CE | SYCT1 | 083C | SYLP1 | 0886 | SYLP2 | 088A |
| SYNC | 0825 | SYNC1A | 0852 | SYNC2 | 0858 | SYNC5 | 0866 |
| SYNCA | 0982 | T1CT | 00C1 | T1P5T | 08AE | T1T | 08F0 |
| T2P5T | 08F7 | TCTR3 | 0997 | TDLER | 088D | TEMP | 0000 |
| TIFL | 00CD | TLRB | 0637 | TMFEXT | 0CDF | TMFLS | 0CC2 |
| TMFLS0 | 0CE0 | TMFOUT | 0CE5 | TMP1 | 0029 | TNOF | 09F6 |
| TNON | 0A0D | TOHB | 0B58 | TRRB | 0B6B | TRSB | 0B4D |

SYMBOL TABLE

| SYMBOL | VALUE | | | | | | |
|---|---|---|---|---|---|---|---|
| TSPUEN | 0EA0 | TTIME | 0G0E | TTMR | 002A | ULTCH | 00C7 |
| UPCT | 00C5 | WAIT | 0F10 | WD0 | 0006 | WD1 | 0007 |
| WD10 | 0010 | WD11 | 0011 | WD12 | 0012 | WD13 | 0013 |
| WD14 | 0014 | WD15 | 0015 | WD16 | 0016 | WD17 | 0017 |
| WD18 | 0018 | WD19 | 0019 | WD2 | 0008 | WD20 | 001A |
| WD21 | 001B | WD22 | 001C | WD23 | 001D | WD24 | 001E |
| WD25 | 001F | WD26 | 0020 | WD27 | 0021 | WD28 | 0022 |
| WD29 | 0023 | WD3 | 0009 | WD30 | 0024 | WD31 | 0025 |
| WD4 | 000A | WD5 | 000B | WD6 | 000C | WD7 | 000D |
| WD8 | 000E | WD9 | 000F | WDFDL | 0D98 | WDFDU | 0DB8 |
| WSRF | 0DC8 | XREF | 0A87 | ZROLP | 0804 | | |

END OF ASSEMBLY

Figure 5:
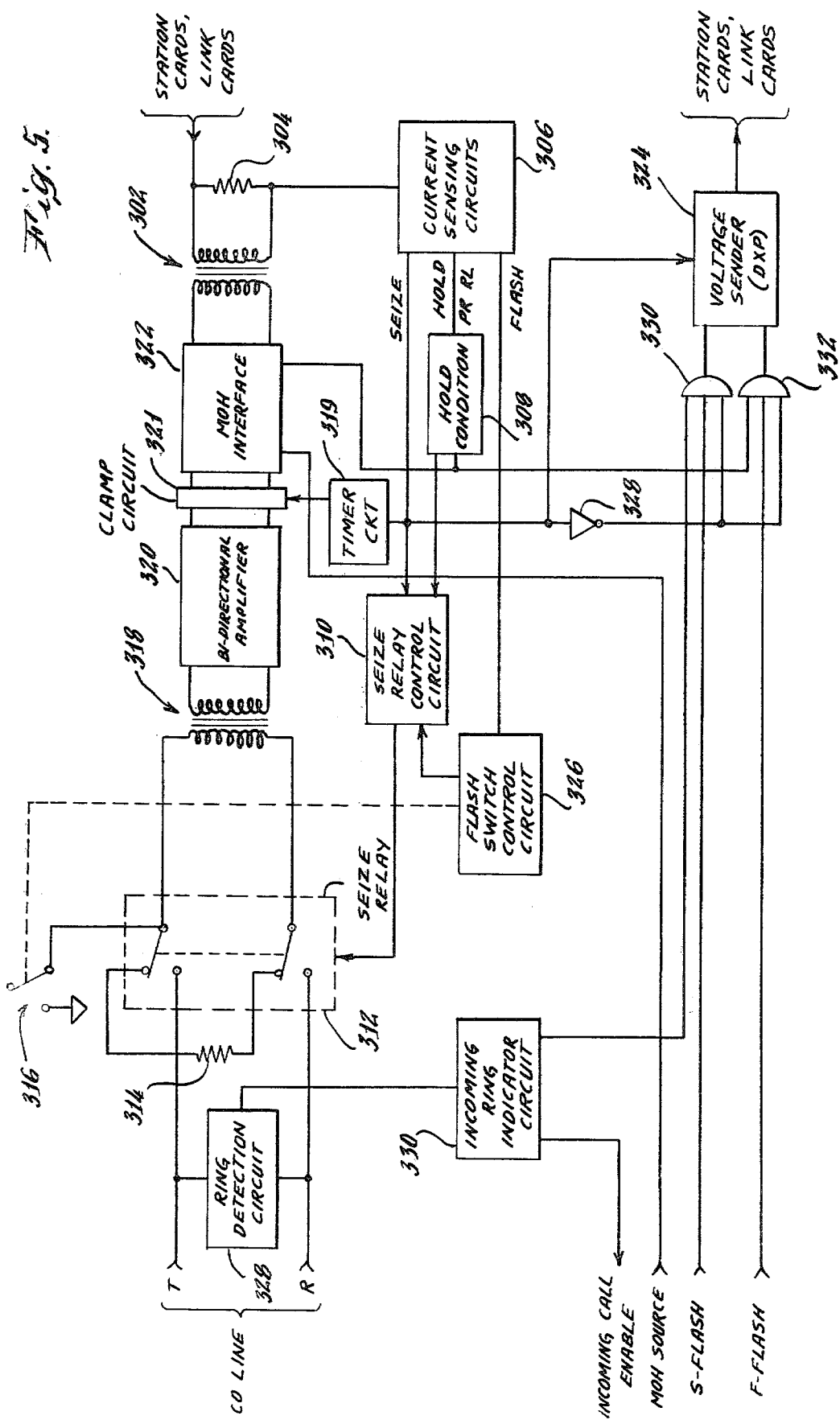
FIG. 5 is a block diagram of the line card circuit which is a component of applicants' electronic key telephone system.

Referring specifically to the circuit shown in FIG. 5, each line card 300 includes a single passive port which is connected to one active port of each of a variable number of station cards 200 in the system of FIG. 1, and also to an active port in each of the link cards in the system of FIG. 2. The passive port receives DC signal currents from the connected active ports through the shunt resistor 304 and through the DC signal current-receiving winding of transformer 302, and current sensing circuits 306 generate either a SEIZE, FLASH, or HOLD/PRRL (privacy release) signals depending upon whether the DC signal current is 1.6 ma, 6.4 ma, or 7–14 ma. The SEIZE signal causes the seize relay control circuit 310 to energize the winding of seize relay 312, causing the ganged armatures to disconnect from load resistor 314 and establish connections to the tip T and ring R of the CO line. The SEIZE signal simultaneously triggers timer circuit 319 which activates a clamping circuit 321 for about 1 second in order to limit the noise and ringing signal coming in from the CO line. With the line seized, dialing may be accomplished at the station set by either dual-tone, multi-frequency (DTMF) signal generators or by an outpulse generator. DTMF dial signals are transmitted through transformer 302, music-on-hold interface circuit 322, bi-directional amplifier 320, transformer 318, and seize relay 312 to the CO line. Outpulse dialing is accomplished by pulse-modulating the SEIZE signal so as to cause the seize relay 312 to modulate the loop current as a function of the pulses generated at the station set.

The SEIZE signal is also fed to the voltage sender 324, which responds by generating a DC signal voltage (−2 v.) indicating seizure of the line card passive port. If the seized CO line is put on hold by transmission of a 14 ma DC current pulse from the seizing port, a current sensing circuit 306 generates a HOLD signal pulse which causes hold condition sensing circuit 308 to generate a constant output which activates the MOH interface circuit 322 to pass the MOH SOURCE signal received via the tone card 500 to the held CO line. Because the analog crosspoint in the previously seizing active port is now open, no signal current will flow to current sensing circuits 306, and the MOH SOURCE will not be heard at the associated station set. The output of the hold condition sensing circuit 308 is also fed to an input of AND gate 322, which receives a second input from inverter 328 in response to the termination of the SEIZE signal, and a third input F-FLASH which is received from the tone card 500. The output of AND gate 332 consequently fluctuates in synchronism with the F-FLASH SIGNAL, as does the output of voltage sender 324, thereby signalling the digital crosspoints of every connected active port that the CO line is on hold and may be seized by any connected active port. A PRRL signal pulse from one of the current sensing circuits 306 in response to a 7–14 ma DC signal current pulse from the seizing active port will cause hold condition sensing circuit 308 to generate a constant output, so that the MOH interface circuit 322 will be activated and one input will be provided to AND circuit 332. The SEIZE signal is simultaneously terminated by de-activation of the DC current signal generator in the seizing active port, causing inverter 328 to provide another input to AND circuit 332. Thus, voltage sender 324 ceases to generate a seized voltage signal (−2 v.) and begins to generate an output which fluctuates between 0 v. and −2 v. at the F-FLASH rate. Therefore, other station sets 190 in the system are informed that they may also make connection to the CO line.

When a FLASH signal is generated by one of current sensing circuits 306 in response to a flash DC current signal (6.4 ma), the flash switch control circuit 326 responds by de-activating seize relay control circuit 310 for about 1 second, thereby breaking the connection of seize relay 312 to the CO line for that period of time. The SEIZE signal is not interrupted, however. Thus, loop current is broken to disconnect the outside party's circuit from the CO line while retaining the line for another call. If the EKTS is employed behind a PBX which requires it, this line card circuit is modified by breaking the controlling connection from flash switch control circuit 326 to the seize relay control circuit 310, and by adding a relay 316 which has its armature connected directly to the upper armature of seize relay 312. In this revised circuit, the generation of the FLASH signal will not affect the seize relay control circuit 310, leaving the seize relay 312 energized to connect transformer 318 to the PBX line, but the flash switch control circuit 326 will cause relay 316 to connect the conductor T to circuit ground during FLASH. As in the first embodiment of this circuit, the SEIZE signal is not terminated. Thus, loop current is broken to disconnect the other party's circuit from the PBX line while retaining the line in order to place another call.

In the case of an incoming call, the ringing signal from the central office will cause ring detection circuit 328 to activate incoming ring indicator circuit 330, which then generates an INCOMING CALL ENABLE signal which is fed to tone card 500, and a logic 1 input signal to AND gate 330. Since there is no SEIZE signal, the output of inverter 328 is also logic 1. Thus, the S-FLASH signal will pass through AND gate 330 to modulate the output of voltage sender 324 to provide an indication of the incoming call to the digital crosspoints of the connected active ports, any one of which may seize the passive port of the line card circuit and thereby seize the associated CO line.

Figure 6:
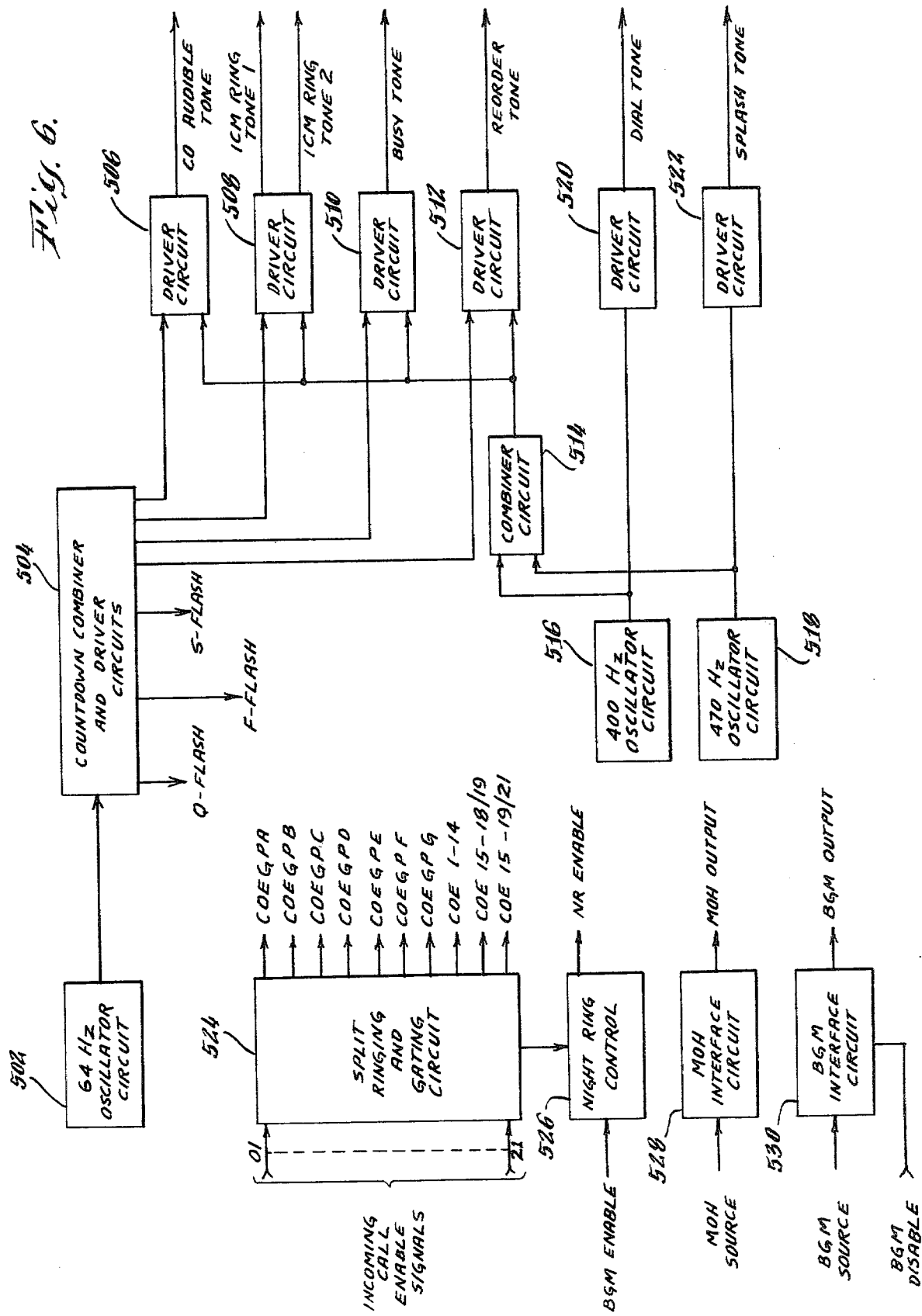
FIG. 6 is a block diagram of the tone generator card circuit which is a component of applicants' electronic key telephone systems.

Referring specifically to the circuit shown in FIG. 6, tone generator card 500 comprises a 64 hz oscillator circuit 502 which provides a square wave to the countdown combiner and driver circuits 504, and these in turn generate a Q-FLASH (I-hold) signal, an F-FLASH (hold) signal, and an S-FLASH (incoming call) signal. The Q-FLASH and S-FLASH signals are fed to the function multiplexer 230 of station card circuit 200 (FIG. 3) to be sampled, the samples being serially transmitted to microcomputer 216 for possible inclusion in the data transmitted to the associated station set 100. The S-FLASH and F-FLASH signals are fed to line card 300. The countdown combiner and driver circuits 504 also provide driver signals to the driver circuits 506, 508, 510 and 512, which also receive the output of combiner circuit 514, which mixes the outputs of the 400 hz oscillator circuit 516 and the 470 hz oscillator circuit 518. These oscillator outputs are also fed to driver circuits 520 and 522, respectively, which generate DIAL TONE and SPLASH TONE, respectively. DIAL TONE is fed only to the register card circuit(s) 800, and SPLASH TONE is fed only to the station cards 200.

Driver circuit 506 produces CO AUDIBLE tone at the rate of 1 second on, 1 second off, 1 second on, 3 seconds off, and is fed to the station cards 200 and page card 400. Driver circuit 508 produces ICM RING TONE at two isolated outputs at the rate of 1 second on, 3 seconds off, and is fed only to the station cards 200. Driver circuit 510 produces BUSY TONE at the rate of 0.5 second on, 0.5 second off, and is fed to the link card circuit(s) 700. Driver circuit 512 produces REORDER TONE at the rate of 0.125 second on, 0.125 second off. The outputs of driver circuits 508, 510, 512 and 520 are all employed in internal link functions, and may be eliminated in a system which has no link circuits 700.

The split ringing and gating circuit 524 receives the INCOMING CALL ENABLE signals which the line cards 300 generate when an incoming call is detected, and in response generates several CO AUDIBLE ENABLE signals, any one or more of which can be transmitted through backplane wiring to any station card 200 or group of station cards 200. For example, if an INCOMING CALL ENABLE signal is received from line card 1, 2 or 3, a CO AUDIBLE ENABLE signal is sent from output COEGPA via the backplane to a predetermined group of station cards 200. The following outputs COEGPB, C, D, E, F and G are similarly associated with line cards 4-6, 7-9, 10-12, 13-15, 16-18 and 19-21, respectively. Output COE 1-14 is associated with line cards 1-14, and a CO AUDIBLE ENABLE signal will be provided via the backplane to all of the station cards 200 connected to this output. Output COE 15-18/19 is similarly associated with line cards 15-18/19, and COE 15-19/21 is similarly associated with line cards 15-19/21. This arrangement provides great flexibility in the distribution of the CO AUDIBLE tone, e.g., enabling direct signalling to predetermined small groups of station sets behind PBX that there is an incoming call from one of a small group of CO lines, and facilitating the prevention of such direct signalling on those incoming calls that are received at an attendant's station for forwarding to the called party.

A station set 100 designated by backplane wiring controls the night ring control circuit 526. As in all station sets, the BGM ENABLE signal is generated in response to turn-on of the BGM control switch. Due to the connection of the BGM ENABLE signal output from the station card 200 associated with the designated station set 100 to the night ring control circuit 526, turn-on of the BGM control switch at the station set enables generation of the NR ENABLE signal upon receipt of a logic level signal from the split ringing and gating circuit 524 in response to any INCOMING CALL ENABLE signal. The NR ENABLE signal is fed to page card 400 to broadcast CO AUDIBLE TONE as an all-page transmission. The optional MOH interface circuit 528 distributes the MOH SOURCE signal to all line cards selected to receive it through the backplane wiring. The optional BGM interface circuit 530 distributes the BGM SOURCE signal to all station sets selected to receive it through the backplane wiring, except when it receives a BGM DISABLE signal from the page card 400.

Figure 4:
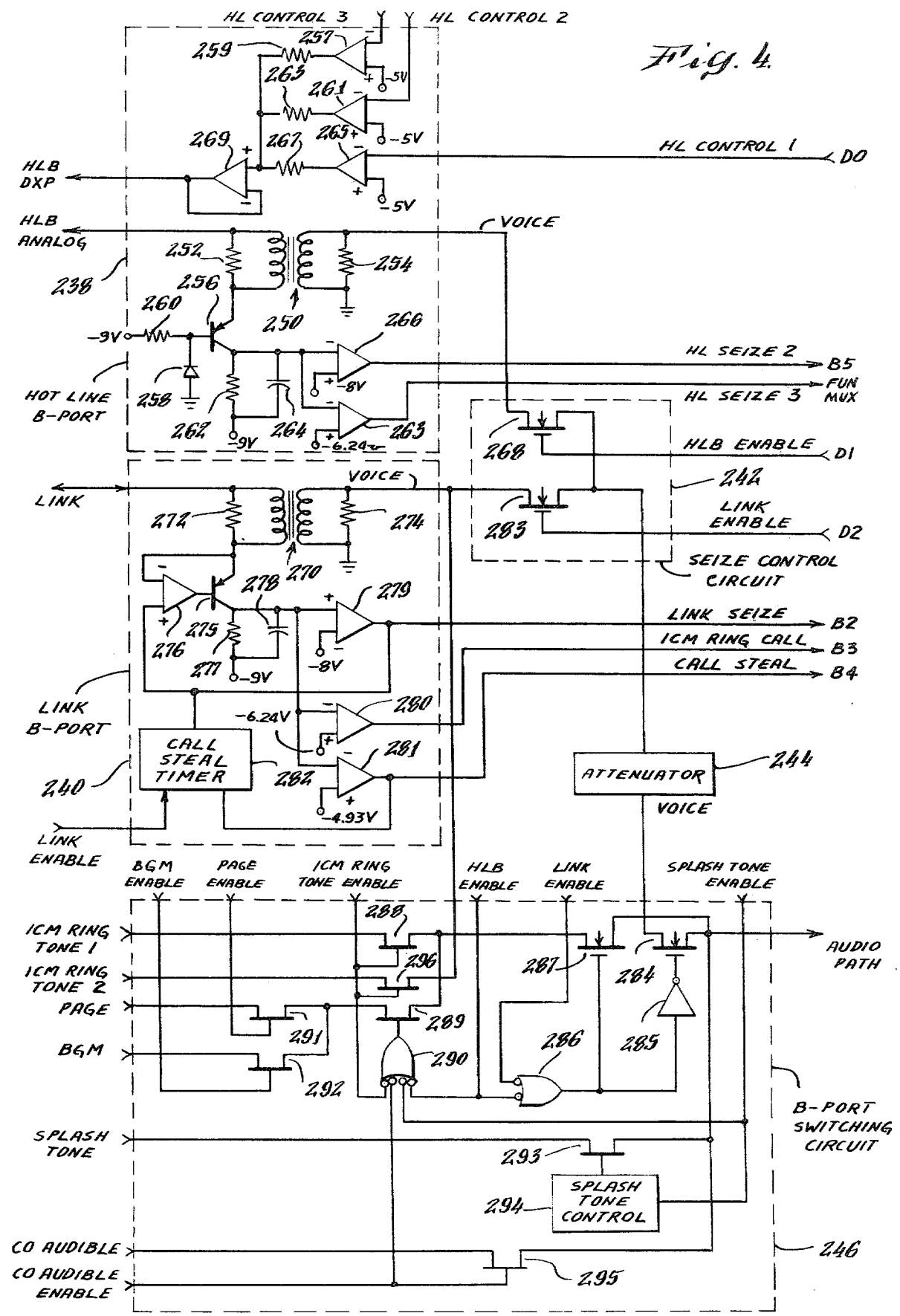
FIG. 4 is a schematic wiring diagram of a section of the station card circuit shown in FIG. 3.
Figure 7:
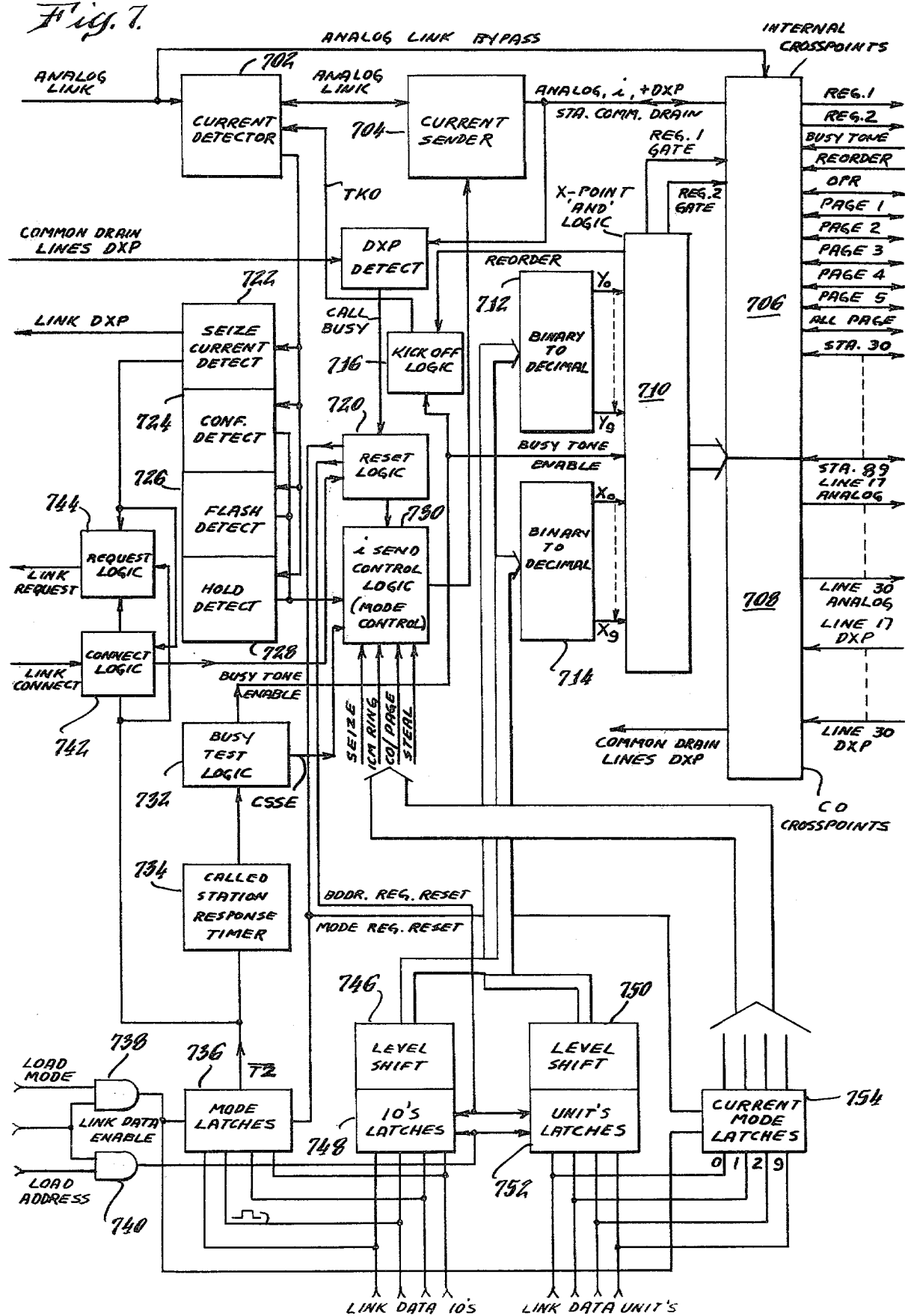
FIG. 7 is a block diagram of the link card circuit which is a component of applicants' electronic key telephone system as shown in FIG. 2.

Referring specifically to FIG. 7, the link card circuit shown there includes a single passive port and multiple active ports. The passive port comprises current detector circuit 702, which includes a DC current signal blocking transformer in the ANALOG LINK path and is constructed in a manner similar to the current detector circuit in hotline B-port 238 in station card 200 (FIG. 4). The sensed DC signal current from an active port of a seizing station card 200 will cause the current detector 702 to generate an output voltage which is fed to a series of voltage comparators 722, 724, 726, and 728 which will be successively triggered in response to sensed DC signal currents of 1.6 ma, 3.2 ma, 6.4 ma, and a 14 ma pulse (50 milliseconds), respectively, which cause the voltage output of current sensor 702 to increase to successively higher levels. In response to a DC signal current indicating seizure (1.6 ma) received from a station card active port on the ANALOG LINK input to current sensor 702, a LINK DXP DC voltage signal (−2 v.) will be generated by comparator 722 and sent to all station cards 200 which are also connected to the ANALOG LINK input to current sensor 702. Simultaneously, comparator 722 applies a SEIZE signal to request logic circuit 744, which in turn generates a LINK REQUEST signal which is sent to the register card(s) 600. If the register or registers are in use, no LINK CONNECT signal will be returned. In a system with more than one register card 600, only one can be in the ready status, and the other(s) will all be either in use, i.e., connected to a link circuit 700, or in standby status. The ready register becomes connected in response to the LINK REQUEST signal, and sends a LINK CONNECT signal to connect logic circuit 742, and a LINK DATA ENABLE signal and a LOAD ADDRESS signal to AND gate 740, which responds by enabling the tens latches 748 and the units latches 752. The connecting register will then send back an 8-bit address, four bits to tens latches 748 and four bits to units latches 752, representing either a decimal 98 or 99 which identifies the connected register (in a two-register system) to which a register crosspoint REG 1 or REG 2 is to be closed. The binary-to-decimal converter circuits 712 and 714 decode the binary outputs of level shifters 750 and 746, respectively, so that B/D converter 714 provides an input to AND logic circuit 710 representative of the first register-identifying digit (9) and B/D converter 712 provides an input to AND logic circuit 710 representative of the second register-identifying digit (8 or 9). These two inputs will cause AND logic circuit 710 to generate either a REG 1 GATE signal or a REG 2 GATE signal to close either the REG 1 crosspoint to a first register or the REG 2 crosspoint to a second register. Dial tone is now passed from tone card 500 via the connected register 600 through the closed REG crosspoint and over the ANALOG LINK BYPASS to indicate to the caller that he may now send dial signals to identify that passive port which he wishes to seize. Either DTMF or outpulse dial signals will be transmitted via the ANALOG LINK BYPASS around current sensor 702, and current sender 704 through the closed REG crosspoint to the connected register 600, which decodes the dial signals, puts them in binary form, and decides whether or not the number is valid. If the number is not valid, e.g., there is no passive port to which the dialed number has been assigned, the REORDER TONE from tone card 500 is sent via the connected register 600 over the ANALOG LINK path through a designated internal crosspoint 706, which is closed in response to a reorder crosspoint address (97) sent by the register 600 to the latches 748, 752, which have been re-enabled by AND gate 740 to receive the reorder crosspoint address, which replaces the invalid address. This new address displaces the register-identifying address (97 or 98) and thereby causes the REG crosspoint to the register to re-open. Also, a REORDER signal is sent to start kick-off logic circuit 716, which generates a 20 millisecond pulse signal TKO after a predetermined period of time (e.g., about 8 seconds), in response to which the current detection circuit 702 causes the LINK DXP output of comparator 722 to go to +2 v. for 20 milliseconds, which causes the seizing active port to cease transmission of its DC seize current signal. As a result, the LINK DXP signal goes to +2 v. to indicate that the link is idle, and the SEIZE signal to request logic circuit 744 is terminated, causing termination of the LINK REQUEST signal. The caller may release and reseize the link before kick-off occurs.

If the called number is valid, the register 600 generates a LOAD MODE signal in addition to the previously-generated LINK DATA ENABLE and LOAD ADDRESS signals to cause AND gate 738 to enable the mode latches 736 and the current mode latches 754. The register is preferably designed to recognize the following number groups as valid and to issue the oppositely-listed current mode signals and address data:

| Called Numbers | Current Mode Signal | Link Data 10s | Link Data Units |
|---|---|---|---|
| 30–89 | decimal 0 | binary 3–8 | binary 0–9 |
| 130–189 | decimal 1 | binary 3–8 | binary 0–9 |
| 230–289 | decimal 2 | binary 3–8 | binary 0–9 |
| 917–930 | decimal 9 | binary 1–3 | binary 0–9 |
| 991–996 | decimal 9 | binary 9 | binary 1–6 |

Thus, a dialled number 56 will cause a logic level signal representative of a decimal 0 generated in the register to be sent by the register to the first input to the current mode latches 754 via the first link data units line, thereby providing a SEIZE signal to mode control circuit 730. The absence of a prefix number indicates that an internal call is being made and can be answered handsfree. The first address digit is a binary-coded 5 which is fed to tens latches 748, and the second address digit is a binary-coded 6 which is fed to the units latches 752. As another example, a dialled number 148 will cause the register to send a logic level signal representative of a decimal 1 generated in the register to the second input to the current mode latches 754 via the second link data units line, thereby providing an ICM RING signal to mode control circuit 730. The prefix number 1 indicates that an internal call is being made to the called handset and must be answered via the called party's handset. The first and second address digits are a binary-coded 4 and binary-coded 8, which are fed to the tens latches 748 and units latches 752, respectively. A third example is the case of a dialled number 265, which will cause the register to send a logic level signal representative of a decimal 2 generated in the register to the third input to the current mode latches 754 via the third link data units line, thereby providing a STEAL signal to mode control circuit 730. The prefix number 2 indicates that the caller is effecting a "call steal", i.e., answering a call that is coming in at another station set, sometimes referred to as alternate-point answering. In this case, the address data (binary-coded 6 and binary-coded 5) identifies the station set to which the incoming call is directed. The prefix number 9, when dialled before the numbers 17 through 30, indicates that the caller wishes to seize a CO line through one of the active ports comprising the paired CO crosspoints labelled LINES 17–30 ANLG and LINES 17–30 DXP, and causes the register to send a logic level signal representative of a decimal 9 generated in the register to the fourth input to the current mode latches 754 via the fourth link data units line, causing a CO signal to be sent to mode control circuit 730. The prefix 9, when dialled before the numbers 91 through 96, indicates that the caller wishes to seize one of the passive ports in the page card 400 via one of the group of active ports comprising the single-line internal crosspoints 706 labelled PAGE 1, 2, 3, 4 and 5 and ALL PAGE. As before, the register sends a logic level signal representative of a decimal 9 generated in the register to the fourth input to the current mode latches 754, which in turn provide a PAGE signal to mode control circuit 730. There may also be a special single-digit number such as 0 which is frequently dialled, e.g., to reach the operator at an attended station in the system. The register(s) will interpret the 0 as requesting transmission of a two-digit address (90) which will cause the link to close the internal crosspoint labelled OPR to the operator's station.

The mode latches 736 receive a single input signal pulse from the register at their second input simultaneously with the logic level input to current mode latches 754, causing a constant, inverted output $\overline{T2}$ to be fed to called station response timer 734 which in turn activates busy test logic circuit 732 for a predetermined period of time (e.g., 2.5 seconds). During this time period, if no CALL BUSY signal is received from the DXP detection circuit 718, busy test logic circuit 732 will generate no output, but at the end of the time period it will generate a CSSE (called station send enable) signal, thus enabling current sender (mode) control logic circuit 730 to generate a control voltage output to current sender 704. Then, in response to inputs either from the voltage comparators 724, 726 or 728 or from current mode latches 754, mode control logic circuit 730 will alter its normal DC output (+8 v.). In response to a logic level SEIZE, ICM RING, CO/PAGE or STEAL input signal from current mode latches 754, mode control logic circuit 730 will generate a DC voltage output of +7.2 v., +6.5 v., +7.2 v., or +6.5 v., respectively, which will in turn cause current sender 704 to generate a DC output current of 1.6 ma, 3.2 ma, 1.6 ma, or 3.2 ma, respectively, which is transmitted via a closed crosspoint in arrays 706, 708 to the passive port to be seized. If the passive port is in the page card 400, or is the link B-port 240 of a station card 200, the DC voltage signal indicating seizure (−2 v.) or, in the case of the station card, pre-emptive seizure (−4 v.), will be sent back to the link 700 over the single conductor on which the DC signal current effecting seizure (1.6 ma) is sent to the page card or link B-port, and will pass through the closed crosspoint (one of the group from PAGE 1, 2, 3, 4, 5, ALL PAGE, and STA 30 through STA 89) on the STA COMMON DRAIN conductor to DXP detection circuit 718 during the time period in which the busy test logic circuit 732 is activated. In response to either −2 v. or −4 v., which indicate a seized or pre-emptively seized passive port, respectively, the CALL BUSY signal will be generated by the DXP detection circuit 718, in response to which the reset logic circuit 720 clears the address latches 748, 752 and the busy test logic circuit 732 generates a BUSY TONE ENABLE signal, which starts the kick-off logic circuit 716 and is fed as an input to AND logic circuit 710. The address latches 748, 752 now hold the 00 address, which is the address of the BUSY TONE crosspoint. In response to this address and the BUSY TONE ENABLE signal, the AND logic circuit closes the BUSY TONE crosspoint to pass the busy signal from the tone card via the ANALOG LINK path to the caller's station card 200 and thence to associated station set 100. The caller must then either release the link before generation of a TKO signal pulse and then reseize it or another link, or he will be kicked off the link upon generation of the TKO signal by logic circuit 716. Upon either release or kick-off, the SEIZE signal to request and connect logic circuits 744 and 742 will be terminated, causing initiation of the LINK RESET signal to reset logic circuit 720, which responds by issuing both MODE REG RESET and ADDR REG RESET signals to latches 736, 754 and 748, 752 respectively. The address latches 748, 752 have already been cleared in response to the CALL BUSY signal to the reset logic circuit 720.

If a line card 300 is seized through a pair of crosspoints 708, e.g., the pair labelled LINE 17 ANLG and LINE 17 DXP, the DC voltage signal from the line card passive port is received via the latter (DXP) crosspoint and fed via the COMMON DRAIN LINE DXP connected from all the drain electrodes of the digital crosspoints labelled LINES 17-30 DXP to the DXP detection circuit 718, which responds in the same manner as it does to the DC voltage signals received from the link B-port of a station card over the STA COMMON DRAIN conductor, as previously described.

If the passive port seized by link 700 is in a line card 300, it is possible for the calling party to effect multi-line conferencing (seizing of a second line card 300), flash signalling (breaking loop current long enough to drop the called party while retaining the line), placing the called party on hold, and privacy release, all in response to DC current signals to the current detector 702 which will respond thereto by generating a voltage output to voltage comparators 724, 726 and 728 as described earlier herein. Those voltage comparators provide their outputs to mode control logic circuit 730, which responds when enabled by the CSSE signal to cause current sender 704 to generate a DC signal current at the same level as the DC signal current received by current detector 702.

Upon termination of a completed call, internal or external, the calling party's station card 200 ceases to send DC signal current to the link 700, causing the output of current sensor to drop below the triggering threshold of voltage comparator 722. Thus the LINK DXP signal goes to +2 v., indicating that the link is again seizable, and the SEIZE signal to request logic circuit 744 is terminated. The register has previously been disconnected in response to signal $\overline{T2}$ from mode latches 736, which overrides the SEIZE signal from comparator 722. The LINK RESET signal is now generated to cause reset logic circuit 720 to generate MODE REG RESET and ADDR REG RESET to clear all of the latches 736, 748, 752, and 754.

Figure 8:
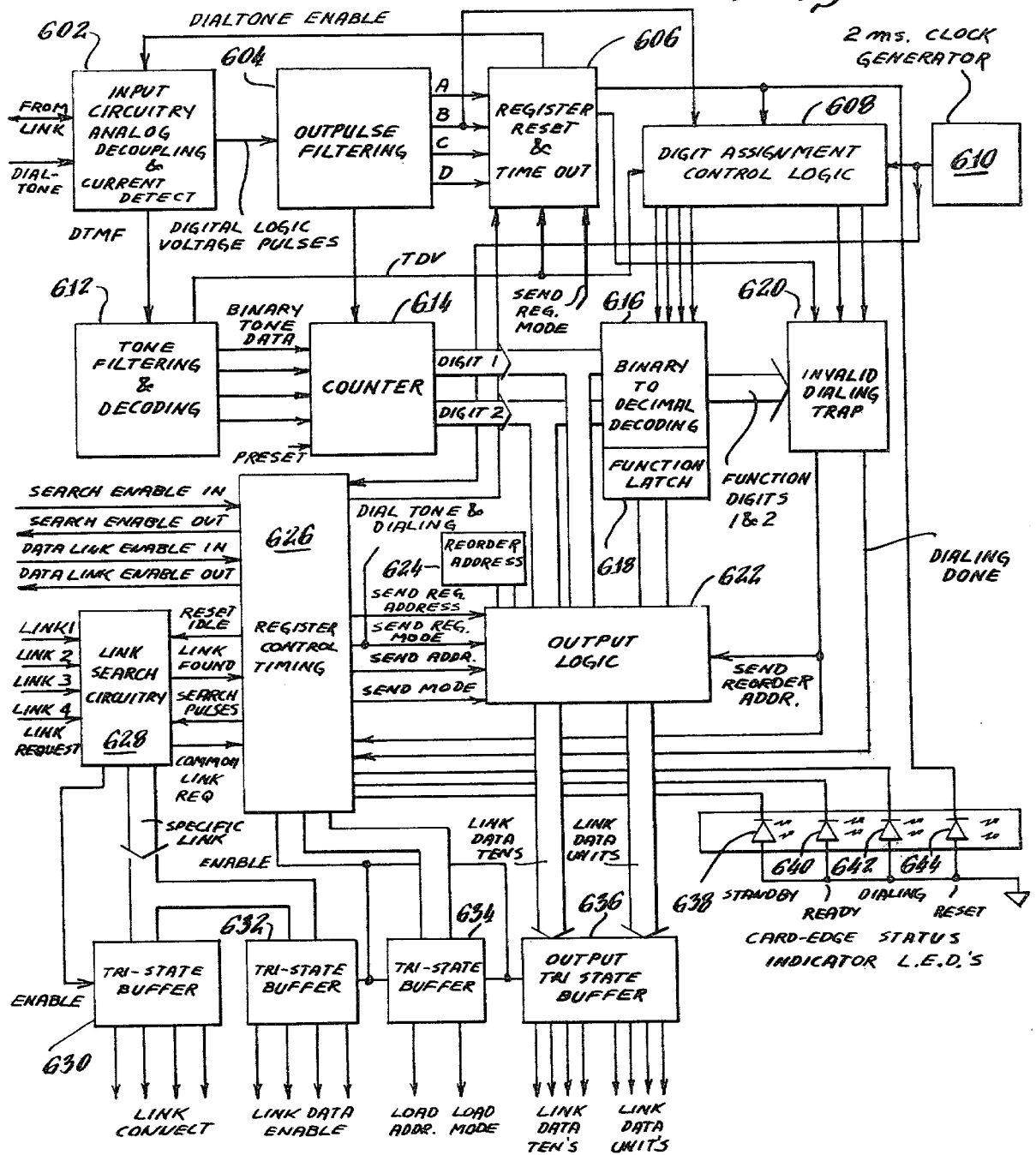
FIG. 8 is a block diagram of the register card circuit which is a component of applicants' electronic key telephone system as shown in FIG. 2.

Referring specifically to FIG. 8, the register circuit 600 shown there may be connected to any number of link circuits 700, e.g., four, as shown, any one of which can send a LINK REQUEST signal to link search circuit 628, which responds to that signal by sending a COMMON LINK REQUEST signal to register control timing circuits 626. If it is not in the ready status, circuit 626 will not send SEARCH PULSES, which have the same width (2 milliseconds) and frequency (250 hz) as the output of clock generator 610, to circuit 628, and the register's tristate buffers 630, 632, 634 and 636 will not be enabled to pass data to the link. If it is in the ready status, circuit 626 will send SEARCH PULSES to the link search circuit 628, which responds by sending a constant logic level ENABLE signal to tri-state buffer 630 and by transmitting a logic level LINK CONNECT signal to the specific link identified by the data output from link search circuit 628 to the buffer 630. A LINK FOUND signal is also sent to timing circuit 626, which responds by sending an ENABLE signal to tri-state buffers 632, 634 and 636. Buffer 632 then provides a logic level LINK DATA ENABLE signal to the specific link identified by the data output from link search circuit 628, and buffer 634 sends a LOAD ADDR signal to all the link circuits in the system, to which its two outputs are commonly connected. Timing circuit 626 then sends a SEND REG ADDR signal to output logic circuit 622, causing it to feed the register's stored two-digit address, (97 or 98) to the output tri-state buffer 636, the first digit being sent in four-bit binary code to the link data tens inputs, and the second digit being sent in the same code to the link data units inputs. The timing circuit 626 then sends the SEND REG MODE signal to output logic 622 and subsequently terminates the ENABLE signal to buffers 632, 634 and 636 and sends (1) the DIAL TONE & DIALING signal to the register reset and time-out circuit 606 to enable it to generate an output and (2) the inverse of that signal to LED 642 to energize it. Meanwhile, the link 700 closes the REG crosspoint, through which its ANALOG LINK BYPASS conductor is connected to the analog decoupling and current detect circuit 602, which normally receives the DIAL TONE ENABLE signal from register reset and time out circuit 606, and consequently allows its DIAL TONE input from tone card 500 to pass through the link 700 to the seizing station card 200 and its associated station set 100. Dial signals may now be received by the register 600 from the station set 100 via the station card 200 and link card 700. Both dual-tone multi-frequency (DTMF) dial signals and dial pulse train signals are received by analog decoupling and current detection circuit 602, which incorporates a transformer with one winding connected to the link circuit(s) 700 in the system, and the other winding connected to the tone filtering and decoding circuit 612. The current detector may be constructed in a manner similar to the current detector in the hotline B-port of station card 200 (FIG. 4). DTMF signals are converted into four-bit binary tone data by the decoder 612, and that data is fed to an up counter 614 which, in response to a PRESET signal generated by control logic 608 in response to the TDV (Tone Data Valid) signal from decoder 612, is enabled to hold each dialed digit for transmission to the binary-to-decimal decoder 616 in the same sequence in which the binary-coded digits were received. The digit assignment control logic 608 is normally in a waiting state, and is enabled either by the TDV signal from decoder 612 when DTMF dial signals are received, or by the B signal (interdigit time signal) from outpulse filter 604 when dial pulse train signals are received. Then, the logic circuit 608, under the timing control of clock 610, causes the first digit to be received by the B/D decoder 616 from counter 614. While it is held in the B/D decoder 616, the first digit is tested for validity by the control logic 608. If the first digit is a 0, 1, 2 or 9 (prefix code numbers), it is not passed to invalid dialing trap circuit 620, but is held in function latch 618. If the first digit is not a 0, 1, 2 or 9, it is passed to trap circuit 620 in the form of a logic level signal on one of ten conductors representing decimal numbers 0 through 9 in response to a control logic 608 signal to trap circuit 620, which in turn generates the SEND REORDER ADDR to output logic 622. This command is executed by sending the reorder address (97) stored is hardwired memory 624 through buffer 636, which has again received an ENABLE signal from control timer 626 in response to the SEND REORDER ADDRESS signal, to the link address latches 748, 752 in response to the SEND MODE and SEND ADDR signals sent in sequence to the output logic 622. The control timer then resets itself, and sends the RESET IDLE signal to link search circuit 628. As the control timer 626 goes through these steps, it causes status indicator LED 644 to be momentarily energized, followed by constant energization of LED 638 until the register status is changed by data received from another register in the system.

The control logic 608 will cause each digit in a dialed number to be passed in sequence to B/D decoder 616 for validity testing, and the sequence of events described above will be carried out in response to any invalid digit.

If the dialing number is valid, trap 620 sends a DIALING DONE signal to register control timing circuit 626, which responds by again sending an ENABLE signal to buffers 632, 634 and 636, and then providing the SEND MODE signal to output logic 622 to cause transmission of the logic level output representative of a 0, 1, 2, or 9 from function latch 618 via the appropriate one of the link data units paths through buffer 636 to the connected links' inputs to current mode latches 754. Simultaneously, a pulse is sent by output logic 622 via a predetermined link data tone path through buffer 636 to the connected links' inputs to mode latches 736. Register control timing circuit then transmits a SEND ADDR signal to output logic 622, causing the address held in counter 614 to be sent through output logic 622 and buffer 636 to the link address latches 748, 752. The register control timer 626 then sends a RESET IDLE signal to link search circuit 628, which in turn terminates the ENABLE signal to buffer 630, which responds by terminating the LINK CONNECT signal to link connect logic 742.

When the dialed signals received through the link are current pulse trains, the current detector 602 generates corresponding digital logic level voltage pulses which are passed through pulse filter 604 to counter 614, which counts the pulses and holds the digits represented thereby in four-bit binary code for transmission to the B/D decoder 616 in the same sequence in which the digits' respective pulse trains were received, and in the same manner as described above in the case of DTMF dial signals.

The pulse filter circuit 604 generates four logic level voltage outputs A, B, C and D which are fed to reset and time out circuit 606 along with the TDV (tone data valid) signal from tone decoder 612. The DIAL TONE ENABLE signal is generated only when the A, B, D and TDV signals are logic 0s and C is logic 1. Signal A is the filtered off-hook signal, which goes high after receipt of the first dialed pulse and then goes low during each pulse. Signal B is the inter-digit time signal, which is high between each pulse train and low during each pulse train. Signal C is the inverse of signal A, i.e., it is a voltage duplicate of the dialed current pulse trains. Signal D is the on-hook terminate signal, which is a logic 0 generated when the caller's station set is on-hook, and thereby resets the register. The TDV signal is normally low, and goes high during each valid DTMF signal received. The signals A, B and TDV are all utilized to trigger reset and time-out circuit 606 after it has been enabled to issue an output by the DIAL TONE & DIALING signal from control timer 626. Specifically, signal A triggers the timer 606 which measures the time from its receipt of the SEND REG MODE signal from control timer 626 until the receipt of the first dialed signal (DTMF or pulse trains). If this time period exceeds a predetermined maximum (e.g., 10 seconds), the circuit 606 will cause the control logic circuit 608 to send a signal to the trap circuit 620, which responds by issuing the SEND REORDER ADDR signal. The sequence of events described earlier will ensue. The B signal triggers the timer 606 which measures the period between dialed pulse trains. If that period exceeds a predetermined maximum (e.g., 10 seconds), the circuit 606 causes generation of the SEND REORDER ADDR in the manner described above. Signal C has only the function of combining with signals A, B, D and TDV to cause the circuit 606 to generate the DIAL TONE ENABLE signal. Signal D also causes the termination of the SEND REORDER ADDR signal by causing circuit 606 to terminate the signal it sent to control logic 608 in response to signal A. The TDV signal triggers the timer 606 which measures the period between the termination of each DTMF signal and the initiation of the following DTMF signal. If that period exceeds a predetermined maximum (e.g., 2 seconds), the circuit 606 generation of the SEND REORDER ADDR signal as described above.

The register control timer 626 is connected to at least one other register, with which it exchanges data indicating register status. Specifically, if the register shown in the drawing is in the ready status, the SEARCH ENABLE OUT signal is present, and the SEARCH ENABLE IN signal from the other register is absent, indicating that it is in the standby status. The inverse is also true, i.e., if the register shown is in the standby status, the SEARCH ENABLE OUT signal is absent, and the SEARCH ENABLE IN signal from the other register is present, indicating that it is in the ready status. If the register shown is sending mode or address data to a link, the DATA LINK ENABLE OUT signal is present and will prevent the other register from sending mode or address data. If the other register is sending mode or address data to a link, the DATA LINK ENABLE IN signal is present, and will prevent the register shown in the drawing from sending mode or address data. This mutual exclusion feature is necessary because of the common data output connections of all registers to all links. This complete signalling arrangement causes the registers to share their workload approximately equally, since the register which is idle while the other is functioning and will handle the next link request.

Figure 9:
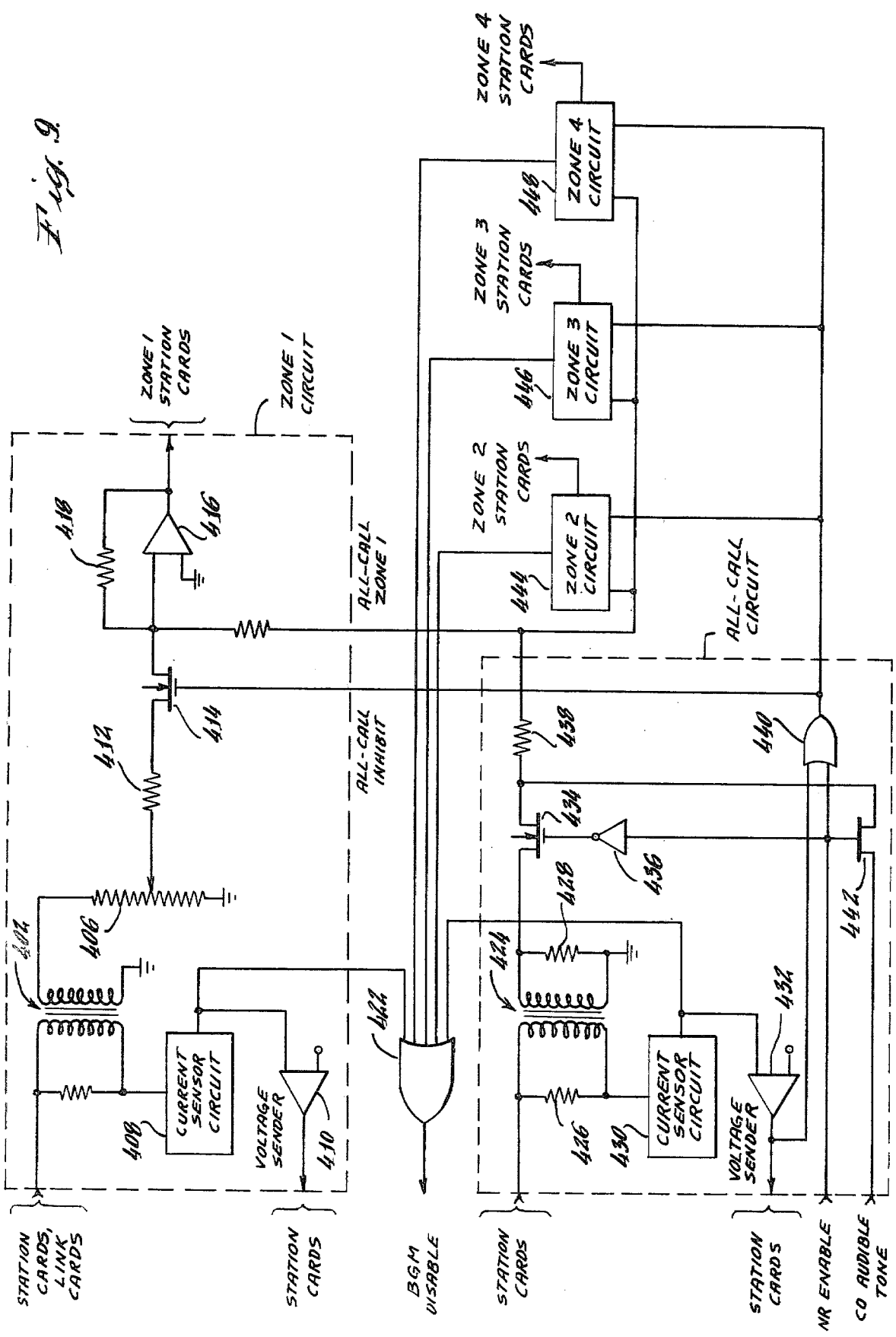
FIG. 9 is a partially schematic, partially block diagram of the page card circuit which is an optional component of applicants' electronic key telephone systems.

Referring specifically to FIG. 9, the page card circuit shown there includes five passive ports, one in each of zone 1, zone 2, zone 3 and zone 4 circuits and one in the all-call circuit. In the several zone circuits, each of which is identical to the zone 1 circuit shown in detail, a DC current signal-blocking transformer 402 has a shunt resistor 404 across one winding, both being connected to current sensor circuit 408, which is constructed in the same manner as the combination current sensor-voltage sender in the link B-port (FIG. 4), and responds to a DC seize current (1.6 ma) received from an active port of a station card 200 or link card 700 to generate two voltages, one to the associated crosspoint(s) in the link card(s) 700, and another as an input to voltage sender 410, which in turn generates a DC voltage signal ($-2$ v.) indicating seizure to all of the station cards 200 to which the output of voltage sender 410 is connected. A paging message can then be transmitted from the seizing station card 200 or link card 700 through transformer 402, volume-controlling variable resistor 406, resistor 412, normally-conductive MOSFET 414, and amplifier 416 to the group of station cards selected to form zone 1, each of which receives the paging message as the PAGE input to the B-port switching circuit 246. OR gate 422 also has received the voltage output of current sensor circuit 408 as an input which causes generation of the BGM DISABLE signal, which is fed to the BGM interface circuit 530 on the tone card 500 (FIG. 6) to interrupt the transmission of background music until the page card passive port is no longer seized. In the station card 200 associated with the station set 100 from which paging is initiated, the PAGE ENABLE signal to JCT FET 291 in the B-port switching circuit 246 (FIG. 4) is terminated for as long as the page button is depressed in the station set 100, so as to block transmission of the paging message to the originator's station set.

When the all-call passive port is seized by a DC current signal (1.6 ma) from an active port of a station card 200, current sensor 430 (identical to 408) generates one output voltage to the associated crosspoint in the link 700 cards, and another voltage which causes generation of a DC voltage signal ($-2$ v.) by voltage sender 432, both voltages indicating seizure of the all-call circuit to all the station cards 200 and link cards 700 to which it is connected, and also causes generation of the BGM DISABLE signal by OR gate 422. The output of voltage sender 432 is fed as an input to OR gate 440, causing it to render MOSFET 414 (and its counterparts in zone circuits 444, 446, and 448) non-conductive. Thus, an all-call page will pre-empt a page to any single zone. The all-call page message is received from the seizing station card 200 and transmitted through transformer 424, normally-conductive MOSFET 434, and resistor 438 to all of the zone circuits, which receive and transmit the message to the station cards 200 in their respective zones, e.g., in the zone 1 circuit through resistor 420 to the input of amplifier 416, the output of which is fed to the station cards 200 in zone 1.

When the NR ENABLE signal is received from the night ring control circuit 526 on tone card 500 (FIG. 6), it is fed as an input to OR gate 440, to inverter 436, and to JCT FET 442. Consequently, any paging message is blocked because MOSFET 414 and its counterparts are all driven non-conductive by the output of OR gate 440, and the MOSFET 434 in the all-call circuit is driven non-conductive by the output of inverter 436. The CO AUDIBLE TONE is passed through JCT FET 442 and resistor 438 to all of the zone circuits (1) until the incoming call is answered, thereby terminating the NR ENABLE signal as a result of termination of the INCOMING CALL ENABLE to the tone card 500 because of termination of ringing detection in the line card circuit 300, or (2) until the caller terminates the call before it is answered, thereby causing the same sequence of signal termination as in (1) above.

Figure 10:
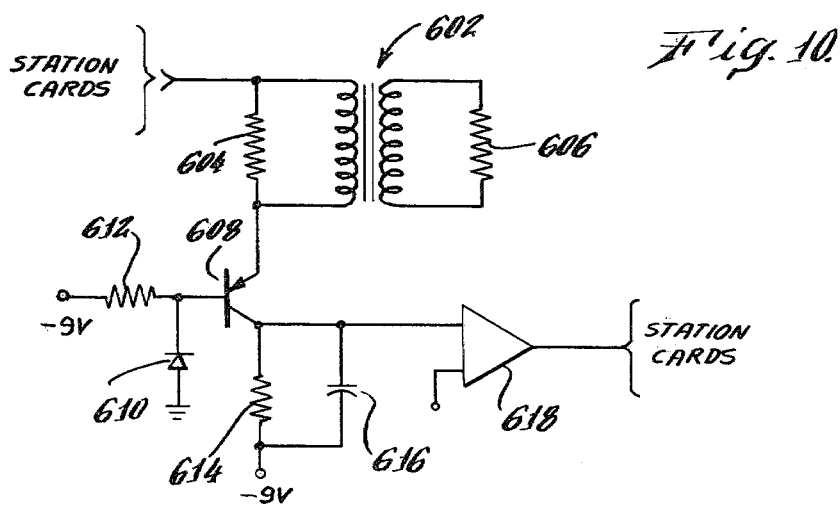
FIG. 10 is a schematic diagram of the internal conference card circuit which is an optional component of applicants' electronic key telephone system as shown in FIG. 1.

Referring specifically to FIG. 10, the conference card circuit 600 shown there consists of a passive port which is of essentially the same construction as the hotline B-port 238 (FIG. 4), the differences being that it does not provide an outgoing communication path and, when seized, causes the DC output of voltage comparator 618 to go from $+2$ v. to 0 v. Thus, the conference card circuit 600 acts only as a meeting point for internal conferences, i.e., it is a passive port which enables connection of all active ports which are connected to it to each other. Once this circuit is seized by a first caller, who has previously requested (e.g., by paging or by intercom call) several other system users whose station sets 100 and station cards 200 have this feature to meet him by actuating the conference button or key in each of their station sets, the visual indicators associated with the conference buttons will be energized in response to the 0 v. DC output voltage from voltage comparator 618, indicating that the conference card circuit is in use. Thus, anyone whose station set 100 and station card 200 has this feature, but who has not been requested to join the conference, will be aware that the conference card circuit is in use and that he should not use this feature. However, any such uninvited system user can join in a conference, since any number of station cards 200 can seize the conference card circuit simultaneously. There is no provision for exclusion, except by selection of the station sets 100 and station cards 200 which are to have this feature.

In summary, the electronic key telephone systems and the various component circuits thereof disclosed herein provide a high degree of reliability owing to the distribution of control on a station-by-station basis and implementation of the control of each station by means of a stored-program digital microcomputer with non-volatile program storage. A high degree of flexibility is also provided by the removable microcomputer, which may be either replaced by another microcomputer with a different program, or reprogrammed and re-inserted into the station card circuit 200, in order to implement different or additional telephone services. The program set forth herein on pages 21 through 44 will enable the station card 200, in cooperation with the various other system circuits 100-700, to provide the various telephone services and features listed hereunder:

1. Handsfree talkback on intercom calls to another station set: the called party can answer from across his desk or across the room without touching the telephone. A volume switch is provided to control the volume of transmissions received handsfree without affecting the volume setting for background music.

2. Handsfree origination for both internal and Central Office line calls: by depressing a handsfree key, and then depressing either the key for the desired internal station, or the key for a C.O. line, the caller can both dial a call and then conduct a handsfree conversation by means of a speakerphone built into the station set without ever lifting the handset.

3. Multi-line conferencing: the caller can establish a first C.O. line call, put it on hold, establish a second C.O. line call, put it on hold, and then depress both C.O. line keys to establish a conference between the caller and the two outside parties.

4. Busy station display: provided at all station sets to allow a caller to know what stations, C.O. lines, etc. are busy before placing a call.

5. Music-on-hold: provided to any outside party on a held C.O. line.

6. Background music: provided to system users at their station sets, which have an on/off/volume control switch to enable a user to control the level of background music without affecting the volume setting for the handsfree feature.

7. Simultaneous call handling: the systems allow two simultaneous calls to be on any station set at the same time, one on the handset and one on the speakerphone, without having to place either call on hold.

8. Automatic privacy: no action needs to be taken by a station set user to ensure privacy, but he may release the privacy feature to allow other station set users to have access to the called C.O. line.

9. Paging: the systems provide for paging to as many as five zones, plus all-call paging to all zones, each accessed by different dial codes. Also, each station set has a paging key that may be used to access any one of the zones or all-call directly, without dialing.

10. Meet-me conference: internal group conferences may be held by having each conferee depress a conference key on his station set, which connects each of the conferees' station sets to every other conferee's station set.

11. I-hold signalling: the visual indicator on the line(s) which a user has put on hold flashes in a distinctive manner to identify those lines.

12. Hotlines(s): each station set can reach one or more other station sets directly, without dialing, by depressing a hotline key. Access to a hotline-connected station set is guaranteed, even if it is in use.

13. Single key intercom operation: an intercom key on the station set may be depressed to seize the first available link and register, by means of which a caller may dial an internal call. Intercom calling may be conducted handsfree by the caller and the called party, and may continue for unlimited periods of time without tying up registers. For privacy, or if in an environment with a high ambient noise level, the caller or the called party may switch the call to his handset by picking up his handset.

14. Access to lines that do not appear at the telephone: in a non-square system, or a system having private lines, a user may dial into a line that does not appear at his station set by depressing the intercom key and dialing a pre-determined number.

15. Handsfree mute: by depressing a mute key in the station set, the user can disable the microphone which is normally operative in the handsfree mode. Thus, handsfree calls can be placed in a monitor-only mode. A caller may also establish privacy to talk to someone at his location without the called party overhearing. A second depression of the mute key reenables the microphone.

16. Do not disturb: by depressing a DND key in the station set, it is made to appear busy to all internal calls. A subsequent depression of this key restores the station set to normal availability.

17. Alternate point answering (call steal): an internal call may be answered from another telephone using the intercom key to seize a link and register, and then dialing 2 followed by the number of the telephone to which the call is directed. If the call is a handsfree voice call, it may be intercepted in this manner only within about 30 seconds after it has been received. If the call is an ICM RING call, it may be intercepted in this manner for as long as the caller is ringing.

The advantages of the present invention, as well as certain changes and modifications to the disclosed embodiment s thereof, will be readily apparent to those skilled in the art. It is the applicant's intention to cover all those changes and modifications which could be made to the embodiment s of the invention herein chosen for the purposes of the disclosure without departing from the spirit and scope of the invention.

What we claim is:

1. An electronic key telephone system, comprising:
   (1) a plurality of station set means, each including a plurality of switches and each operative to generate a continuous time-division-multiplexed digital data stream to indicate periodically the status of each of said plurality of switches, and further operative, in response to actuation of any one of said plurality of switches, to generate a service request signal as part of said continuous time-division-multiplexed digital data stream; and
   (2) a key service unit, comprising at least:
      (a) a plurality of station circuit means, each operative to receive said continuous time-division-multiplexed digital data stream from one of said station set means, and to generate a continuous time-division-multiplexed digital data stream which is received by said station set means, to indicate periodically which internal connections are to be made in said station set means, each of said plurality of station circuit means including a plurality of active port means, each of which is connected to and operative to receive a status signal from a passive port means, and (i) when a service request signal is received from said station set means and (ii) if said status signal from said passive port means indicates that the service specified by said service request signal can be provided, said active port means is further operative to close a path to said passive port means and to generate a service signal to said passive port means;

(b) a plurality of line circuit means, each including a passive port means operative to generate a status signal indicating the status of the line circuit means, and further operative to receive a service signal from at least one of said plurality of station circuit means and, in response thereto, to cause the line circuit means to effect the requested service and to alter said status signal to indicate the changed status of the line circuit means; and (c) audible and visual signal generator means operative to provide a plurality of audible signals and visual indicator energizing signals to said electronic key telephone system.

2. The system according to claim 1, wherein said continuous, time-division multiplexed digital data streams received and transmitted by each of said station circuit means are decoded and generated, respectively, by a stored program digital microcomputer.

3. The system according to claim 1, wherein said continuous, time-division multiplexed digital data streams received and transmitted by each of said station set means are decoded and generated, respectively, by a stored program digital microcomputer.

4. The system according to claim 1, wherein said continuous, time-division multiplexed digital data streams are transmitted on a common path on which they are interleaved.

5. The system according to claim 1, further comprising page circuit means including a plurality of zone circuit means, each including a passive port means operative to receive a service signal from any seizing active port means to which it is connected and, in response thereto, to generate at least one signal indicating its seized status to all active port means to which it is connected, and each zone circuit means being operative, when seized, to transmit a page message from the seizing active port means to a predetermined group of said station set means via their respective station circuit means.

6. The system according to claim 5, further comprising an all-call circuit means including a passive port means operative to receive a service signal from any seizing active port means to which it is connected and, in response thereto, to generate at least one signal indicating its seized status to all active port means to which it is connected, said all-call circuit means being operative, when seized, to transmit a page message from the seizing active port means through said plurality of zone circuit means to each of the predetermined groups of said station set means via their respective station circuit means, and to block any other page message which is being transmitted during the time said all-call circuit means is seized.

7. The system according to claim 1, further comprising a conference circuit means consisting of a passive port means operative to receive a service signal from any seizing active port means to which it is connected and, in response thereto, to generate a signal indicating that said conference circuit means is in use and can also be seized by any number of active port means to which it is connected to form an internal conference circuit.

8. The system according to claim 1, wherein at least one station circuit means further includes a passive port means which is connected to one active port means in at least one other station circuit means, said passive port means being operative to receive a service signal from any active port means to which it is connected and, in response thereto, to generate a signal indicating its status to all active port means to which it is connected.

9. The system according to claim 8, wherein said passive port means of said at least one station circuit means is operative to receive any one of a plurality of service signals from any active port means to which it is connected and, in response to the level of the received service signal, to generate a signal having a level indicating the status of said passive port means to all active port means to which it is connected.

10. The system according to claim 9, wherein said passive port means of said at least one station circuit means is further operative to receive a signal indicating that the station set means connected to said station circuit is in use and, in response thereto, to generate a signal indicative of that condition.

11. The system according to claim 8, wherein each of said plurality of station circuit means further includes a passive port means which is connected to one active port means in each of a predetermined group of other station circuit means.

12. The system according to claim 1, further comprising:
(1) at least one register circuit means; and
(2) at least one link circuit means including a passive port means and a plurality of active port means, said passive port means being operative to receive a seizing signal from any active port means to which it is connected and, in response thereto, to generate a signal indicating its seized status to all active port means to which it is connected, and to cause said link circuit means to close a dialing signal path to a register circuit means, said link circuit means being further operative to receive data signals from said register circuit means identifying an active port means in said link circuit means, to reopen said dialing signal path and close at least one path from said identified active port means to the passive port means to which it is connected, to receive and detect the status signal being generated by said passive port means at the time said identified active port means path is closed, and to send a service signal to said passive port means in response to a service request signal received by said link circuit means from a station set means through its connected station circuit means only if said status signal from said seized passive port means indicates that the requested service is available.

13. The system according to claim 12, wherein said link circuit means is further operative, in response to a status signal from a passive port means indicating that a requested service is not available, to re-open said identified active port means path and to close a first signal path to the station set means connected to the link-seizing station circuit means to provide a signal thereto indicating the unavailability of the requested service.

14. The system according to claim 12, wherein said link circuit means is operative, in response to data signals from said register circuit means indicating that an invalid number has been dialed, to close only a second signal path to the station set means connected to the link-seizing station circuit means to provide a signal thereto indicating that the dialed number is invalid.

15. The system according to either claim 13 or claim 14, wherein said link circuit means is further operative to generate a kickoff signal a predetermined period of time after closing either said first signal path or said second signal path, and said link-seizing active port means is operative in response to said kickoff signal to terminate the transmission of said seizing signal.

16. The system according to claim 12, wherein each of the passive port means of a plurality of link circuit means is connected to a predetermined active port means in each one of a predetermined group of said plurality of station circuit means, and each of a plurality of register circuit means is connected to an associated dialing signal path in each of said plurality of link circuit means, each of said station circuit means being operative, in response to a link-connect service request signal from the connected station set means, to seize a predetermined link circuit means if it is not seized at the time said station circuit means receives said link-connect service request signal, and to seize the first available link circuit means if said predetermined link circuit means is seized at the time said station circuit means receives said link-connect service request signal.

17. The system according to claim 16, wherein one of said register circuit means is in ready status, and another register circuit means is in standby status, and any of said plurality of link circuit means is further operative, when seized, to close said dialing signal path to said register circuit means which is in ready status, and said other register circuit means is thereby switched from standby status to ready status.

18. The system according to claim 12, wherein at least one of said station circuit means further comprises a passive port means which is connected to an active port means in said at least one link circuit means, said passive port means being operative to receive a service signal from any seizing active port means to which it is connected and, in response thereto, to generate a signal indicating its seized status to all active port means to which it is connected.

19. The system according to claim 18 wherein said passive port means of said at least one station circuit means is operative to receive any one of a plurality of service signals from any active port means to which it is connected and, in response to the level of the received service signal, to generate a plurality of signals in a combination which indicates the requested service.

20. A key service unit for an electronic key telephone system, comprising:
(1) a plurality of line circuit means, each including a passive port means operative to receive a service signal and, in response thereto, to cause said line circuit means to effect the requested service and to generate a signal indicating its status to all active port means to which it is connected;
(2) a plurality of station circuit means, each including a plurality of active port means each of which is operative to receive a status signal from a passive port means to which it is connected, and (i) when the station circuit means of which it is a part receives a service request signal from a station set to which the station circuit means is connected, and (ii) if the status signal from said passive port means indicates that the service specified by said service request signal can be provided, said active port means is further operative to close a path to said passive port means, and to generate a service signal to said passive port means, each station circuit means being further operative to generate control signals for transmission to the aforesaid connected station set to indicate the internal connections which are to be made in the station set; and
(3) audible and visual signal generator means operative to generate a plurality of signals to be transmitted through and under the control of said station circuit means to the station sets connected thereto in order to generate visual and audible signals at the stations sets.

21. The key service unit according to claim 20, wherein each service request signal and each control signal received and generated, respectively, by said station circuit means is part of continuous, time-division multiplexed digital data streams which are decoded and generated, respectively, by a stored program digital microcomputer.

22. The key service unit according to claim 20, further comprising page circuit means including a plurality of zone circuit means, each including a passive port means operative to receive a service signal from any seizing active port means to which it is connected and, in response thereto, to generate at least one signal indicating its seized status to all active port means to which it is connected, and each zone circuit means being operative, when seized, to transmit a page message from the seizing active port means to a predetermined group of said station set means via their respective station circuit means.

23. The key service unit according to claim 22, further comprising an all-call circuit means including a passive port means operative to receive a service signal from any seizing active port means to which it is connected and, in response thereto, to generate at least one signal indicating its seized status to all active port means to which it is connected, said all-call circuit means being operative, when seized, to transmit a page message from the seizing active port means through said plurality of zone circuit means to each of the predetermined groups of said station set means via their respective station circuit means, and to block any other page message which is being transmitted during the time said all-call circuit means is seized.

24. The key service unit according to claim 20, further comprising a conference circuit means consisting of a passive port means operative to receive a service signal from any seizing active port means to which it is connected and, in response thereto, to generate a signal indicating that said conference circuit means is in use and can also be seized by any number of active port means to which it is connected to form an internal conference circuit.

25. The key service unit according to claim 20, wherein at least one station circuit means further includes a passive port means which is connected to one active port means in at least one other station circuit means, said passive port means being operative to receive a service signal from any active port means to which it is connected and, in response thereto, to generate a signal indicating its status to all active port means to which it is connected.

26. The key service unit according to claim 25, wherein said passive port means of said at least one station circuit means is operative to receive any one of a plurality of service signals from any active port means to which it is connected and, in response to the level of the received service signal, to generate a signal having a level indicating the status of said passive port means to all active port means to which it is connected.

27. The key service unit according to claim 26, wherein said passive port means of said at least one station circuit means is further operative to receive a signal indicating that the station set means connected to said station circuit is in use and, in response thereto, to generate a signal indicative of that condition.

28. The key service unit according to claim 25, wherein each of said plurality of station circuit means further includes a passive port means which is connected to one active port means in each of a predetermined group of other station circuit means.

29. The key service unit according to claim 20, further comprising:
(1) at least one register circuit means; and
(2) at least one link circuit means including a passive port means and a plurality of active port means, said passive port means being operative to receive a seizing signal from any active port means to which it is connected and, in response thereto, to generate a signal indicating its seized status to all active port means to which it is connected, and to cause said link circuit means to close a dialing signal path to a register circuit means, said link circuit means being further operative to receive data signals from said register circuit means identifying an active port means in said link circuit means, to reopen said dialing signal path and close at least one path from said identified active port means to the passive port means to which it is connected, to receive and detect the status signal being generated by said passive port means at the time said identified active port means path is closed, and to send a service signal to said passive port means in response to a service request signal received by said link circuit means from a station set means through its connected station circuit means only if said status signal from said seized passive port means indicates that the requested service is available.

30. The key service unit according to claim 29, wherein said link circuit means if further operative, in response to a status signal from a passive port means indicating that a requested service is not available, to re-open said identified active port means path and to close a first signal path to the station set means connected to the link-seizing station circuit means to provide a signal thereto indicating the unavailability of the requested service.

31. The key service unit according to claim 29, wherein said link circuit means is operative, in response to data signals from said register circuit means indicating that an invalid number has been dialed, to close only a second signal path to the station set means connected to the link-seizing station circuit means to provide a signal thereto indicating that the dialed number is invalid.

32. The key service unit according to either claim 30 or claim 31, wherein said link circuit means is further operative to generate a kickoff signal a predetermined period of time after closing either said first signal path or said second signal path, and said link-seizing active port means is operative in response to said kickoff signal to terminate the transmission of said seizing signal.

33. The key service unit according to claim 29, wherein each of the passive port means of a plurality of link circuit means is connected to a predetermined active port means in each one of a predetermined group of said plurality of station circuit means, and each of a plurality of register circuit means is connected to an associated dialing signal path in each of said plurality of link circuit means, each of said station circuit means being operative, in response to a link-connected service request signal from the connected station set means, to seize a predetermined link circuit means if it is not seized at the time said station circuit means receives said link-connect service request signal.

34. The key service unit according to claim 33, wherein one of said register circuit means is in ready status, and another register circuit means is in standby status, and any of said plurality of link circuit means is further operative, when seized, to close said dialing signal path to said register circuit means which is in ready status, and said other register circuit means is thereby switched from standby status to ready status.

35. The key service unit according to claim 29, wherein at least one of said station circuit means further comprises a passive port means which is connected to an active port means in said at least one link circuit means, said passive port means being operative to receive a service signal from any seizing active port means to which it is connected and, in response thereto, to generate a signal indicating its seized status to all active port means to which it is connected.

36. The key service unit according to claim 35 wherein said passive port means of said at least one station circuit means is operative to receive any one of a plurality of service signals from any active port means to which it is connected and, in response to the level of the received service signal, to generate a plurality of signals in a combination which indicates the requested service.

37. A signalling method for use in a key telephone system having a centralized key telephone control unit and a plurality of key telephone station sets, each key telephone set being connected to the centralized key telephone control unit by means of at least two conductors, the method comprising the steps of
periodically applying to each key telephone station set a sequence of N pulses via the conductors from the key telephone control unit, the start of each of the N pulses defining the beginning of each of N data words, each of the data words being divided into M elements of time, the first pulse being applied for all M elements of time, each of the next N−1 pulses lasting one element length of time,
applying a pulse during a second element of time for each of the next N−1 words to each key telephone station set via the conductors from the key telephone control unit if a logical "one" is to be conveyed to the key telephone station set for each of the N−1 words and applying no pulse during said second element of time for each of the next N−1 words to each key telephone station set via the conductors from the key telephone control unit if a logical "zero" is to be conveyed to the key telephone station set for each of the N−1 words, applying a pulse during a third element of time for each of the next N−1 words to the key telephone control unit from each key telephone station set via the conductors if a logical "one" is to be conveyed to the key telephone control unit for each of the N−1 words and applying no pulse during said third element of time for each of the next N−1 words to the key telephone control unit from each key telephone station set via the conductors if a logical "zero" is to be conveyed to the key telephone control unit for each of the N−1 words.

38. The method of claim 37 wherein said M elements of time are selected to be of equal length L.

39. The method of claim 37 wherein M is selected to equal five, the third, fourth and fifth elements are selected to be L time units in length, the first element is selected to be one-half L time unit in length, and the second element is selected to be three-halves L time units in length.

40. The method of claim 39 wherein N is selected to equal 34, the word time length is selected to be 600 microseconds and the element time length L is selected to be 120 microseconds.

41. The method of claim 37 wherein the pulses applied during a second element of time for each of the next N−1 words after the 0th synchronizing word are voltage pulses and wherein the pulses applied during a third element of time for each of the next N−1 words are current pulses.

42. The method of claim 37 wherein the first word, called the 0th word, is used as a synchronizing word by key telephone station set logic circuitry for determining the start of the periodic word sequence.

43. The method of claim 37 wherein one or more of the next N−1 words is associated with a particular key telephone station set circuit, whereby the transmission of a logical "1" from the key telephone control unit to the key telephone station set during the second element of a particular word conveys information with respect to the control over that particular key telephone station set circuit and whereby the transmission of a logical "1" from the key telephone station set to the key telephone control unit during a third element of a particular word conveys information with respect to the status of that circuit.

44. The method of claim 37 further comprising the step of applying hookswitch current pulses during an element of time of each word from each key telephone station set via the conductors to the key telephone control unit during the time when the status of the station set is "on hook" and during the time in which a signalling pulse is being generated by dial pulse signalling means in said telephone station set.

45. The method of claim 44 wherein said hookswitch current pulses are applied during the second element of time.

46. Bi-directional signalling and communicating means between a central control unit and a key telephone set, said bidirectional signalling and communicating means comprising, four conductors, the ends of which are connected between a central control unit and said key telephone set, a first pair of the conductors providing a first information channel between said central control unit and said key telephone set, a second pair of the conductors providing a second information channel between said central control unit and said key telephone set, first transformer means at each end of the first conductor pair for inductively coupling associated first communication means in the central control unit and the key telephone set via the first conductor pair, each of the windings of the first transformer means which are connected to the first conductor pair having a center tap connection, second transformer means at each end of the second conductor pair for inductively coupling associated second communication means in the central control unit and key telephone set via the second conductor pair, each of the windings of the second transformer means which are connected to the second conductor pair having a center tap connection, means in said central control unit connected to the center taps of said transformer connected to the first and second conductor pairs at the central control unit for (a) applying a source of voltage on said four conductors, (b) applying data signals on said four conductors from said central control unit to be received by said key telephone set, and (c) receiving data signals from said key telephone set which have been applied by said key telephone set on said four conductors, means in said key telephone set connected to the center taps of said transformers connected to the first and second conductor pairs at the key telephone set for (d) receiving and regulating said voltage applied on the four conductors from said voltage source means in said central control unit and applying said voltage to power said key telephone set, (e) receiving data signals from said four conductors which have been applied by said key telephone control unit, and (f) applying data signals on said four conductors from said key telephone set to be received by said central control unit, in which said means in said central control unit for applying data signals on said four conductors from said central control unit to be received by said key telephone set periodically applies to the key telephone set a sequence of N pulses via the conductors, the start of each of the N pulses defining the beginning of each of N data words, each of the data words being divided into M elements of time, the first pulse being applied for all M elements of time, each of the next N-1 pulses lasting one element length of time, and applies a pulse during a second element of time for each of the next N-1 words to the key telephone station set via the conductors from the key telephone control unit if a logical "one" is being conveyed to the key telephone station set for each of the N-1 words and applies no pulse during said second element of time for each of the N-1 words to the key telephone station set via the conductors if a logical "zero" is to be conveyed to the key telephone station set for each of the N-1 words, and in which said means in said key telephone station set for applying data signals on said four conductors from said key telephone station set to be received by said key telephone control unit, applies a pulse during a third element of time for each of the next N-1 words to the key telephone control unit via the conductors if a logical "one" is to be conveyed to the key telephone control unit for each of the N-1 words, applying no pulse during said third element of time for each of the first N-1 words to the key telephone control unit via the conductors if a logical "zero" is to be conveyed to the key telephone control unit for each of the N-1 words, and applies a pulse during a fourth element of time during each of the N words to the key telephone control unit during all times when the status of the station set is "on hook" or during the time of the presence of a dial pulse being generated in said key telephone station set.

47. A station card circuit for the key service unit of an electronic key telephone system, comprising:
   (1) data transceiver means operative to receive and transmit time-division multiplexed digital data streams;
   (2) a plurality of active port means, each comprising an input terminal for receiving status signals from each passive port to which it is connected and common means for converting said status signals to multiplexed, binary-coded data, and an output terminal for sending service signals to the aforesaid passive port to which it is connected, each output terminal being connected through an associated crosspoint to the output of a common current generator;
   (3) stored program digital computer means operative to receive and process a time-division multiplexed digital data stream from said data transceiver and said multiplexed, binary-coded data, and to generate (i) a series of control data which determine which crosspoint or crosspoints should be closed, (ii) a time-division multiplexed digital data stream for transmission by said data transceiver means to an associated station set to control internal circuit connections therein, and (iii) service data for controlling the generation of service signals by said common current generator; and
   (4) crosspoint control means operative to receive said series of control data and to effect crosspoint closings in a first communication path in accordance therewith.

48. The station card circuit according to claim 47, further comprising a dial disable circuit means normally operative to generate a dial disable signal for transmission to an associated station set as part of said time-division multiplexed digital data stream generated by said stored program digital computer means.

49. The station card circuit according to claim 48, further comprising negative impedance circuit means connected to the output of said common current generator and to said dial disable circuit means, and operative in response to said dial disable signal to produce a first value of negative impedance.

50. The station card circuit of claim 49, wherein said service data applied to said common current generator include a multiline conference signal which, when generated, is also applied as an input to said negative impedance circuit means, in response to which a second value of negative impedance is produced.

51. A station card circuit according to claim 48, further comprising a function multiplexer means operative to receive simultaneously said dial disable signal, a speakerphone function control signal and a plurality of visual indicator control signals, and to convert all of said signals into a timedivision multiplexed input to said stored program digital computer means for inclusion in said time-division multiplexed digital data stream for transmission by said data transceiver means to an associated station set.

52. A station card circuit according to claim 47, further comprising a passive port means for connection to an active port in at least one other station card circuit and operative, in response to a service signal from any active port to which it is connected, to generate a status signal indicating that it has been seized and to close a second communication path through said station card circuit.

53. A station card circuit according to claim 52, wherein said passive port means is further operative, in response to a service signal for pre-emptive seizure, to generate a status signal indicating that it has been pre-emptively seized.

54. The station card circuit according to claim 52, wherein said passive port means is further operative to receive a signal from said stored program digital computer means indicating that the associated station set is busy on said first communication path, and in response thereto, to generate a status signal indicating that condition.

55. A station card circuit according to claim 47, further comprising a passive port means for connection to an active port of at least one link card circuit and operative, in response to a service signal from any active port to which it is connected, to generate at least one status signal indicating that it has been seized, and to close a second communication path through said station card circuit.

56. A station card circuit according to claim 55, wherein said passive port means is connected to each associated active port means by a single conductor.

57. A station card circuit according to claim 55, wherein said passive port means is further operative, in response to a service signal from any active port to which it is connected, to transmit a signal indicative of said received service signal to said stored program digital computer means.

58. The station card circuit according to claim 47, further including switching circuit means operative to control the transmission of a plurality of supervisory tone signals in response to control signals generated by said stored program digital computer means.

59. The station card circuit according to claim 48, wherein said switching circuit means is further operative to control the transmission of page messages.

60. The station card circuit according to claim 58, wherein said switching circuit means is further operative to control the transmission of background music.

61. A line card circuit for the key service unit of an electronic key telephone system, comprising:
   (1) a passive port means operative to receive a service signal and, in response thereto, to generate a signal indicating the status of the line card circuit and a service actuating signal;
   (2) control circuit means operative, in response to said service actuating signal, to effect the requested service, and
   (3) ring detection circuit means operative, in response to a ringing signal on the associated line, to generate an incoming call enable signal.

62. The line card circuit according to claim 61, wherein said control circuit means comprises;
(1) a seize relay operative, when actuated, to close a communication path from the tip and ring terminals of said line card circuit to the input terminal to said passive port means; and
(2) seize relay control circuit means operative, in response to a seize actuating signal, to actuate said seize relay.

63. The line card circuit according to claim 62, wherein said control circuit means further comprises flash switch control circuit means operative, in response to a flash actuating signal, to open said communication path for a predetermined period of time, during which said passive port means continues to generate a status signal indicating that the line is seized.

64. The line card circuit according to claim 62, wherein said control circuit means further comprises flash switch control circuit means operative, in response to a flash actuating signal, to ground said tip terminal of said line card circuit for a predetermined period of time during which said communication path is closed and said passive port means continues to generate a status signal indicating that the line is seized.

65. The line card circuit according to claim 61, further comprising a normally-inoperative clamp circuit means connected in a communication path from the tip and ring terminals of said line card circuit to the input terminal of said passive port means, and timer circuit means operative, in response to a seize actuating signal, to render said clamp circuit means operative for a predetermined period of time.

66. The line card circuit according to claim 62, wherein said control circuit means further comprises a hold condition detection circuit means operative, in response to a hold actuating signal, to provide a substitute actuating signal to said seize relay control circuit means in lieu of the terminated seize actuating signal.

67. The line card circuit according to claim 66, wherein said communication path includes an interface circuit means which is operative, when actuated by said hold condition detection means, to inject a predetermined signal in said communication path.

68. The line card circuit according to claim 67, wherein said hold condition detection circuit means is further operative, in response to a privacy release actuating signal, to actuate said interface circuit means.

69. The line card circuit according to claim 66, wherein said passive port means comprises:
(1) first logic means operative in response to the absence of a seize actuating signal and the presence of an incoming ringing signal to cause said status signal to flash at a first rate and duty cycle; and
(2) second logic means operative in response to a signal generated by said hold condition detection circuit means in response to a hold actuating signal and the absence of a seize actuating signal to cause said status signal to flash at a second rate and duty cycle.

70. A an audible and visual signal generator circuit for the key service unit of an electronic key telephone system, comprising:
(1) means for generating a plurality of dual-frequency audible signals of different rates and duty cycles, and for generating a plurality of energizing signals of different rates and duty cycles for energizing visual indicators;
(2) means for generating a first single-frequency audible signal; and
(3) means for generating a second single-frequency audible signal.

71. A an audible and visual signal control circuit for the key service unit of an electronic key service unit of an electronic key telephone system, comprising:
(1) split ringing and gating circuit means operative in response to any one of a plurality of incoming call enable signals from a plurality of line card circuits to generate CO audible enable signals for transmission to switching circuits in predetermined groups of station card circuits; and
(2) night ring control circuit means operative, in response to enabling signal from a predetermined station set and any incoming call enable signal received through said split-ringing and gating circuit means, to generate a night ring enable signal for transmission to a page card circuit.

72. A page card circuit for the key service unit of an electronic key telephone system, comprising a plurality of zone circuit means, each including a passive port means operative to receive a service signal and, in response thereto, to generate at least one signal indicating its status to all active port means to which it is connected and to provide a communication path either to a predetermined group of station card circuits or to a speaker outside of the system.

73. The page card circuit according to claim 72, wherein each of said plurality of zone circuit means further comprises means for generating a background music disabling signal for transmission to all station card circuits and external speakers in its zone to block background music during seizure of each zone circuit means.

74. The page card circuit according to claim 72, further comprising an all-call circuit means comprising:
(1) a passive port means operative to receive a service signal and, in response thereto, to generate at least one signal indicating its status to all active port means to which it is connected, and to provide a communications path through said plurality of zone circuit means to each of the groups of station card circuits or external speakers to which said zone circuit means are connected; and
(2) inhibiting circuit means operative, in response to seizure of said passive port means of said all-call circuit means, to block all zone page messages during an all-call page.

75. The page card circuit according to claim 73, wherein said all-call circuit means further comprises means for generating a background music disabling signal for transmission to all station card circuits and external speakers to block background music during seizure of said all-call circuit means.

76. The page card circuit according to claim 74, wherein said all-call circuit means further comprises circuit means for receiving a tone signal and operative, in response to a night ring enabling signal, to pass said tone signal as an all-call page message to each of the groups of station card circuits or external speakers to which said zone circuit means are connected.

77. A conference card circuit for the key service unit of an electronic key telephone system, consisting of a passive port which comprises:
(1) a transformer having the high side of a first winding connected to a plurality of active ports, a first resistor connected across said first winding and a second resistor connected across a second winding;

(2) current detection circuit means connected to the low side of said first winding; and (3) voltage generating means operative, in response to an output voltage generated by said current detection circuit means in response to a seizing signal received through said first resistor and said first winding, to generate an output voltage indicating to all the active ports to which said conference card circuit is connected that it has been seized but may nevertheless be seized by any other active ports to which it is connected to form an internal conference circuit.

78. A link card circuit for the key service unit of an electronic key telephone system, comprising:

(1) a passive port means operative, in response to a seizing signal from any active port means to which it is connected, to generate a signal indicating its seized status to all active port means to which it is connected and to close a dialing signal path to a register;

(2) link data means operative to receive data signals from the register identifying one of a plurality of active port means in said link card circuit, and to re-open said dialing signal path and close at least one path from said identified active port means to a passive port to which it is connected;

(3) detection circuit means operative to receive and detect the status signal being generated by said passive port means at the time said identified active port means path is closed; and (4) current generator means operative, in response to a service request signal received by said link card circuit through said passive port means, to send a service signal to the said passive port only if said status signal indicates that the requested service is available.

79. The link card circuit according to claim 78, further comprising busy test circuit means operative in response to a signal from said detection circuit means indicating that a requested service is not available, to provide a signal to said link data means which, in response thereto, reopens said identified active port path and closes a first signal path through which a signal indicating the unavailability of the requested service is transmitted.

80. The link card circuit according to claim 78, wherein said link data means is operative, in response to data signals from the register indicating that an invalid number has been dialed, to close only a signal path through which a reorder signal indicating the invalidity of the dialed number is transmitted.

81. The link card circuit according to either claim 79 or claim 80, further comprising kickoff circuit means operative, in response to either said signal from said detection circuit means or said reorder signal, to generate a kickoff signal a predetermined period of time after receiving either of said signals.

82. A register card circuit for the key service unit of an electronic key telephone system, comprising:

(1) means for receiving a link request signal from a signalling link and, in response thereto, generating connecting and enabling signals for connecting and enabling the signalling link to receive register-identifying data signals, and for generating register-identifying data signals;

(2) means for receiving and encoding dial signals;

(3) means for testing said encoded dial signals for validity; and (4) means for transmitting said encoded dial signals if valid, and for transmitting an encoded reorder signal if not valid, and for terminating said connecting and enabling signals.

83. The register card circuit according to claim 82, further comprising means for transmitting and receiving register status signals to and from another register card circuit.

84. The register card circuit according to claim 82, further comprising timer circuit means operative to measure the period of time between the initiation of dial tone transmission and the reception of the first dialed signal, and for resetting said register card circuit if said period of time exceeds a predetermined maximum.

85. The register card circuit according to claim 82, further comprising timer circuit means operative to measure the period of time between the termination of a dialed signal and the initiation of the subsequent dialed signal, and for resetting said register card circuit if said period of time exceeds a predetermined maximum.

* * * * *